(12) United States Patent
Shikama et al.

(10) Patent No.: US 11,561,456 B2
(45) Date of Patent: Jan. 24, 2023

(54) BLADE DRIVING DEVICE FOR HIGH RESOLUTION IMAGING APPARATUS

(71) Applicant: Nidec Copal Corporation, Tokyo (JP)

(72) Inventors: Kazuo Shikama, Tokyo (JP); Longji Bai, Tokyo (JP); Nobuaki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 133 days.

(21) Appl. No.: 17/009,897

(22) Filed: Sep. 2, 2020

(65) Prior Publication Data
US 2021/0041763 A1 Feb. 11, 2021

Related U.S. Application Data

(62) Division of application No. 15/553,931, filed as application No. PCT/JP2016/055765 on Feb. 26, 2016.

(30) Foreign Application Priority Data

Feb. 27, 2015 (JP) ................................ 2015-039575
Mar. 31, 2015 (JP) ................................ 2015-074383
(Continued)

(51) Int. Cl.
*G03B 9/06* (2021.01)
*G03B 9/14* (2021.01)
(Continued)

(52) U.S. Cl.
CPC ............... *G03B 9/06* (2013.01); *G03B 9/02* (2013.01); *G03B 9/14* (2013.01); *G03B 9/36* (2013.01);
(Continued)

(58) Field of Classification Search
None
See application file for complete search history.

(56) References Cited

U.S. PATENT DOCUMENTS 5,446,514 A * 8/1995 Matsumoto ............. G03B 9/08
396/463
6,498,624 B1 12/2002 Ogura et al.
(Continued)

FOREIGN PATENT DOCUMENTS

CN 1346456 A 4/2002
CN 102419504 A 4/2012
(Continued)

OTHER PUBLICATIONS

Notice of Reasons for Refusal issued in corresponding Japanese Patent Application No. 2017-502504 dated Nov. 5, 2019, with English translation.
(Continued)

*Primary Examiner* — Jennifer D. Carruth
(74) *Attorney, Agent, or Firm* — Hauptman Ham, LLP

(57) ABSTRACT

To enable continuous operational control of the blade member with high resolution and good accuracy, even when achieving miniaturization and thickness reduction in a blade driving device, through enabling smooth movement of a movable member in a blade driving device. A blade driving device 1 comprises: a base member 2 that has an opening 2A; one or a plurality of blade members 3 that operate so as to advance into the opening 2A or withdraw from the opening 2A; a driving member 4 that moves within a plane that is perpendicular to the optical axis that passes through the opening 2A, to drive the blade member 3; and supporting members 7 that are provided between the base member 2 and the driving member 4, so as to provide sliding support or elastic support of the driving member 4 in a state that is separated from the base member 2.

7 Claims, 52 Drawing Sheets

(30) Foreign Application Priority Data

| Mar. 31, 2015 | (JP) | 2015-074384 |
| Mar. 31, 2015 | (JP) | 2015-074385 |
| Apr. 27, 2015 | (JP) | 2015-090750 |
| Apr. 27, 2015 | (JP) | 2015-090752 |
| May 19, 2015 | (JP) | 2015-102182 |
| Jun. 26, 2015 | (JP) | 2015-128507 |
| Sep. 11, 2015 | (JP) | 2015-179912 |
| Sep. 17, 2015 | (JP) | 2015-183797 |

(51) Int. Cl.
*G03B 9/36* (2021.01)
*G03B 9/02* (2021.01)
*G03B 11/00* (2021.01)

(52) U.S. Cl.
CPC ...... *G03B 11/00* (2013.01); *G03B 2205/0053* (2013.01)

(56) References Cited

U.S. PATENT DOCUMENTS

| 2006/0039695 | A1 | 2/2006 | Naganuma |
| 2010/0054727 | A1* | 3/2010 | Okutani ............... G03B 17/425 396/489 |
| 2012/0288271 | A1 | 11/2012 | Muramatsu et al. |
| 2015/0109523 | A1* | 4/2015 | Tanaka .................... G03B 9/42 348/367 |
| 2016/0195795 | A1 | 7/2016 | Tokura et al. |

FOREIGN PATENT DOCUMENTS

| EP | 2506072 A1 | 10/2012 |
| JP | H6-037402 | 9/1994 |
| JP | H8-234073 A | 9/1996 |
| JP | 2001-281724 A | 10/2001 |
| JP | 2008-225161 A | 9/2008 |
| JP | 2009-229862 A | 10/2009 |
| JP | 2011-053599 A | 3/2011 |
| JP | 2011-112946 A | 6/2011 |
| JP | 2014-170178 A | 9/2014 |
| WO | 2011-065017 A1 | 6/2011 |
| WO | WO-2016136932 A1 * | 9/2016 ............. G03B 11/00 |

OTHER PUBLICATIONS

Chinese Office Action issued in corresponding Chinese Patent Application No. 201680011393.3 dated Jun. 25, 2019 (in Chinese only).

Chinese Office Action issued in corresponding Chinese Patent Application No. 201680011396.7 dated May 30, 2019 (in Chinese only).

Written Opinion dated May 31, 2016 with ISR (with English Translation) during the prosecution of PCT/JP/2016/055765.

* cited by examiner

Amount of Blade Movement (mm)

Amount of Blade Movement (mm)

Cross-Sectional Diagram Along the Section A-A

Cross-Sectional Diagram Along the Section X-X

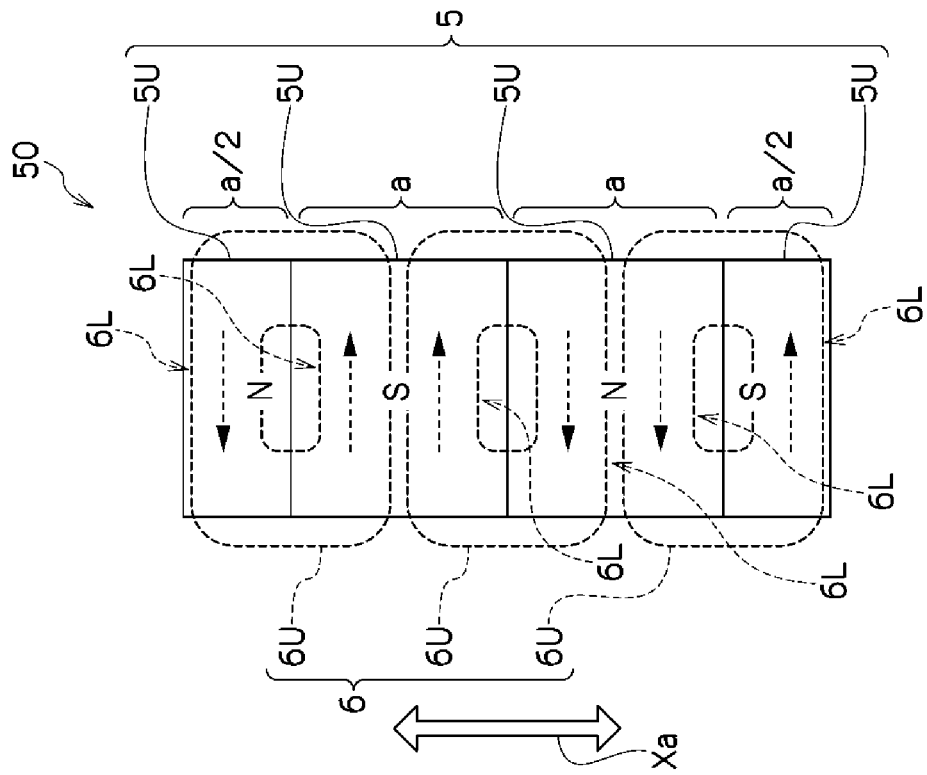
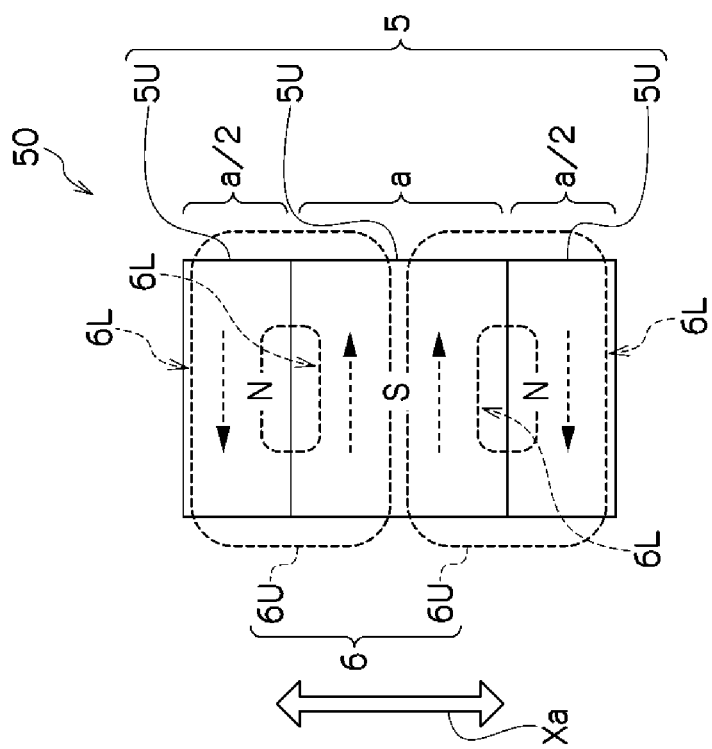
FIG. 41(a)
FIG. 41(b)

FIG. 44(a)
FIG. 44(b)
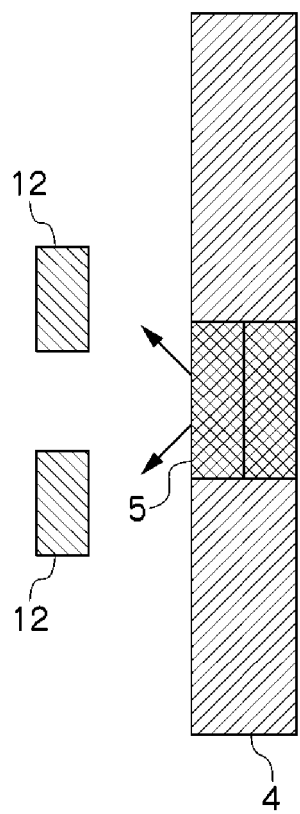
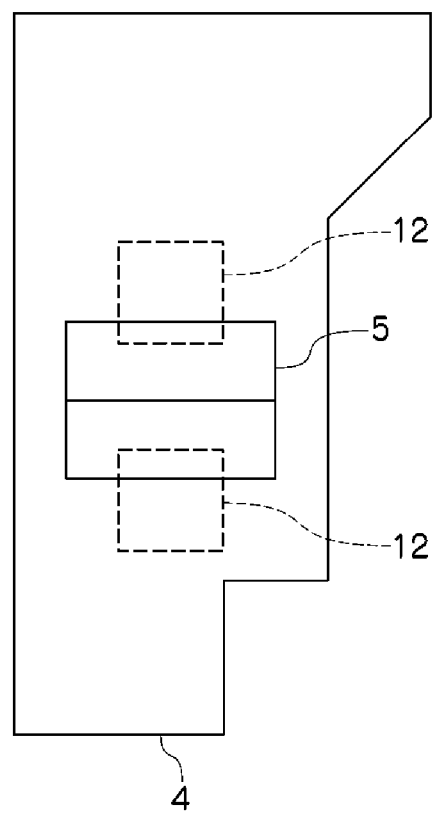

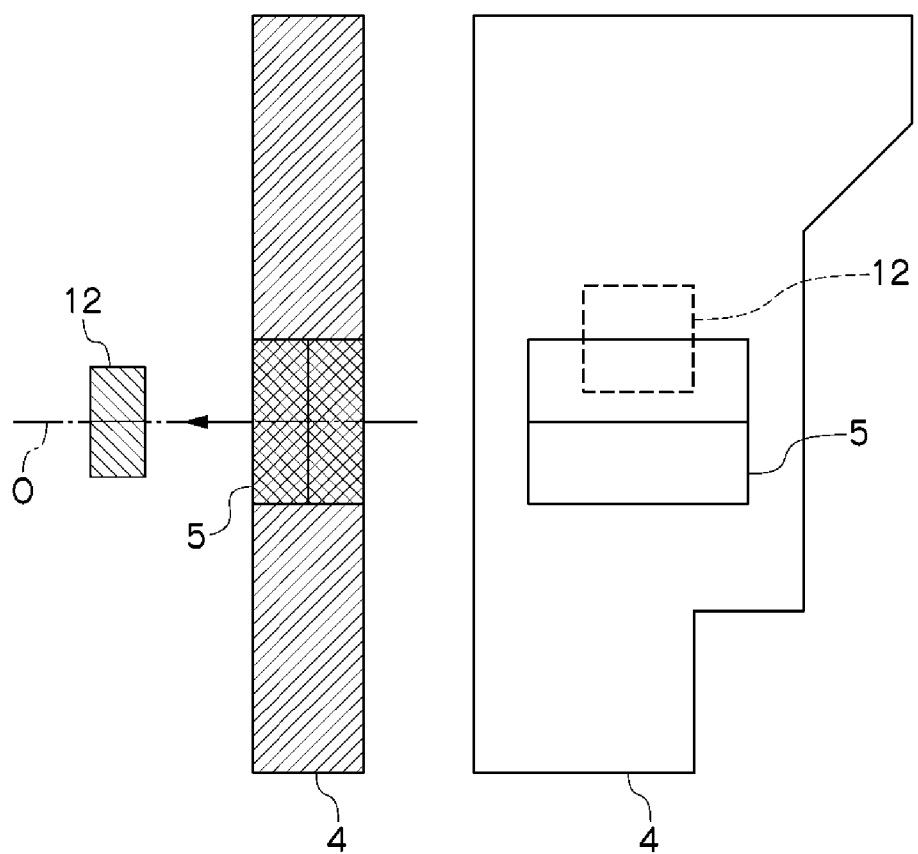

FIG. 47(a)
FIG. 47(b)
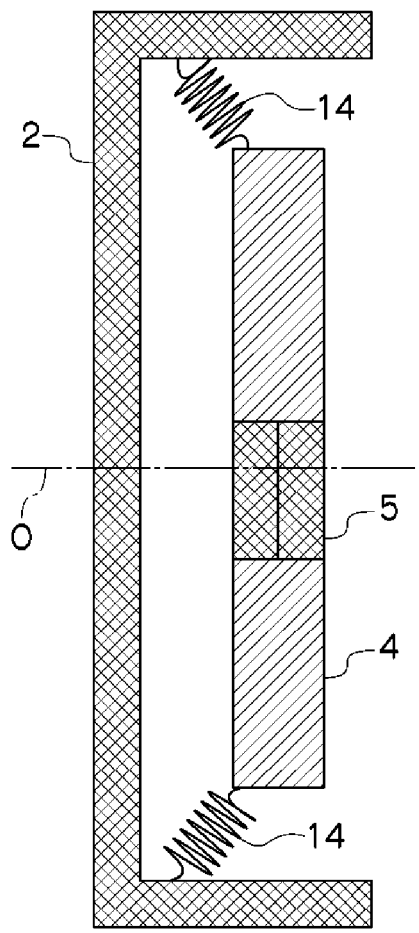
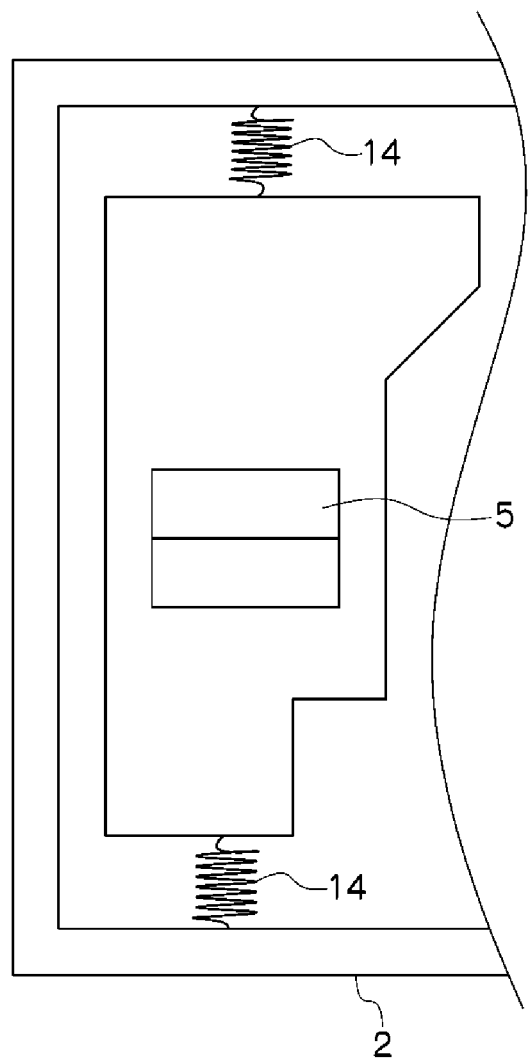

FIG. 48(b)  FIG. 48(b)
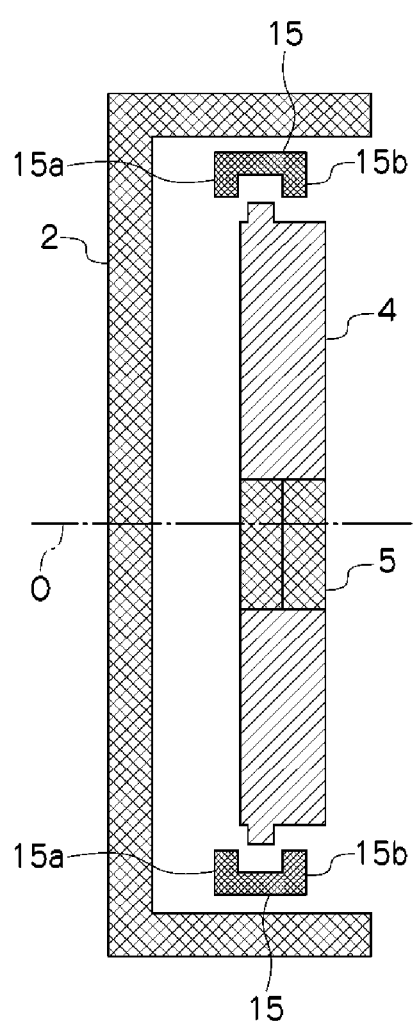
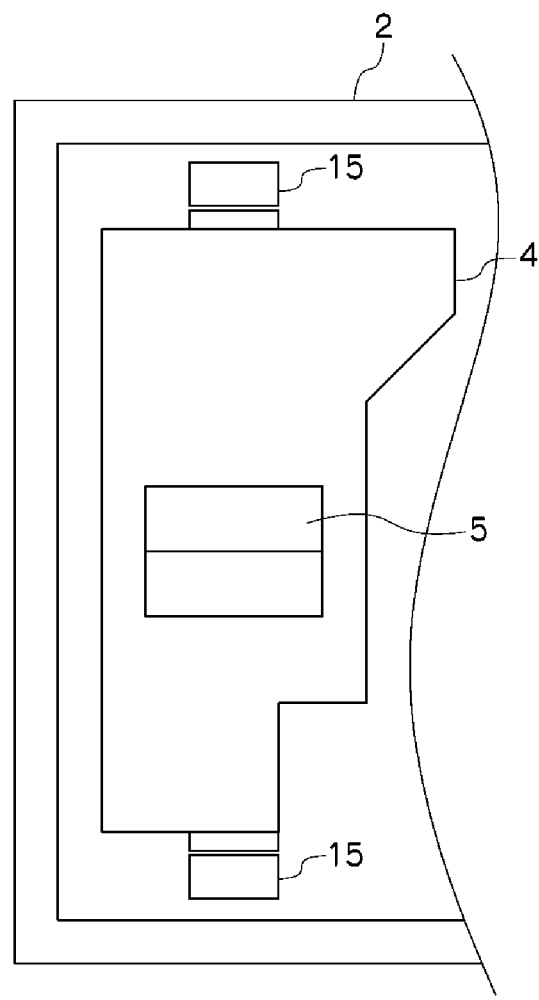

Cross-Sectional Diagram Along the Section X-X

BLADE DRIVING DEVICE FOR HIGH RESOLUTION IMAGING APPARATUS

CROSS REFERENCE TO RELATED PATENT APPLICATIONS

This application is a divisional of U.S. patent application Ser. No. 15/553,931 filed Aug. 25, 2017, which is a U.S. national phase application under 35 U.S.C. § 371 of International Patent Application No. PCT/JP2016/055765, filed Feb. 26, 2016, and claims benefit of priority to Japanese Patent Application No. 2015-039575, filed Feb. 27, 2015; Japanese Patent Application No. 2015-074383, filed Mar. 31, 2015; and Japanese Patent Application No. 2015-074384, filed Mar. 31, 2015; Japanese Patent Application No. 2015-074385, filed Mar. 31, 2015; Japanese Patent Application No. 2015-090750, filed Apr. 27, 2015; and Japanese Patent Application No. 2015-090752, filed Apr. 27, 2015; Japanese Patent Application No. 2015-102182, filed May 19, 2015; Japanese Patent Application No. 2015-128507, filed Jun. 26, 2015; Japanese Patent Application No. 2015-179912, filed Sep. 11, 2015; and Japanese Patent Application No. 2015-183797, filed Sep. 17, 2015. The entire contents of these applications are hereby incorporated by reference.

FIELD OF TECHNOLOGY

The present invention relates to a blade driving device used in an imaging device, or the like.

BACKGROUND

In an imaging device, or the like, a blade driving device is provided so as to function so as to block light (a shutter function), to adjust the brightness, to be an optical filter, or the like, in front of a focusing optics system. Conventionally, the blade driving device comprises a base plate (a substrate) that has an opening, one or more blade members that slide on the base plate to cover the opening, and an operating mechanism for opening and closing the blade member, and a driving source, such as an electromagnetic actuator, is provided in the operating mechanism.

The blade driving device functions as that which blocks like (a shutter), that which adjusts the brightness, as optical filter, or the like, provided as the stage prior to focusing more a focusing optics system in, for example, a photodetecting unit or a camera unit (including an imaging device), and is driven by an actuator to open/close blade a member in relation to an opening through which light passes, to fully open/fully close the opening, or to adjust the area of the opening.

Use of a linear motor as an actuator for a blade driving device is known (referencing Japanese Unexamined Patent Application Publication 2001-281724). A linear motor is provided with a magnet that is secured to one member, of a stationary base and a driving member for driving a blade member, or secured to the other member thereof, to drive the driving member within a plane (linear driving) through an electromagnetic driving force that is produced when an electric current is applied to the coil.

SUMMARY

In a conventional blade driving device, a movable member, such as a blade member, is supported on a base plate that has an opening, and when the movable member is moved along the base plate by opening or closing of an operating mechanism, there is a problem in that the movable member cannot be moved smoothly due to friction because of the surface contact of the movable member. Because of this, in the actuating mechanism of the blade driving device, it is necessary to have an actuator that generates a relatively large torque in order to open and close the blade member, and thus there is a problem in that this increases the size of the actuator, preventing the blade driving device as a whole from being sufficiently thin.

Moreover, there is the need for control that not only switches the opening/closing state of the blade member between two states, that is, the open state and the closed state, but that also opens and closes the blade member in stages; however, in this case there is a problem in that the friction of the surface contact of the movable member makes a highly accurate control of the opening and closing difficult. In particular, because, of necessity, the driving stroke of the actuator must be small in a blade driving device that is equipped in a camera unit that is installed in a mobile device, performing continuous blade member operational control with higher resolution during the small driving stroke requires the ability to move more smoothly the movable member that includes the blade member.

Moreover, in the operating mechanism for a blade driving device, the driving by the actuator is transmitted to the blade member through another member, and a mechanism is employed that amplifies the driving stroke of the actuator and transmits it to the blade member, that changes the direction of the driving stroke of the actuator when moving the blade member, or the like. In such operating mechanisms, linking portions between different members are structured through, for example, elongated holes and shaft portions that are fitted therein, and it is necessary to provide some degree of play in the fit therebetween. However, when there is such play in a linking portion, movement is produced in the blade member caused by a change in the direction in which gravity acts, due to a change in orientation, or caused by camera shaking, or the like, and thus there is a problem in that this interferes with accurate control of the opening/closing state of the blade member.

Moreover, there is a strong demand for miniaturization and reduction of thickness in, for example, photodetector units and camera units that are installed in the mobile electronic devices that have become so popular in recent years, requiring, of course, miniaturization and thickness reduction in the blade driving devices that are equipped therein. On the other hand, there is a demand for high-speed and high-resolution control unit controlling the opening in the blade driving device, and an adequately strong driving force is required in the actuator in order to achieve such control.

The blade driving device that uses a linear motor as an actuator, as described above, is able to produce a reduction in thickness, but, in order to increase the driving force, requires a plurality of actuators that are equipped with coils and magnets. In a conventional blade driving device, the driving force has been increased through distributed placement of such actuators. When the driving force of the actuators is increased through such distributed placement, there is a problem in that this is incompatible with the need for miniaturization, due to the increase in the space required for installing the actuators.

Because mobile electronic devices are driven primarily by batteries, there is the need to reduce as far as possible the electric power consumed by the actuators in the mobile electronic device. In regards to this, with distributed placement of actuators, as described above, the consumption of electric power is not always efficient, despite the ability to increase the driving force. When a blade driving device is installed in a mobile electronic device, there is the need both to improve the driving force and to conserve electric power, through efficient consumption of electric power.

In the present invention, the handling of such problems is an example of the problem to be solved. That is, objects of the present invention are to enable continuous operational control of blade members with high resolution and good accuracy, to prevent play in the linking portion between members, to enable accurate control of the opening/closing state of the blade member, and the like.

Moreover, another object of the present invention is a reduction in thickness, and to achieve both an improvement in the driving force and conservation of electric power, through the provision of an actuator that is capable of an adequate driving force wherein high-speed and high-resolution opening control is possible in a blade driving device.

In order to achieve such an object, the blade driving device according to the present invention is provided with the following structures:

A blade driving device comprising: a base member that has an opening; one or a plurality of blade members that operates so as to advance into the opening or withdraw from the opening; and a driving member that moves within a plane that is perpendicular to an optical axis that passes through the opening, to drive the blade member, or that is the blade member itself, wherein: the driving member is supported in a state wherein it is separated from the base member.

A blade driving device comprising: a base member that has an opening; one or a plurality of blade members that operates so as to advance into the opening or withdraw from the opening; and a driving member that moves within a plane that is perpendicular to an optical axis that passes through the opening, to drive the blade member, wherein: the driving member is supported on the base member in a state wherein the driving member is separated from the base member, and the driving member is connected to the blade member through a connecting member, where a linking portion, for preventing connection play, is provided between the driving member and the connecting member.

A blade driving device comprising: a base member that has an opening; one or a plurality of blade members that operates so as to open and close the opening; and a driving member that moves within a plane that is perpendicular to an optical axis that passes through the opening to drive the blade member; along with a driving source for the driving member, configured from a coil that is provided on one member, of the base member and the driving member, and a magnet that is provided on the other member, of the base member and the driving member, wherein: the magnet comprises a unit magnetized portion that is magnetized along the optical axial direction; and in the coil, a coil portion that has a pair of linear parts that produces a driving force through the application of an electric current is disposed over the magnet, where two linear parts having identical directions for the directions with which the electric current is applied are disposed in relation to at least one unit magnetized portion.

Because in the blade driving device according to the present invention, having the distinctive features described above, the driving member for driving the blade member is supported in a state that is separate from the base member, the movable members in the blade driving device can be moved smoothly, enabling continuous operational control of the blade member to be carried out with high resolution and good accuracy, even when achieving miniaturization and thickness reduction of the blade driving device.

Moreover, this enables control of the state of opening/closing of the blade member with good accuracy, through preventing play in the linking portions between members in the blade driving device.

The blade driving device is provided with a driving source that produces a driving force that is adequate to enable high-speed and high-resolution opening control, enabling miniaturization and a reduction in thickness. Moreover, this enables achievement of both an improvement in the driving force and conservation of electric power.

BRIEF DESCRIPTIONS OF THE DRAWINGS

FIG. 2(b) is an explanatory diagram depicting a side view of an example of a blade driving device according to an example according to the present invention.

Figure 30A:
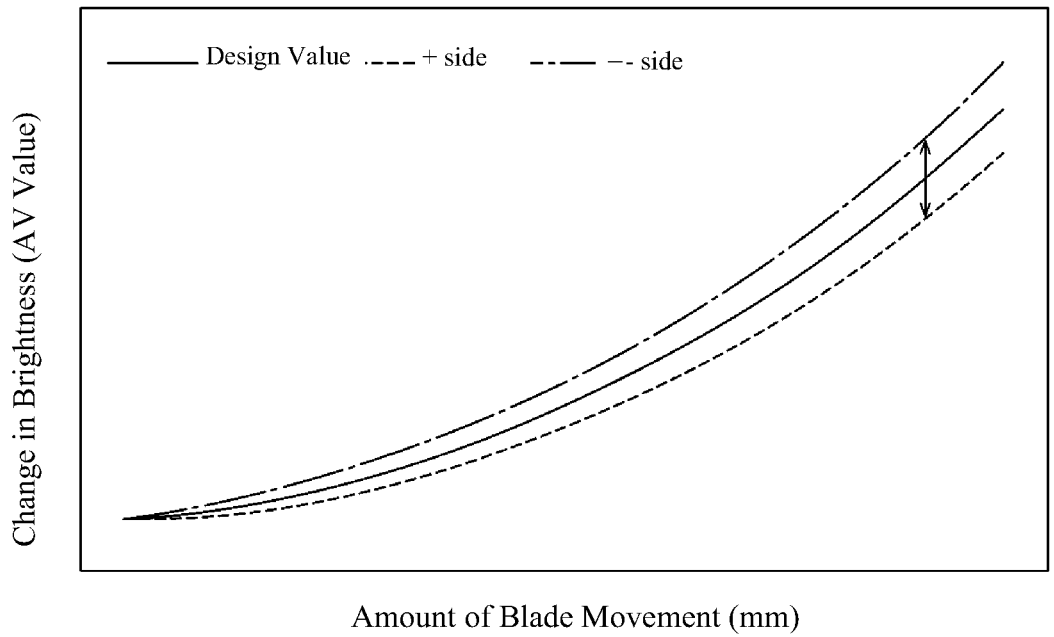
Figure 30B:
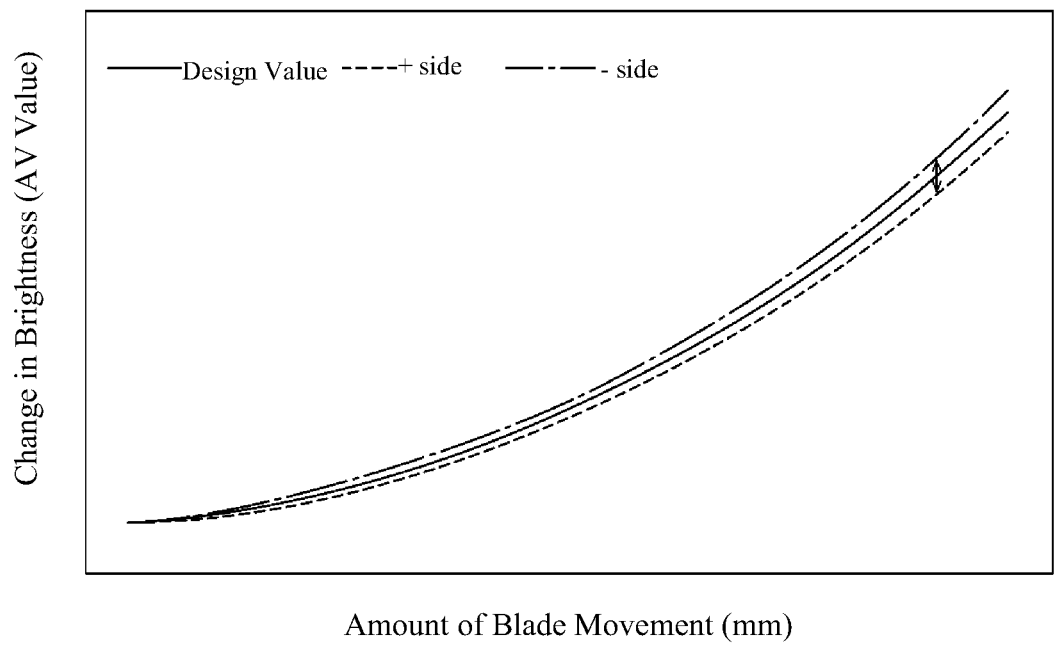

FIGS. 30(a) and (b) are graphs depicting the effects when elastic member is provided in the connecting portion (the linking portion). Wherein FIG. 30(a) is a case wherein the elastic member is not provided, and FIG. 30(b) is a case wherein the elastic member is provided.

Figure 31:
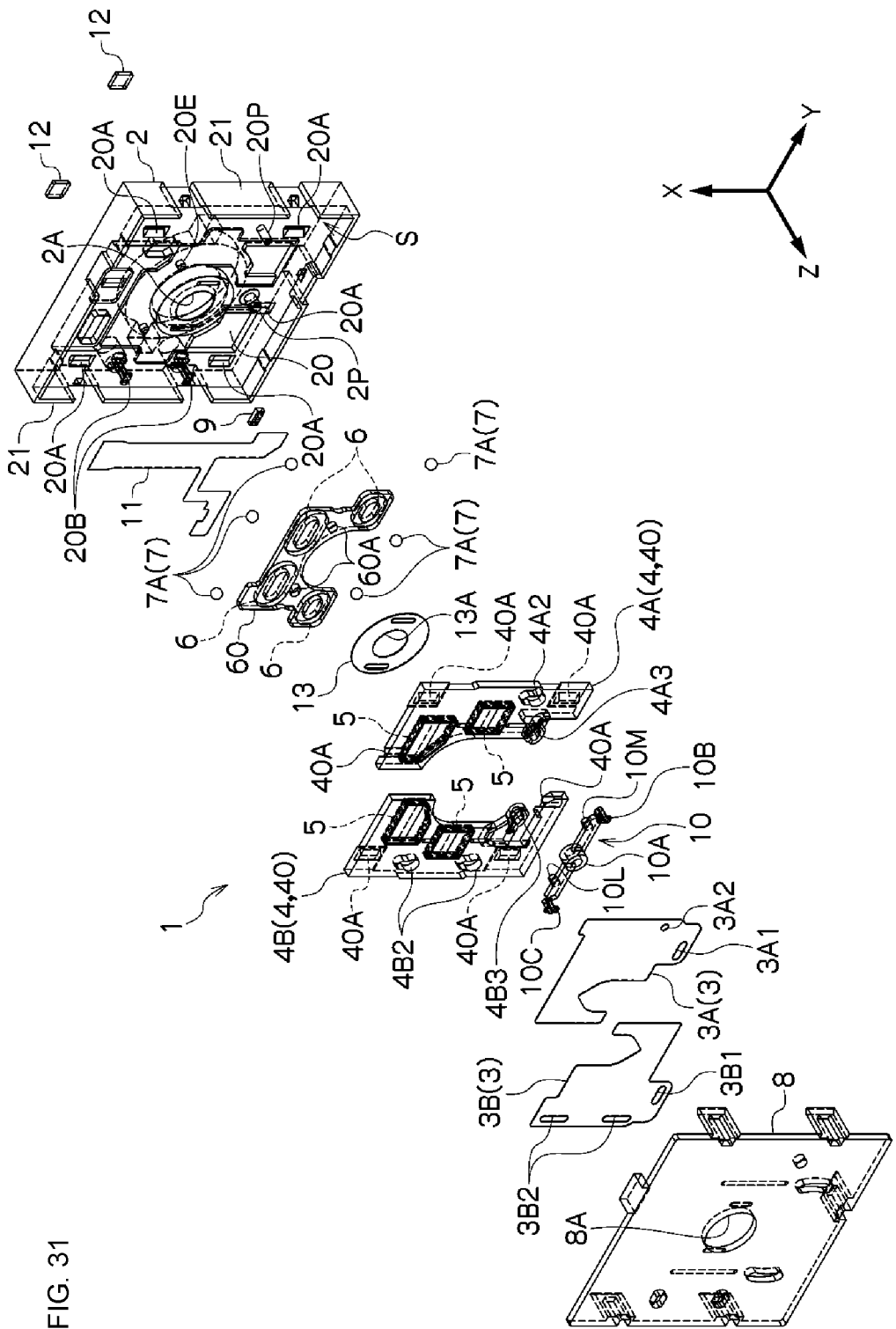

FIG. 31 is an exploded perspective diagram depicting an example of a blade driving device according to an example according to the present invention.

Figure 32:
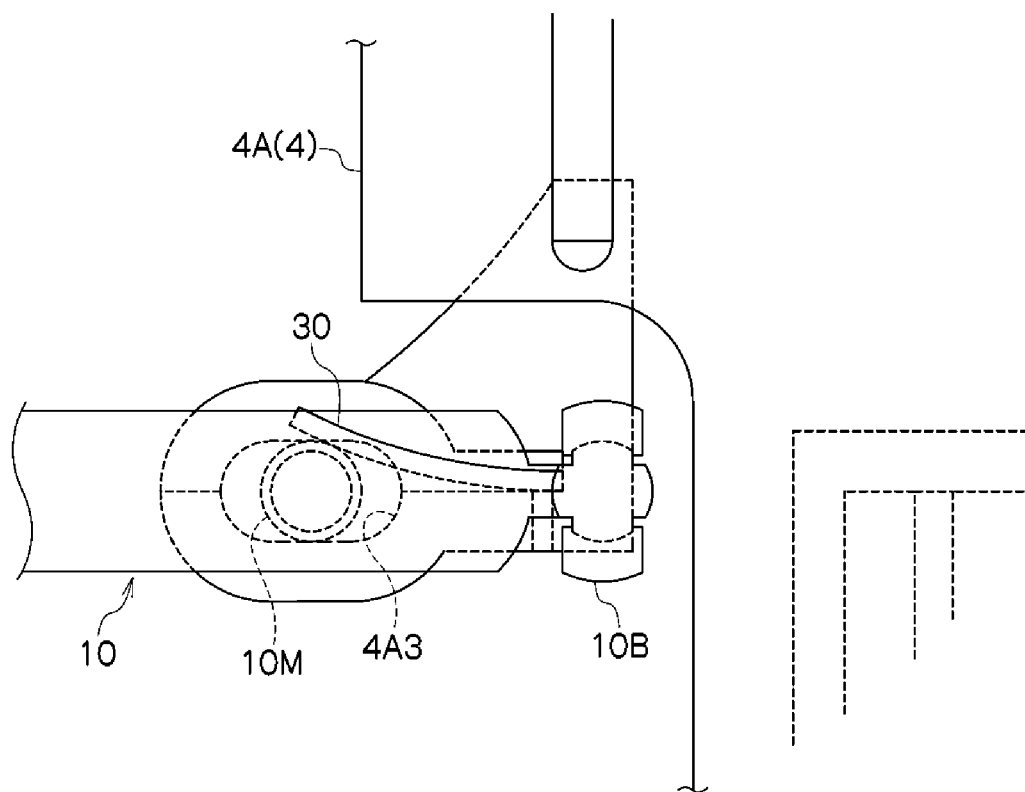

FIG. 32 is an explanatory diagram (a partial enlarged view) of an example wherein an operating lever (a connecting member) is provided.

Figure 33:
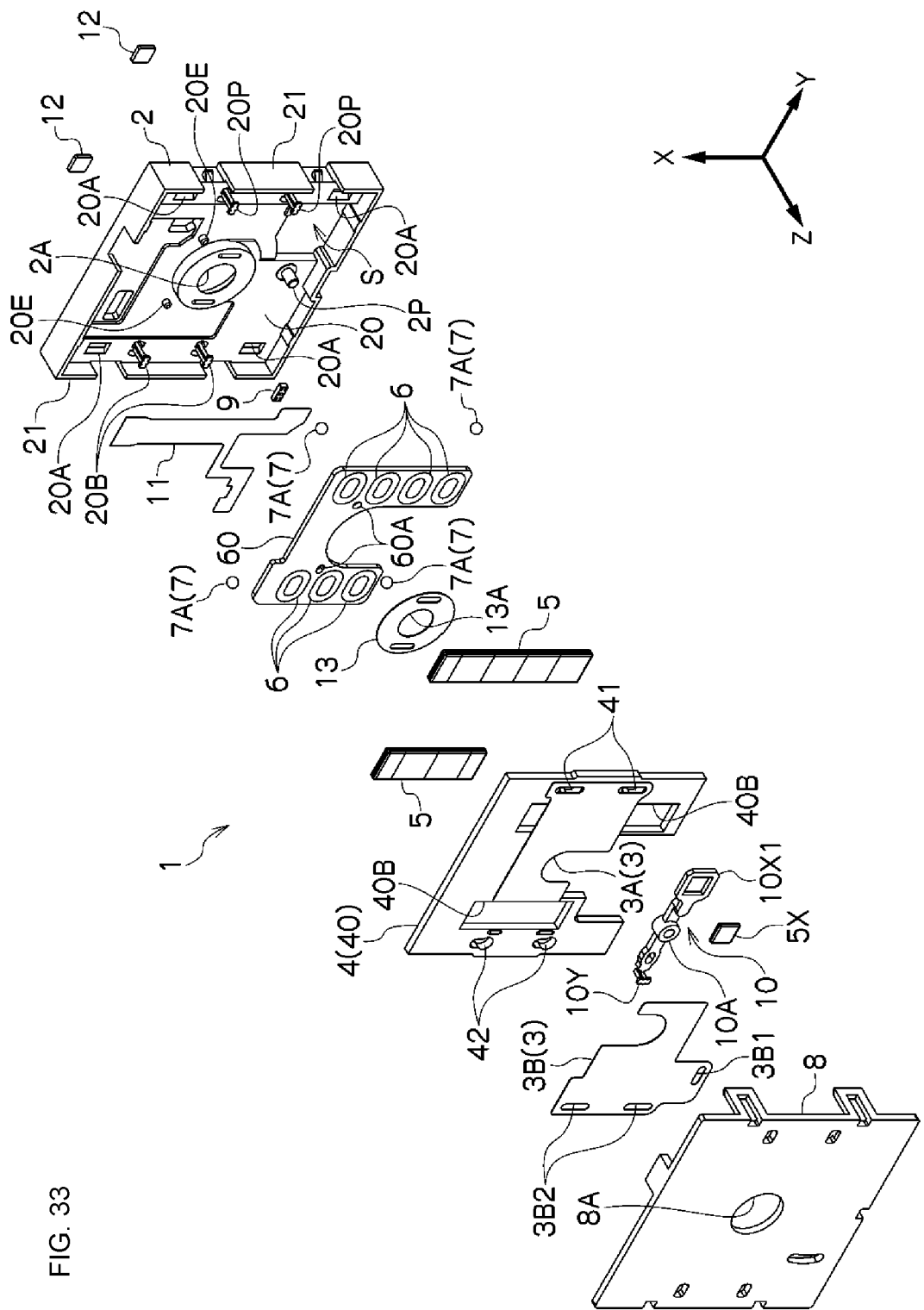

FIG. 33 is an exploded perspective diagram depicting an example of a blade driving device according to an example according to the present invention.

Figure 34:
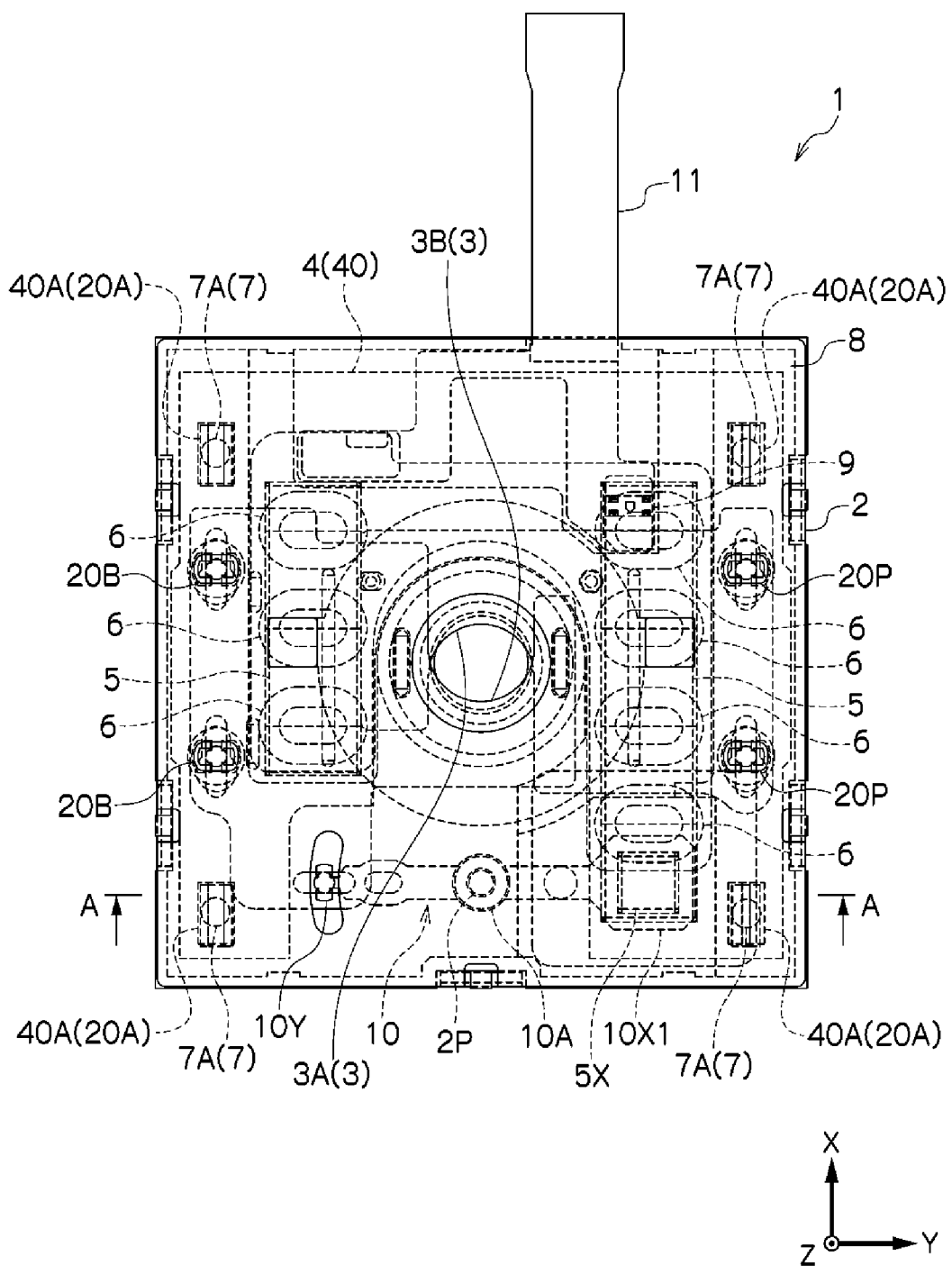

FIG. 34 is a plan view depicting an example of a blade driving device according to an example according to the present invention.

Figure 35:
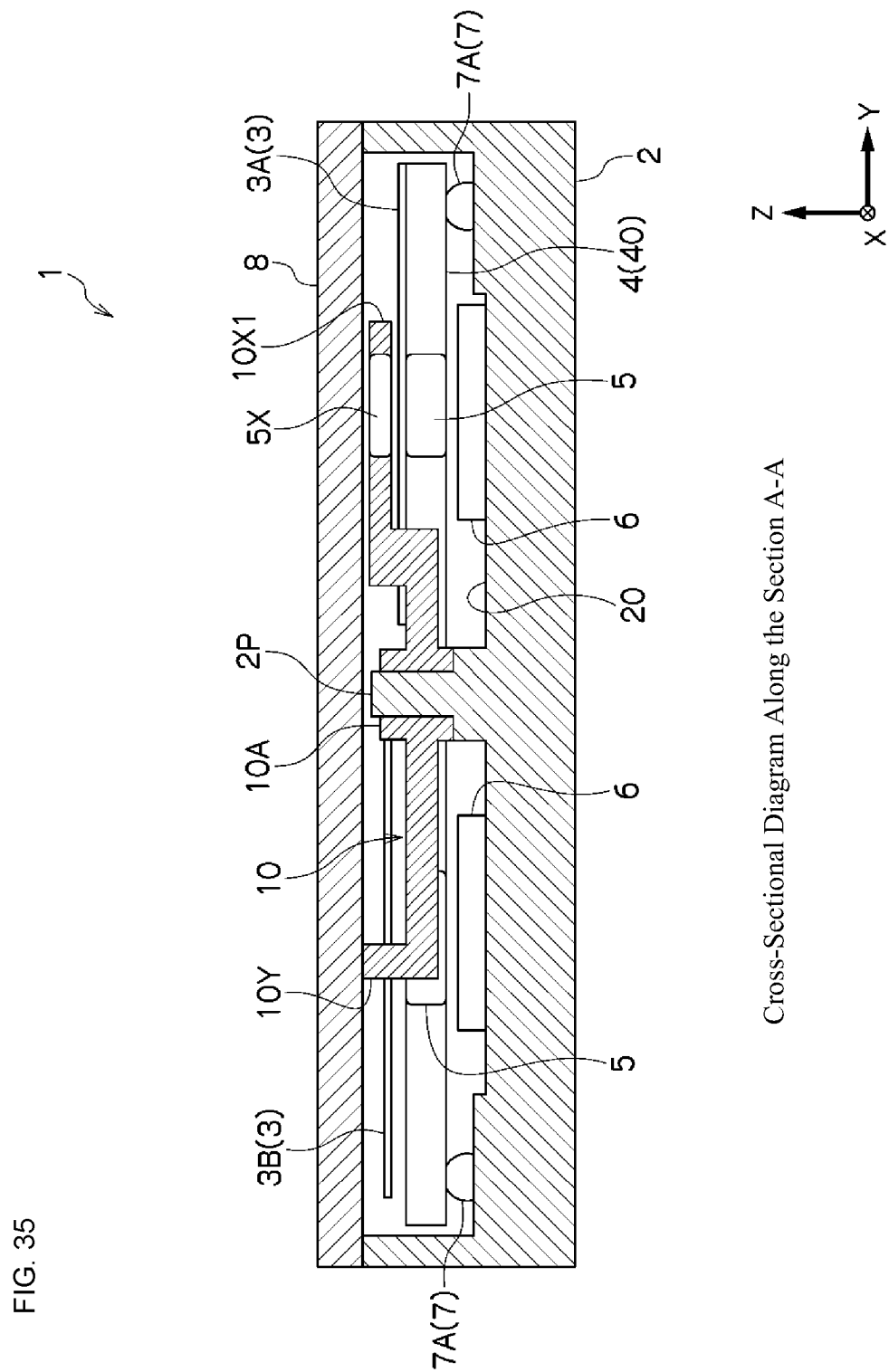

FIG. 35 is a cross-sectional view depicting an example of a blade driving device according to an example according to the present invention.

Figure 36:
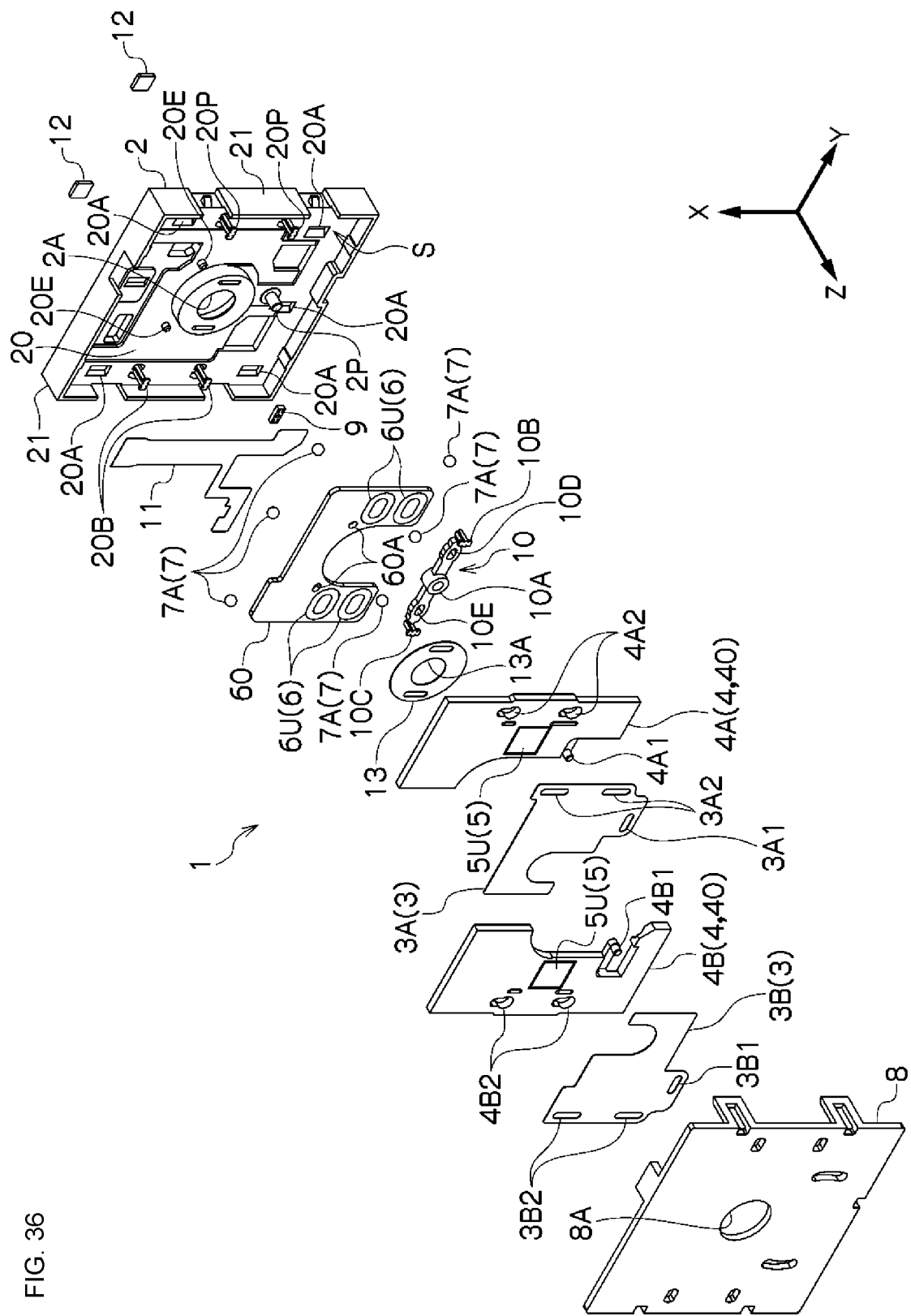

FIG. 36 is an exploded perspective diagram depicting an example of a blade driving device according to an example according to the present invention.

Figure 37:
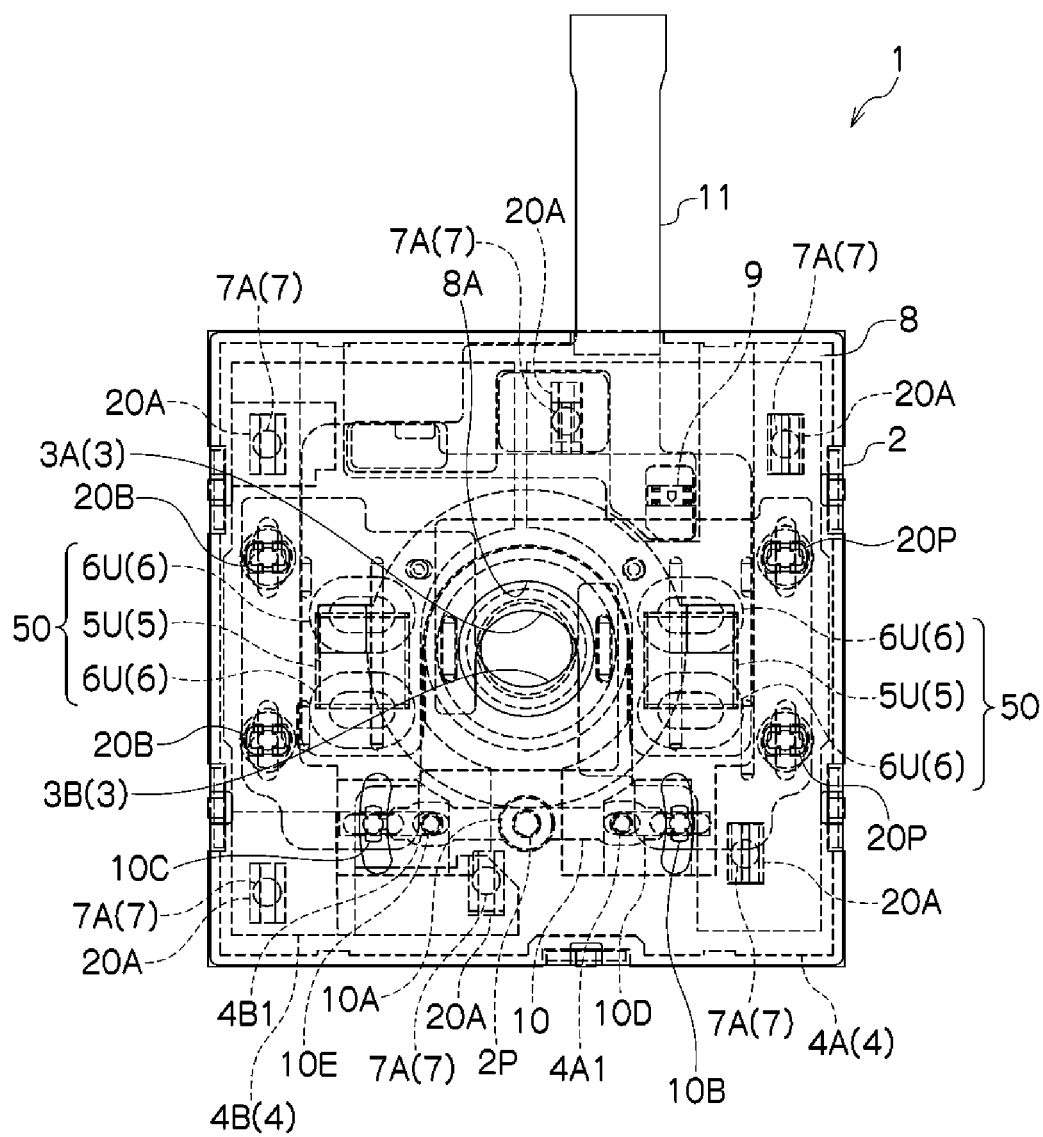

FIG. 37 is a plan view depicting an example of a blade driving device according to an example according to the present invention.

Figure 38A:
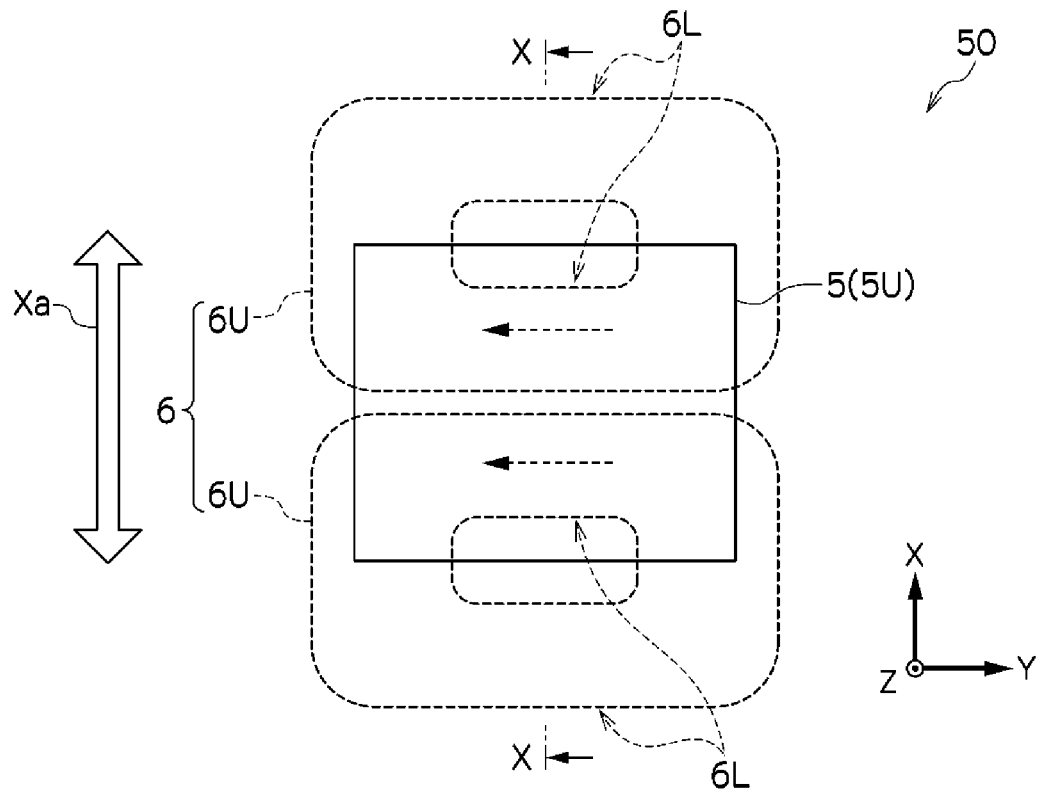

FIG. 38(a) is an explanatory diagram illustrating a plan view of an example configuration of a driving source in the blade driving device (wherein (a) is a plan view explanatory diagram, and (b) is a cross-sectional view along X-X thereof).

Figure 38B:
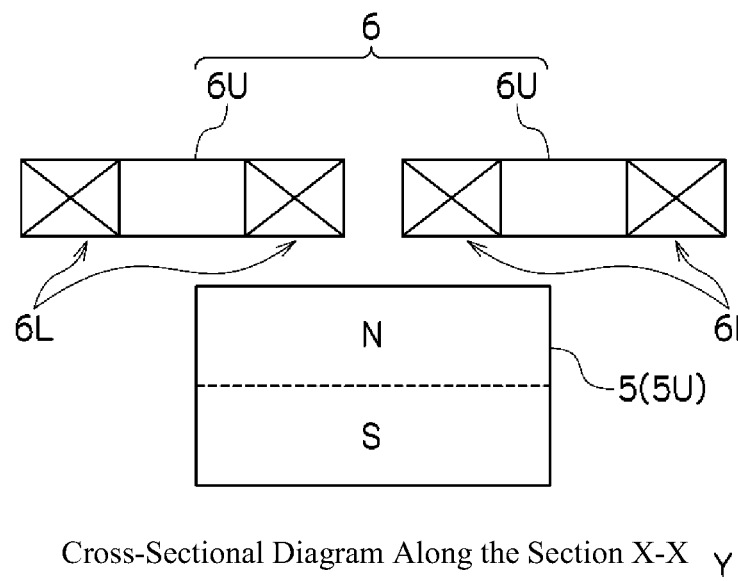

FIG. 38(b) is an explanatory diagram illustrating a cross-sectional view along X-X thereof of an example configuration of a driving source in the blade driving device.

Figure 39A:
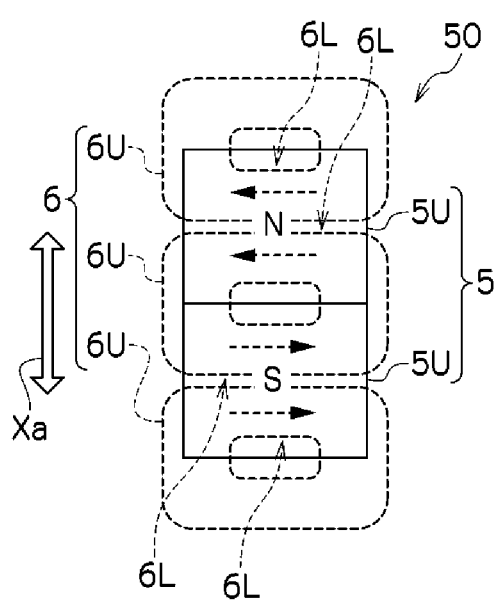

FIG. 39(a) is an explanatory diagrams illustrating an example configuration of a two unit magnetized portion driving source in a blade driving device.

Figure 39B:
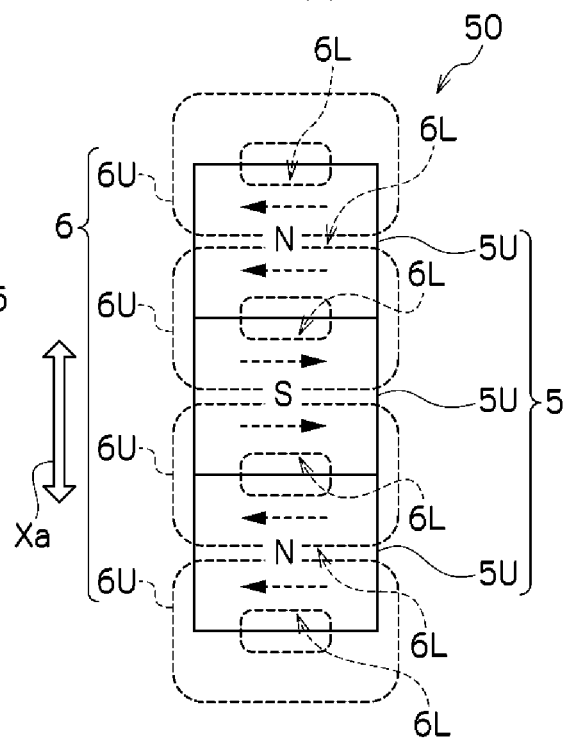

FIG. 39(b) is an explanatory diagram illustrating an example configuration of a three unit magnetized portion driving source in a blade driving device.

Figure 39C:
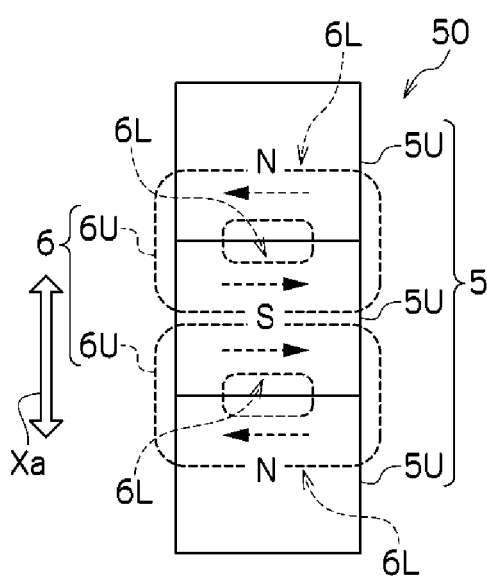

FIG. 39(c) is an explanatory diagram illustrating an example configuration of a three unit magnetized portion driving source in a blade driving device.

Figure 39D:
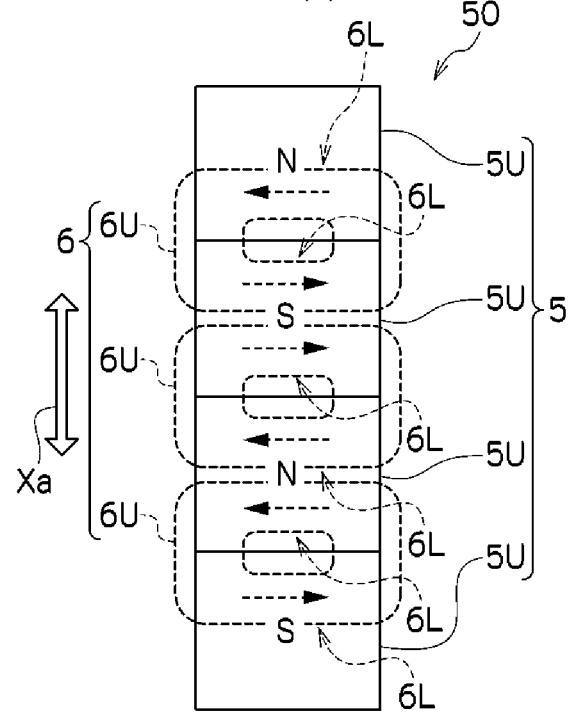

FIG. 39(d) is an explanatory diagram illustrating an example configuration of a four unit magnetized portion driving source in a blade driving device.

Figure 40:
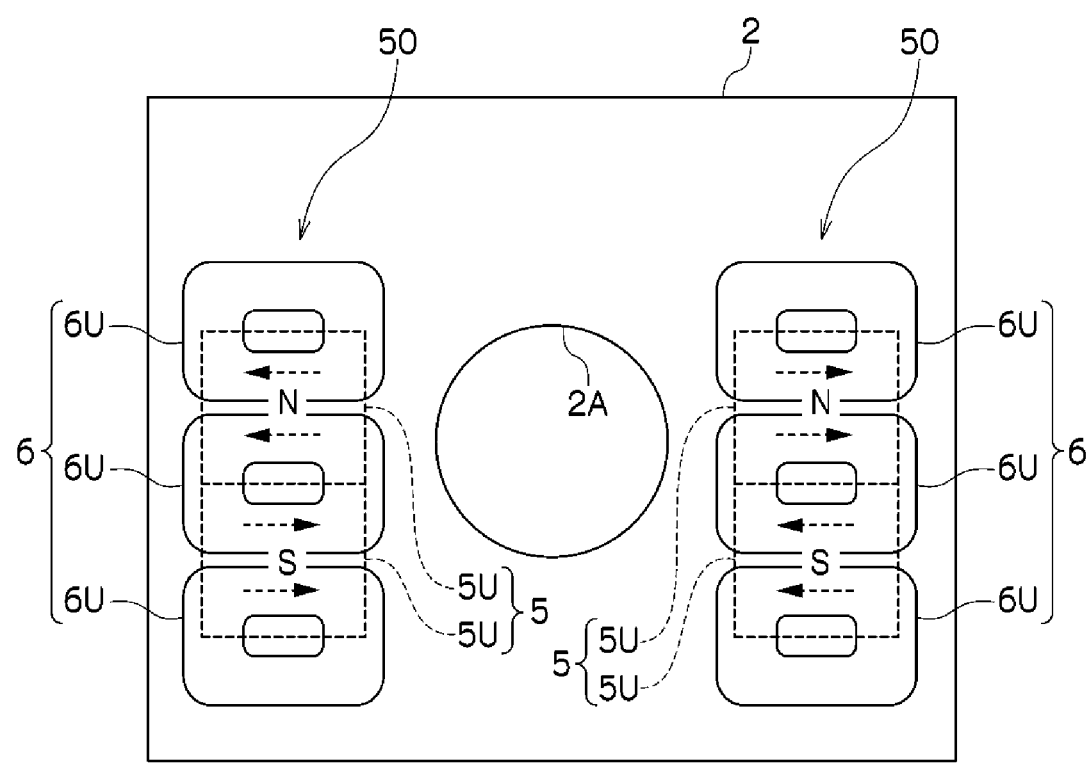

FIG. 40 is an explanatory diagram depicting an example configuration of a driving source in the blade driving device.

FIG. 41(a) is an explanatory diagrams depicting other example configurations of driving sources in the blade driving device depicted in FIG. 39 (c).

FIG. 41(b) is an explanatory diagram depicting other example configurations of driving sources in the blade driving device depicted in FIG. 39 (d).

Figure 42:
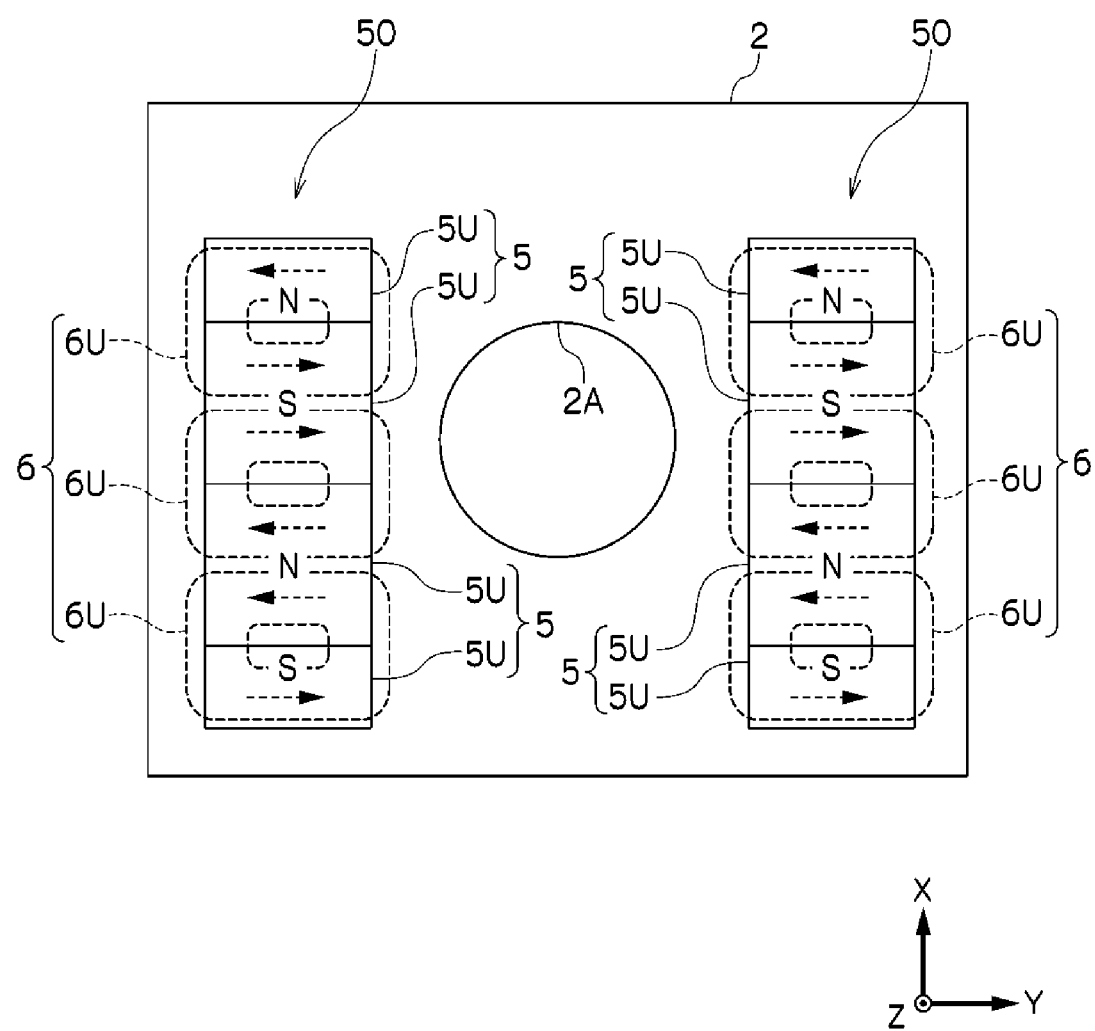

FIG. 42 is an explanatory diagram depicting an example configuration of a driving source in the blade driving device.

Figures 43A, 43B:
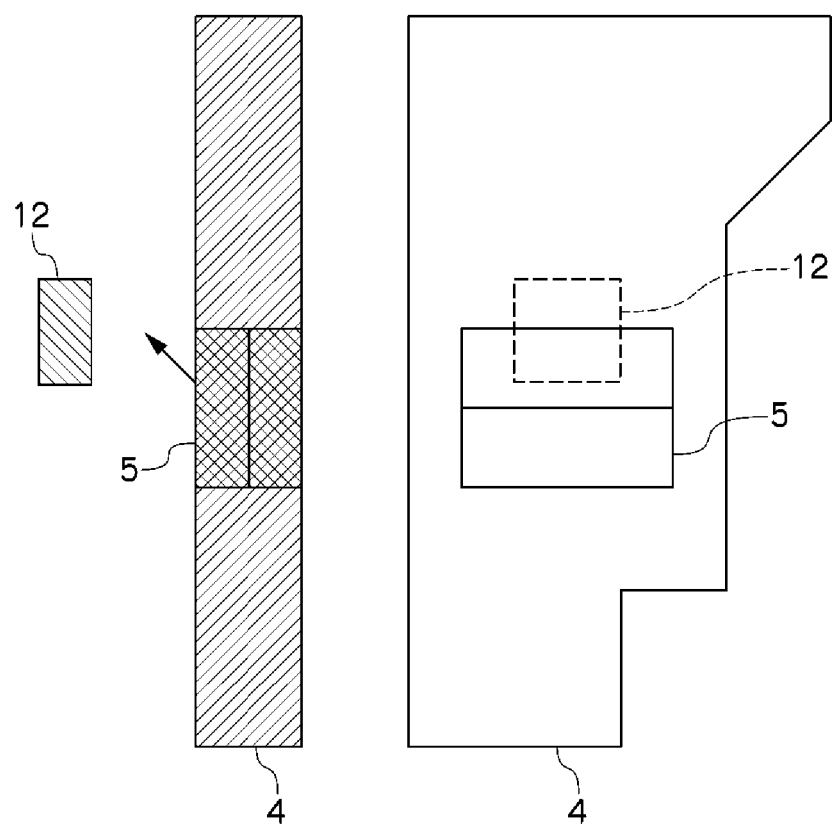

FIG. 43(a) is a cross-sectional explanatory diagrams depicting positional relationships between back yokes and magnets, with which the driving means for the blade driving device are.

FIG. 43(b) is a planar explanatory diagram depicting positional relationships between back yokes and magnets, with which the driving means for the blade driving device are equipped.

FIG. 44(a) is a cross-sectional explanatory diagrams depicting positional relationships between back yokes and magnets, with which the driving means for the blade driving device are equipped.

FIG. 44(b) is a planar explanatory diagram depicting positional relationships between back yokes and magnets, with which the driving means for the blade driving device are equipped.

Figures 45A, 45B:
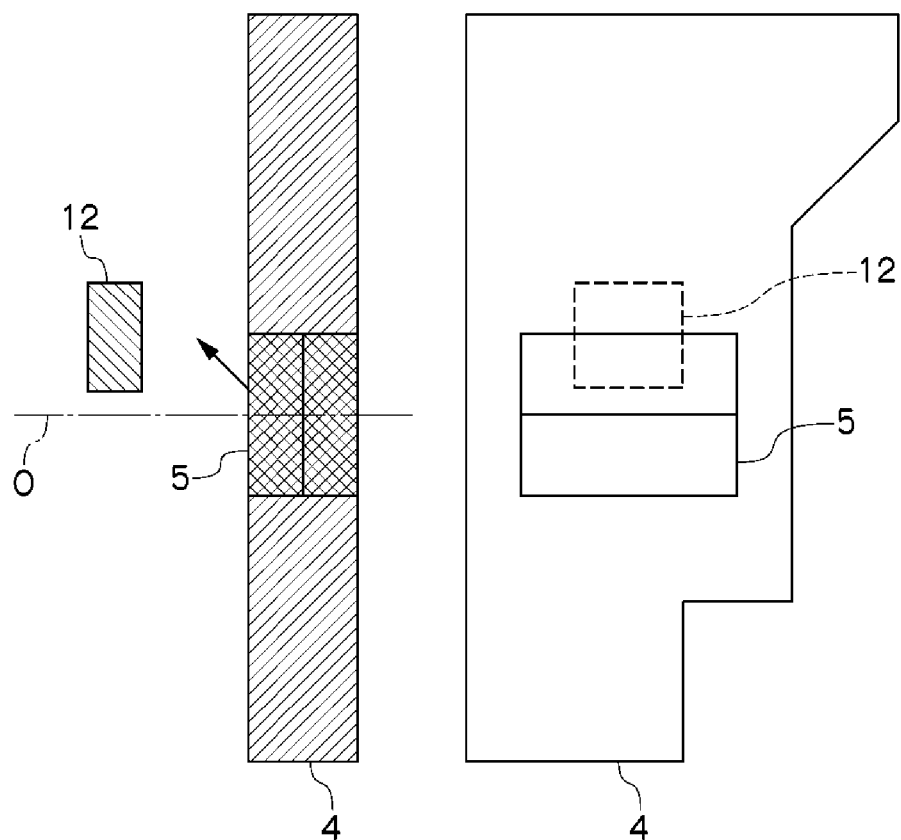

FIG. 45(a) is a cross-sectional explanatory diagrams depicting positional relationships between back yokes and magnets, with which the driving means for the blade driving device are equipped.

FIG. 45(b) is a planar explanatory diagram depicting positional relationships between back yokes and magnets, with which the driving means for the blade driving device are equipped.

FIG. 46(a) is a cross-sectional explanatory diagrams depicting positional relationships between back yokes and magnets, with which the driving means for the blade driving device are equipped.

FIG. 46(b) is a planar explanatory diagram depicting positional relationships between back yokes and magnets, with which the driving means for the blade driving device are equipped.

FIG. 47(a) is a cross-sectional explanatory diagrams depicting examples wherein the driving member is held on the base member through a spring force.

FIG. 47(b) is a planar explanatory diagram depicting examples wherein the driving member is held on the base member through a spring force.

FIG. 48(a) is a cross-sectional explanatory diagrams depicting an example of detecting means for the blade driving device.

FIG. 48(b) is a planar explanatory diagram depicting an example of detecting means for the blade driving device.

Figure 49A:
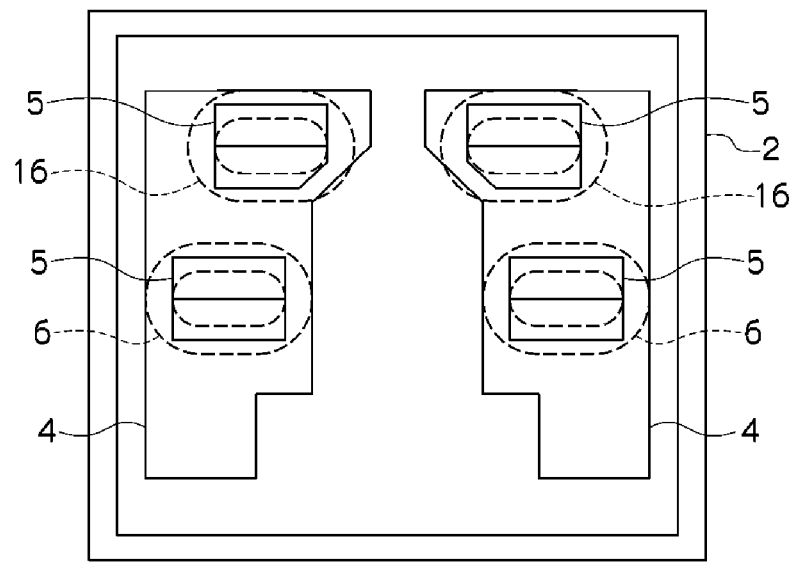

FIG. 49(a) is an explanatory diagrams depicting an example of detecting means in a blade driving device.

Figure 49B:
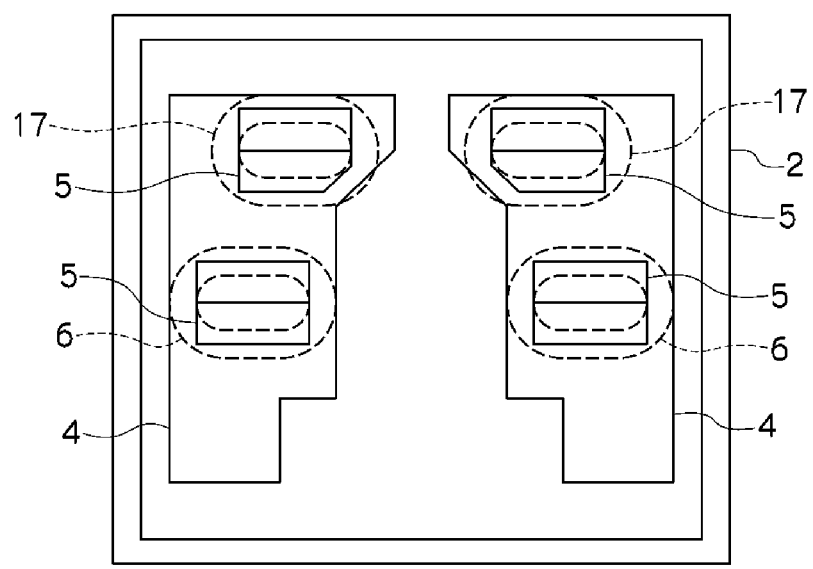

FIG. 49(b) is an explanatory diagram depicting an example of detecting means in a blade driving device wherein a coil is used for driving.

Figure 50A:
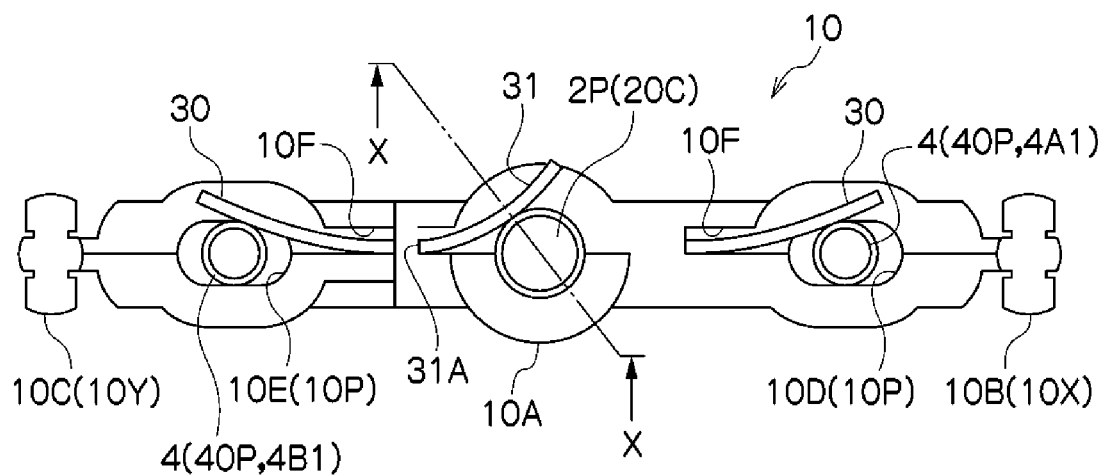

FIG. 50(a) is an explanatory diagrams depicting a specific example configuration for the operating lever (the connecting member).

Figure 50B:
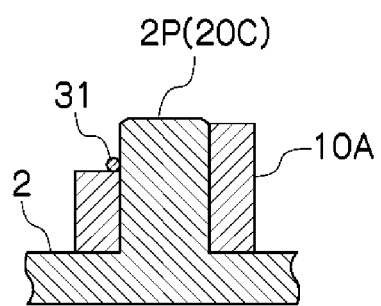

FIG. 50(b) is an explanatory diagram depicting a cross-sectional view along the section X-X thereof of a specific example configuration for the operating lever (the connecting member).

Figure 51:
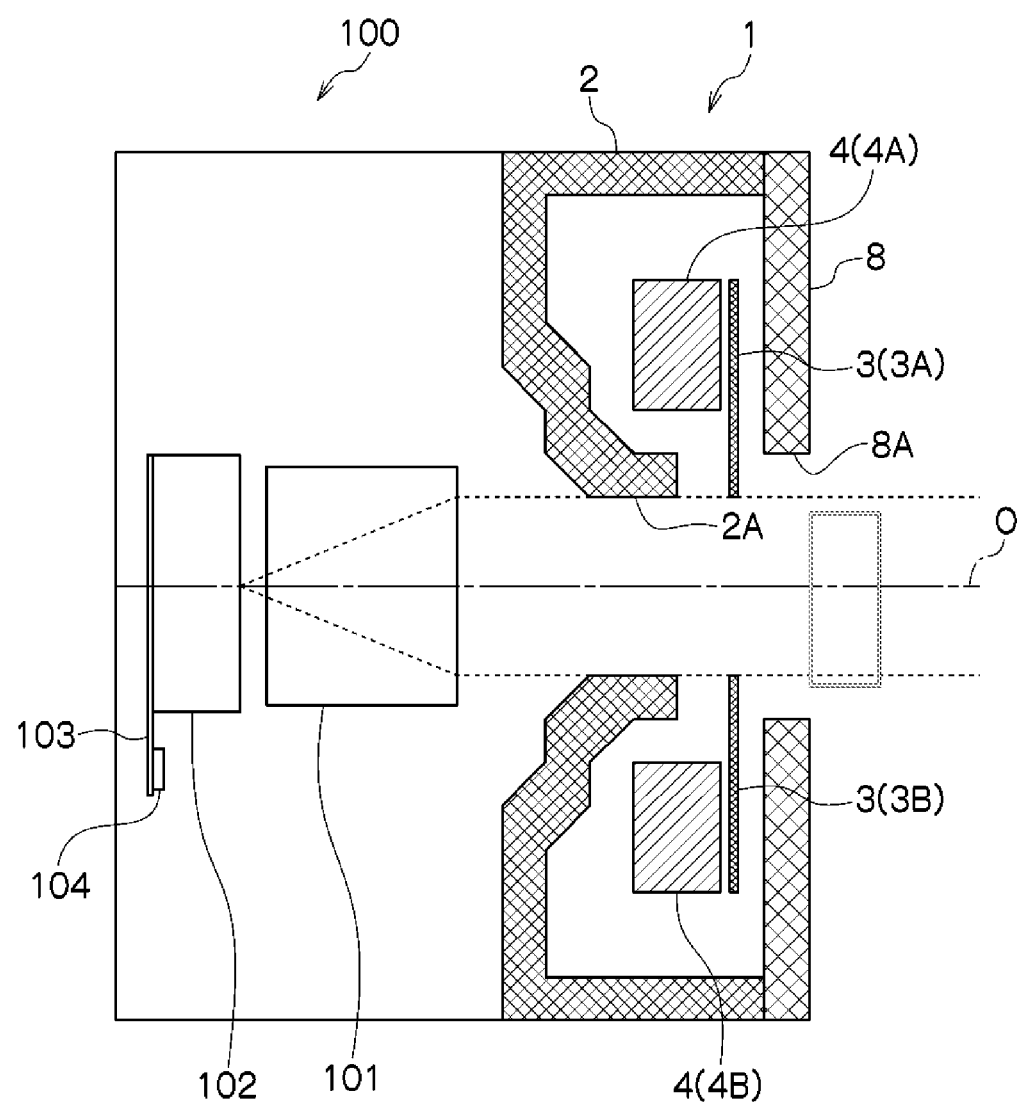

FIG. 51 is an explanatory diagram depicting a camera unit equipped with a blade driving device according to an example according to the present invention.

Figure 52:
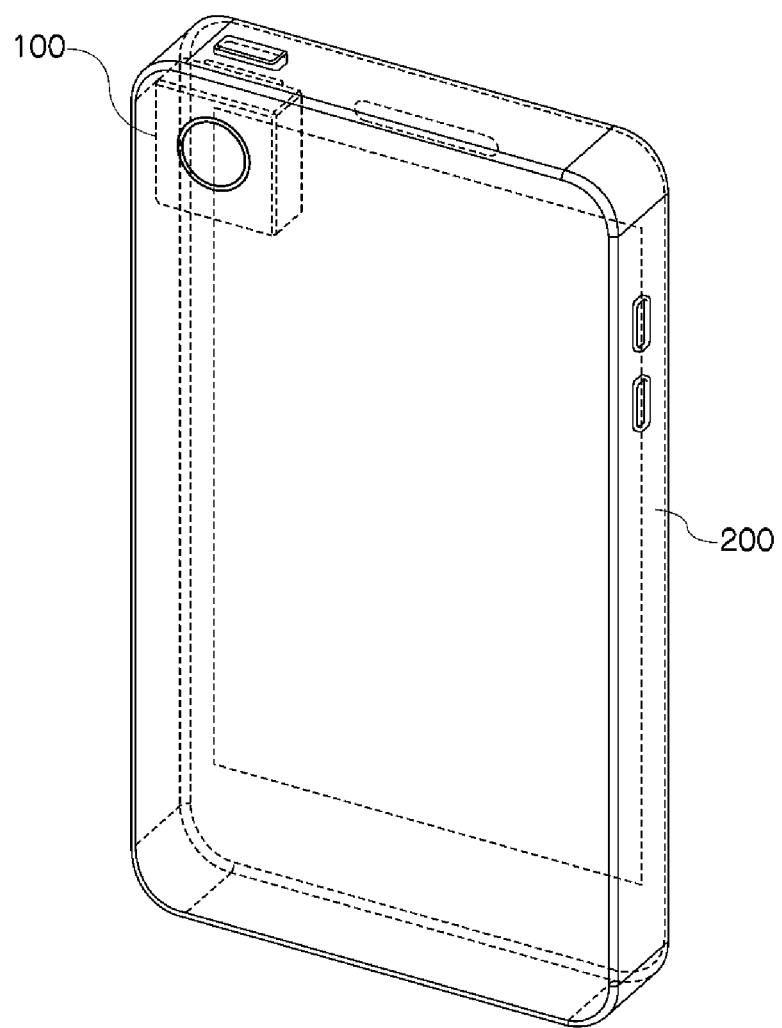

FIG. 52 is an explanatory diagram depicting a mobile electronic device in which is equipped a camera unit comprising a blade driving device according to an example according to the present invention.

DETAILED DESCRIPTION

Examples according to the present invention will be explained below in reference to the drawings. In the explanations below, identical reference symbols are assigned for identical positions in the different drawings, and redundant explanations are omitted. In the various drawings, the optical axial direction is defined as the Z direction, an axial direction within a plane that is perpendicular to the optical axis is defined as the X direction, and the direction that is perpendicular to the X direction within the plane that is perpendicular to the optical axis is defined as the Y direction.

Figure 1:
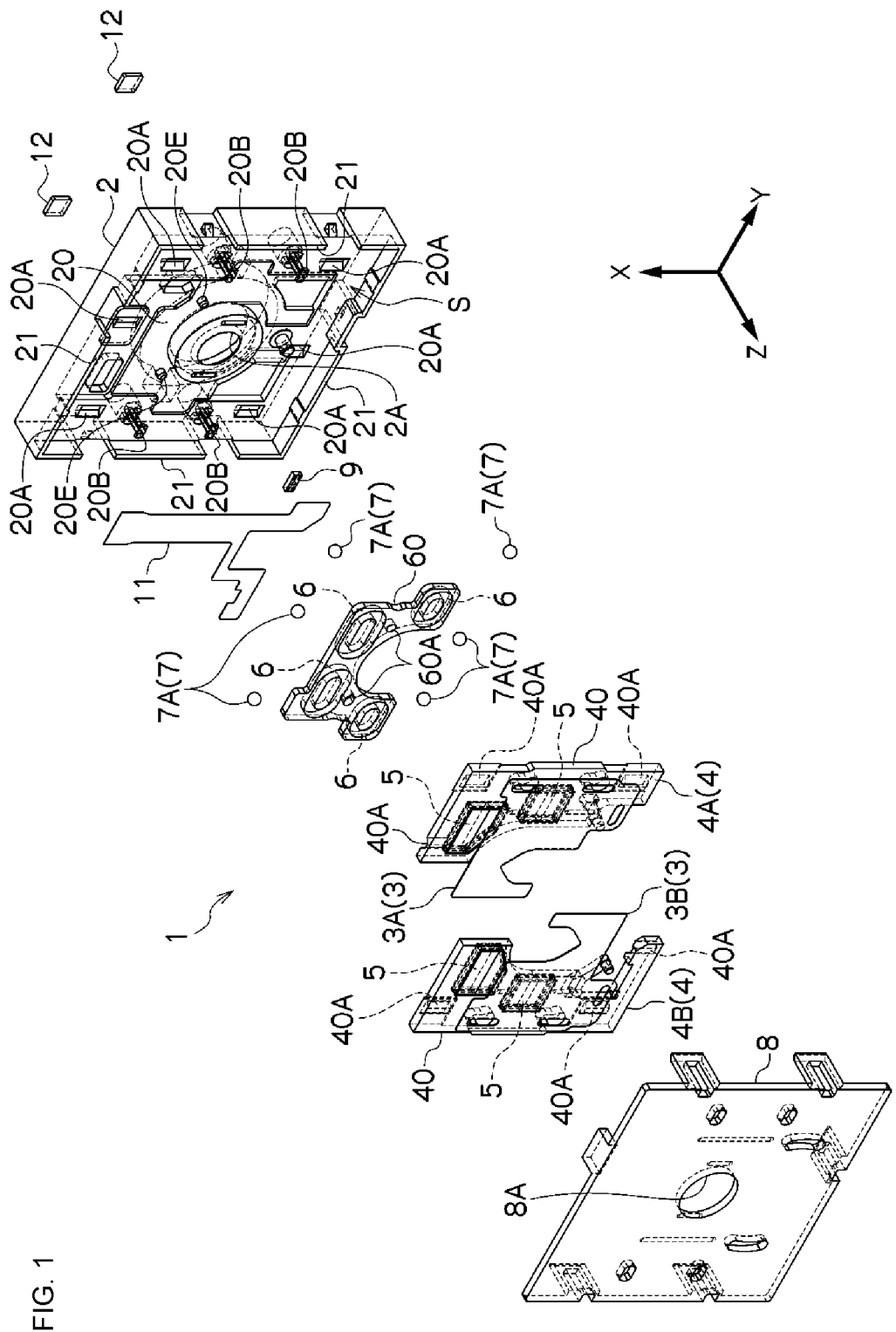
FIG. 1 is an exploded perspective diagram depicting an example of a blade driving device according to an example according to the present invention.
Figure 2:
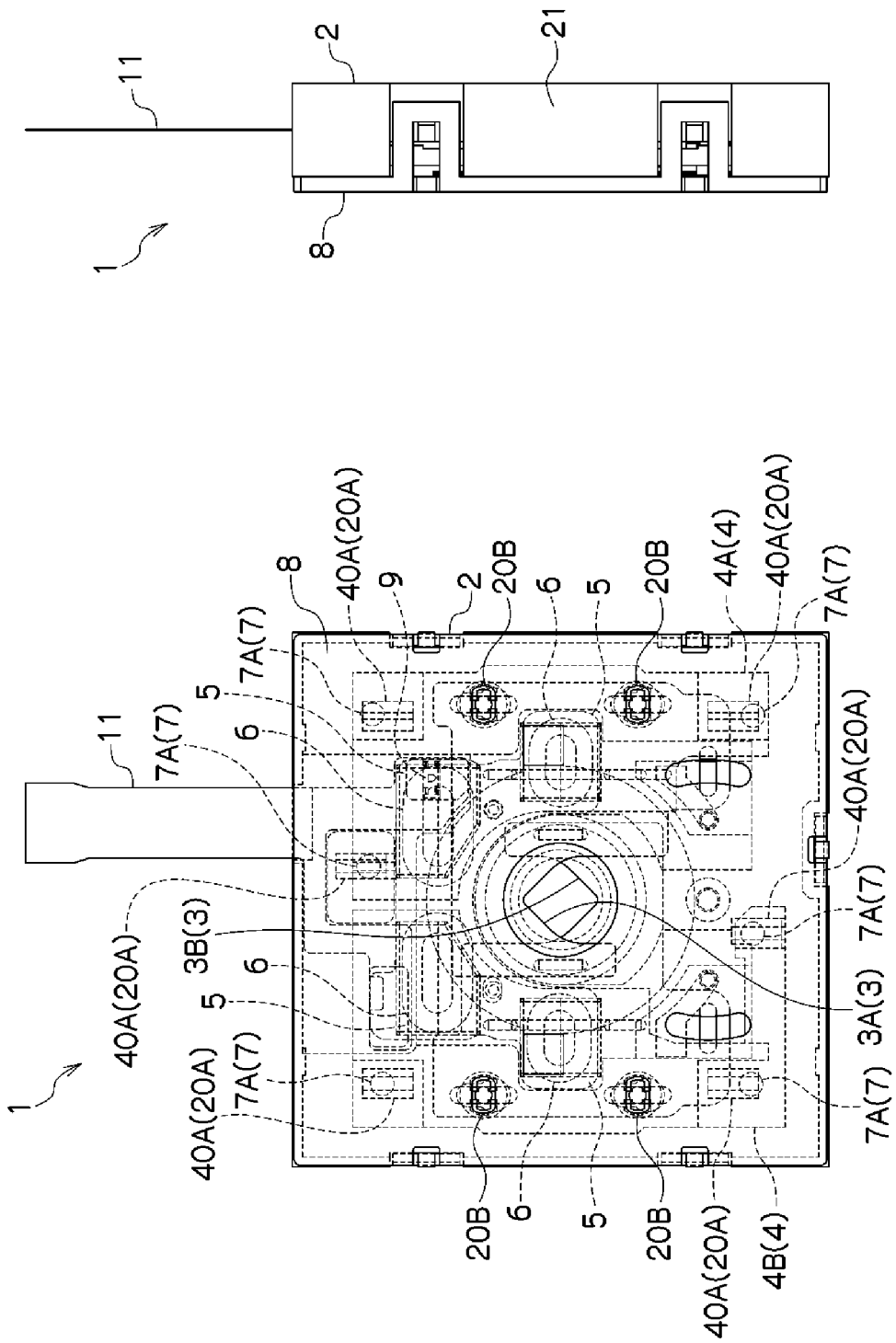
FIG. 2 (a) is an explanatory diagram depicting a plan view of an example of a blade driving device according to an example according to the present invention.

In FIG. 1 and FIG. 2, the blade driving device 1 comprises a base member 2, a blade member 3, a driving member 4, and a supporting member 7. The base member 2 has an opening 2A, and is a member that supports the driving member 4. In the example in the figures, the base member 2 comprises a base plane 20 that has an opening 2A, and a side wall 21 that surrounds the outer periphery of the base plane 20. Here the outside shape of the base member 2 is rectangular, but there is no limitation to being rectangular, and may instead be another shape, such as a circular shape, or the like.

The blade member 3 may be provided singularly, or in a plurality thereof, and is a member that operates so as to to advance into the opening 2A or withdraw from the opening 2A. In the example in the figure, a pair of blade members 3A and 3B is provided, where the two blade members 3A and 3B overlap each other over the opening 2A, and are adjusted variably in order to change continuously the area through which light passes through the opening 2A.

The driving member 4 is a member that moves within a plane (the X-Y) that is perpendicular to the optical axis that passes through the opening 2A (for example, the axis of the opening 2A), to drive the base member 3, and refers to either the actuator itself, or to a driving element of the actuator. The driving member 4 may be structured from a member other than the blade member 3, or may be structured from the blade member 3 itself.

While in the explanation below the driving member 4 is described as an electromagnetic actuator that is driven linearly, there is no limitation thereto, but rather, for example, any of a variety of types of driving sources may be used, such as, for example, a piezoelectric actuator, an electromagnetic plunger, or the like. In the example illustrated in FIG. 1, the driving source is a linearly driven electromagnetic actuator made from a magnet 5 and a coil 6, where the driving member 4 is a movable element that is able to move along a plane (the X-Y plane), and comprises a driving frame 40 and the magnet 5 that is held on the driving frame 40. While here an example is depicted wherein the driving member 4 is a pair of driving members 4A and 4B (a plurality of driving sources), and a plurality of magnets 5 is held on each of the driving frames 40, a single driving source may be provided instead.

Coils 6 for electromagnetically driving the driving member 4 are held on coil holding members 60, as illustrated in the figure, or are secured directly to the base member 2. In the example in the figure, the coil holding member 60, whereon a coil 6 is held, is provided with a securing hole 60A, where the coil holding member 60 is secured to the base member 2 through fitting the securing hole 60A onto a securing protrusion 20E that is provided on the base plane 20.

The coils 6 are disposed corresponding to the magnets 5 of the driving member 4, where the driving member 4 is moved along an axial direction (for example, the X direction in the figures) within the plane (the X-Y plane) through application of an electric current to the coils 6. The application of the electric current to the coils 6 is carried out through a flexible circuit board 11 that is mounted on the base member 2.

Here the supporting members 7 are provided between the base member 2 and the driving member 4, to support slidably the driving member 4 in a state wherein it is separated from the base member 2. While here an example is depicted wherein the driving member 4 is supported slidably in a state wherein it is separated from the base member 2, the driving member 4 may instead be supported elastically in a state wherein it is separated from the base member 2. The driving member 4 is supported relative to the base member 2 through supporting members 7, and drives the blade member 3 so as to move within a plane (the X-Y plane) that is perpendicular to the optical axis (the axis of the opening 2A) that passes through the opening 2A.

In such a blade driving device 1, the driving member 4 is supported by supporting members 7 in a state wherein the driving member 4 is separated from the base member 2, so that the driving member 4 can move relative to the base member 2 without a large frictional resistance. Through this, the movable members of the blade driving device 1 are able to move smoothly, enabling a reduction in size and weight of the driving member 4 through enabling a reduction in the driving force, enabling the blade driving device 1 itself to be made smaller and thinner. Moreover, even when the blade driving device 1 has been made smaller and thinner, the movement of the movable members is smooth, enabling continuous operational control of the blade member 3 to be carried out with high resolution and good accuracy.

The example illustrated in FIG. 1 and FIG. 2 will be explained in greater detail. In the base member 2, supporting grooves 20A are provided in a plurality of locations on the base plane 20. The supporting grooves 20A are grooves that extend in the X direction and which have triangular or trapezoidal cross-sections, where a rolling element (a spherical body) 7A, which is a supporting member 7, is supported in each individual supporting groove 20A. Moreover, a shaft 20B is provided on the base plane 20 so as to support the blade member 3 and the driving member 4 so as to be able to move.

The supporting grooves 20A have directionality that guides the driving member 4, so that the driving member 4 moves along the supporting grooves 20A. The supporting grooves 20A, in the example in the figure, are provided linearly, and thus the driving member 4 is able to move with linear motion; however, there is no limitation thereto, but rather the supporting grooves 20A may be provided in a curve, enabling the driving member 4 to undergo rotational movement along a curved path.

The driving member 4 moves along the supporting grooves 20A that are provided on the base member 2, and thus the driving member 4 can be caused to move with stability, guided by the supporting grooves 20A. Moreover, the directionality (a straight line or a curve) of the supporting grooves 20A may be set arbitrarily, making it possible to set the movement of the driving member 4 to an arbitrary direction.

Coils 6 that are connected to a flexible circuit board 11 are supported, either directly or through coil holding members 60, on the base plane 20 of the base member 2. In the driving member 4, magnets 5 are held on a plate-shaped driving frame 40, and supporting grooves 40A are formed in positions in the driving frame 40 corresponding to the supporting grooves 20A, described above. Moreover, in a state wherein the supporting members 7 (the rolling elements 7A) are supported in the supporting grooves 20A, when the driving member 4 is supported so as to face the base plane 20, the supporting members 7 (the rolling elements 7A) are held between the supporting grooves 20A and supporting grooves 40A, so that the driving member 4 is supported slideably in a state that is separated from the base member 2. The supporting members 7 (rolling elements 7A) are caused to roll by the movement of the driving member 4, where the driving member 4 moves along the supporting grooves 20A and 40A.

At this time, back yokes 12 are disposed at a position corresponding to the magnets 5 that are supported on the driving frame 40, on the back face of the base member 2. The driving member 4 is drawn to the base member 2 side through magnetic attraction between the back yokes 12 and the magnets 5. The coils 6 are disposed in magnetic circuits formed from the magnets 5 and the back yokes 12. The existence of the supporting members 7 (the rolling elements 7A) causes the formation of magnetic gaps, with a uniform spacing, between the magnets 5 and the base member 2, and the coils 6 are disposed within these magnetic gaps.

The coils 6 have a pair of linear parts, where these pair of linear parts are disposed so as to face away from each other in the Y direction in the figures. In contrast, the magnets 5 are magnetized so as to form magnetic flux that passes through the linear parts of the coils 6 in the Z direction. Through this, the driving frame 40 or the driving member 4, on which the magnets 5 are held, is biased by a driving force in the X direction.

In the example depicted in FIG. 1 and FIG. 2, a pair of blade members 3 (3A and 3B) is provided, and a pair of driving frames 40 for the driving members 4 (4A and 4B) is provided corresponding to the blade members 3A and 3B. Moreover, the blade member 3A is attached (directly) as a single unit with the driving frame 40 of the driving member 4A, and the blade member 3B is attached (directly) as a single unit with the driving frame 40 of the driving member 4B.

When an electric current is applied to the coils 6, the driving member 4 is moved in the X direction along the supporting grooves 20A (or the supporting grooves 40A) through Lorentz forces that are produced between the coils 6 and the magnets 5, acting so as to move the pair of blade members 3A and 3B in mutually opposing directions along the X direction. At this time, the driving member 4 is drawn toward the base member 2 side, with the supporting members 7 therebetween, and thus the driving member 4 is driven with stability with a single plane, to move smoothly, with little resistance.

In the example in the drawings, the driving member 4 is disposed at a position overlapping the blade member 3 on the periphery of the opening 2A of the base member 2. This eliminates the need for the provision of a driving member 4 at a position that is separated from the blade member, making it possible to reduce the space for the installation area. The driving member 4 overlaps the blade member 3 at the periphery of the opening 2A, and is disposed over a relatively wide range. Through this, the magnets 5 can be located distributed around the opening 2A, enabling miniaturization of the individual magnets 5.

The base member 2 is configured so as to enable installation of a cover member 8 on the front end of a side wall 21. The cover member 8, which has an opening in 8A, covers the front face of the base member 2, to form an interior space S between the base member 2 and the cover member 8. The blade member 3 and the driving member 4 are contained within this compact interior space S, and operate within a plane so as to adjust, with continuously variable adjustments, the area of the opening 2A through which light passes.

While FIG. 1 and FIG. 2 depict an example wherein the blade member 3 and the driving member 4 operate as a single unit, the blade member 3 itself may instead hold the magnets 5, and the driving frame 40 may be omitted. Moreover, the blade member 3 and the driving member 4 may be separate units, where the blade member 3 and the driving member 4 are coupled through an operating mechanism, so that the movement of the driving member 4 within the plane is relayed to the blade member 3 through the operating mechanism.

Figure 3:
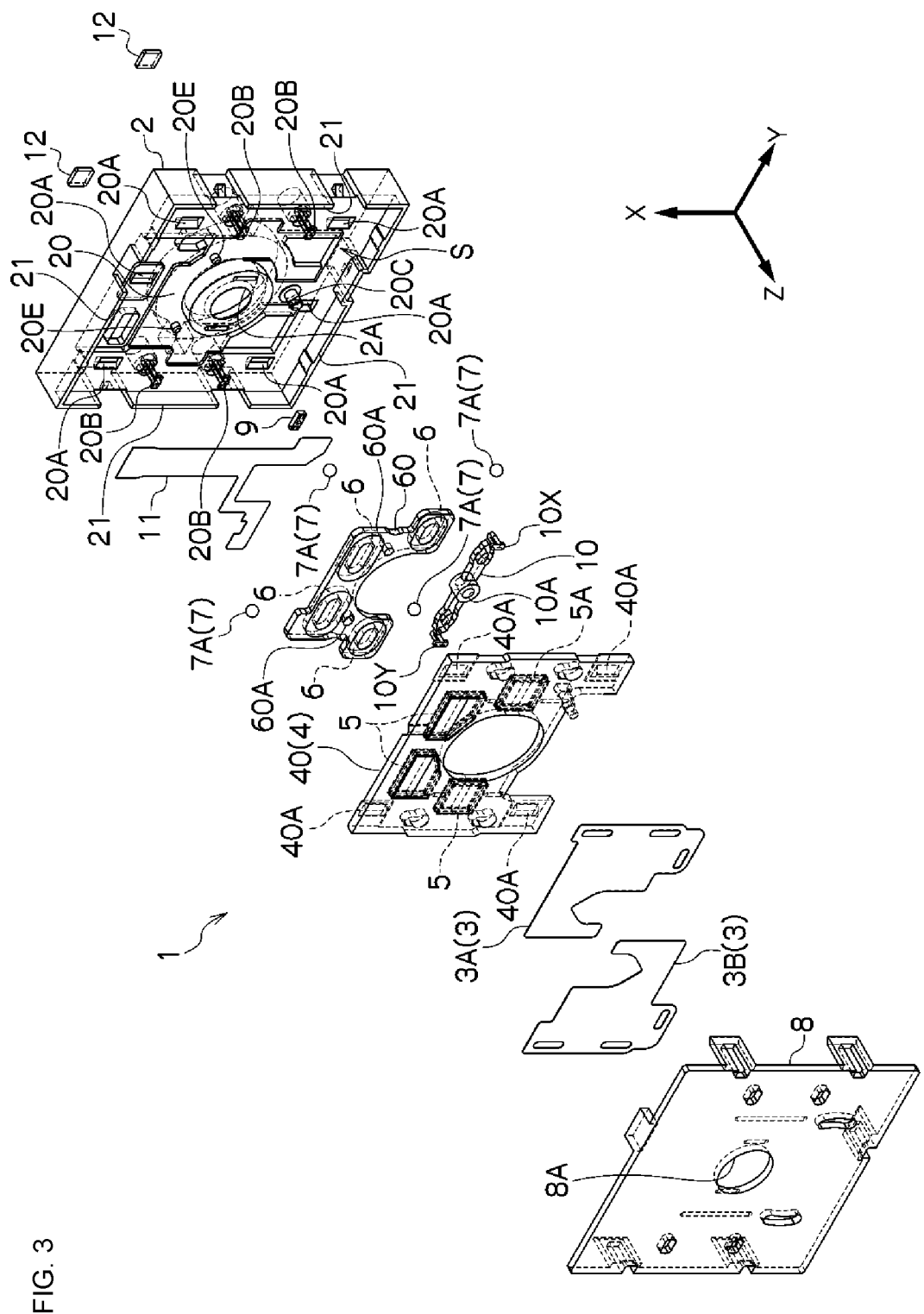
FIG. 3 is an exploded perspective diagram depicting an example of a blade driving device according to an example according to the present invention.

FIG. 3 depicts an example of another form of the blade driving device 1. In this example, the driving member 4 is provided with a driving frame 40 that is a single unit, where a plurality of magnets 5 is held on the driving frame 40. This driving frame 40 is a ring-shaped member configured so as to encompass the opening 2A, where a plurality of magnets 5 are disposed distributed on the periphery of the opening 2A. This driving frame 40 undergoes reciprocating motion in the axial direction, along the X direction, when an electric current is applied to the coils 6. In contrast, a bearing portion 10A of an operating lever 10 that serves as the operating mechanism is born on a shaft 20C that is provided on the base plane 20 of the base member 2. The other structures are identical to those in the example in FIG. 1.

In this case, a pair of blade members 3 (3A and 3B) is provided, with a single driving frame 40, and an operating mechanism (an operating lever 10) is provided to cause the pair of blade members 3A and 3B to move in mutually opposing directions through movement of the driving frame 40 in a single direction. That is, when the driving frame 40 moves in the X direction, one of the blade members 3A that is equipped on the driving frame 40 moves in the same direction, and, simultaneously, one end portion 10X of the operating lever 10 moves in the identical direction therewith. In contrast, the other end portion 10Y of the operating lever 10 moves in the opposite direction of the one end portion 10X, rotating around the shaft 20C of the operating lever 10. This other end portion 10Y is coupled to the other blade member 3B, moving the blade member 3B in the direction opposite to that of the blade member 3A.

Figure 4:
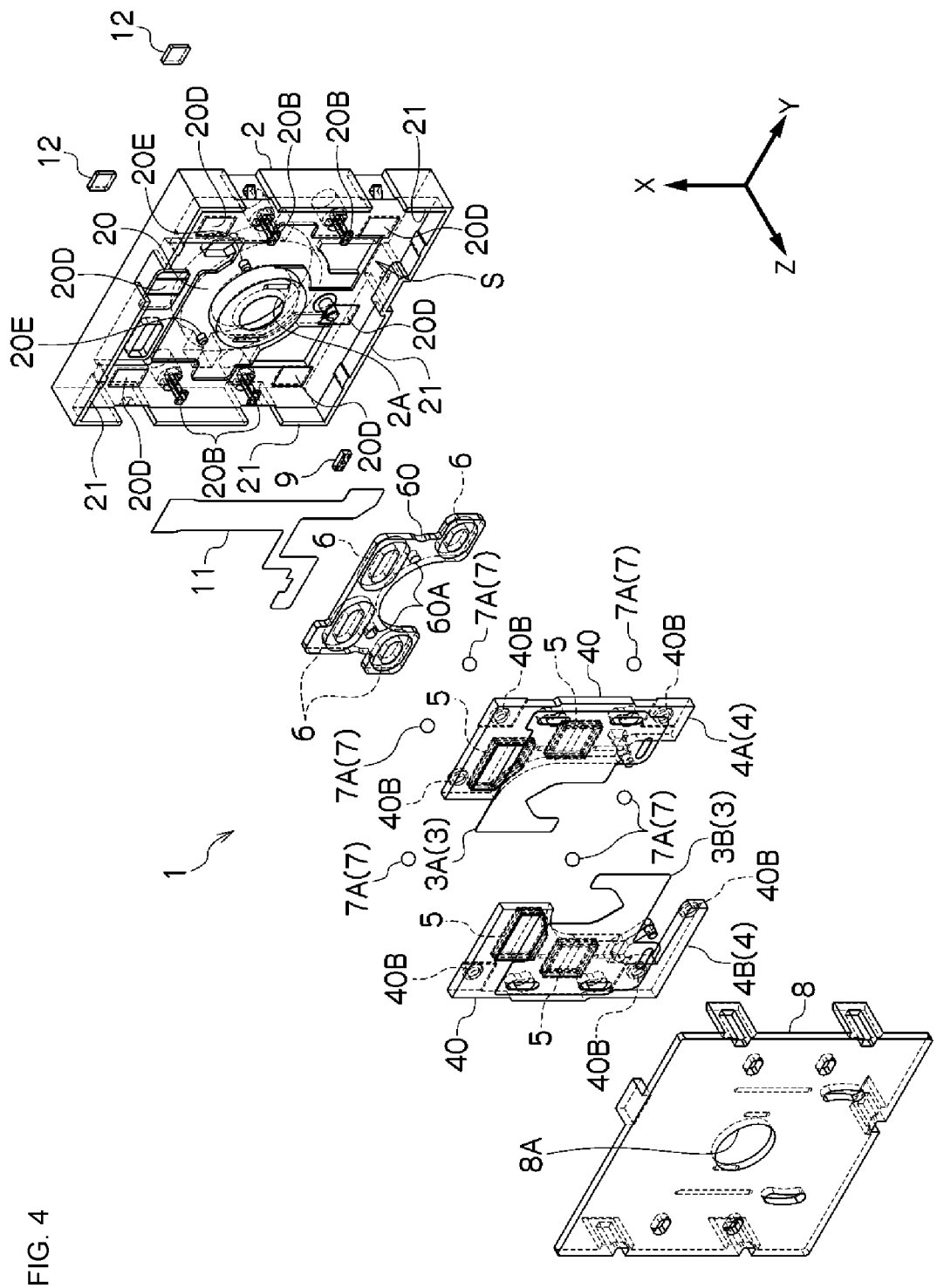
FIG. 4 is an exploded perspective diagram depicting an example of a blade driving device according to an example according to the present invention.
Figure 5:
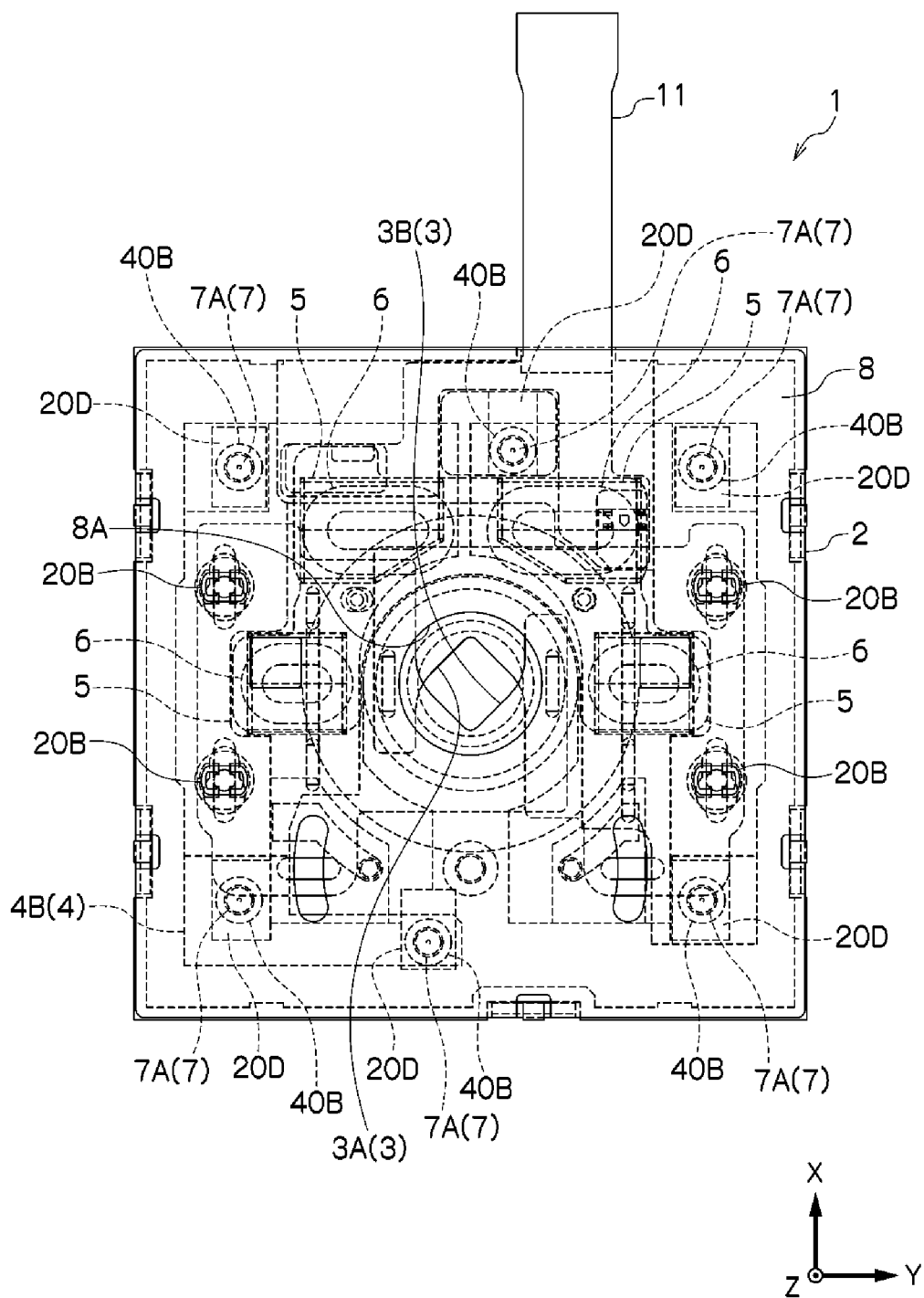
FIG. 5 is a plan view depicting an example of a blade driving device according to an example according to the present invention.

FIG. 4 and FIG. 5 depict an example of another form of the blade driving device 1. In this example, the driving member 4 (driving frame 40) is provided with holding grooves 40B for holding rolling elements (spherical bodies) 7A, as supporting members 7, so as to be able to rotate at fixed positions. In this example, the rolling elements 7A that are held in the holding grooves 40B roll on the supporting face 20D of the base plane 20, to support the driving member 4 (the driving frame 40) slideably within a plane (the X-Y plane). The other structures in the example depicted in FIG. 4 and FIG. 5 are identical to those in the example depicted in FIG. 1. Moreover, the configuration may be one wherein the holding grooves 40B in the example depicted in FIG. 4 are replaced with the supporting grooves 40A in the example depicted in FIG. 3, with the supporting face 20D in the example depicted in FIG. 4 replaced with the supporting grooves 20A in the example depicted in FIG. 3.

In the example depicted in FIG. 4 and FIG. 5, as with the example depicted in FIG. 1, an example is depicted wherein the blade member 3 and the driving member 4 operate as a single unit; however the magnets 5 may instead be held on the blade member 3 itself, and the driving frame 40 may be omitted. Moreover, the blade member 3 and the driving member 4 may be separate units, where the blade member 3 and the driving member 4 are coupled through an operating mechanism, so that the movement of the driving member 4 within the plane is relayed to the blade member 3 through the operating mechanism.

Figure 6A:
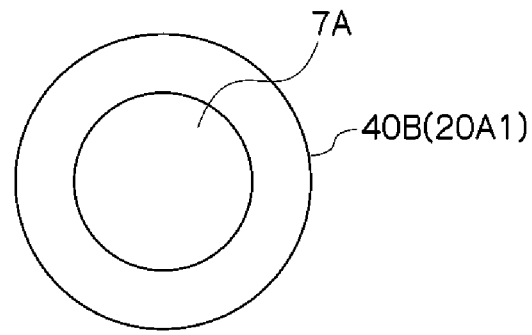
FIG. 6(a) is explanatory diagrams depicting a plan view of the structure for holding the rolling element.
Figure 6B:
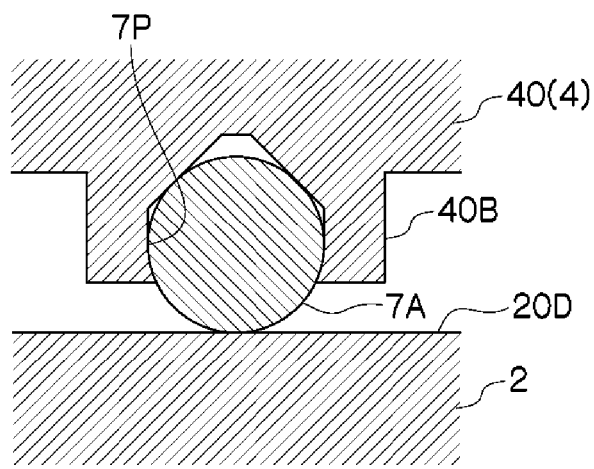
FIG. 6(b) is an explanatory diagram depicting a cross-sectional view of the structure for holding the rolling element.
Figure 6C:
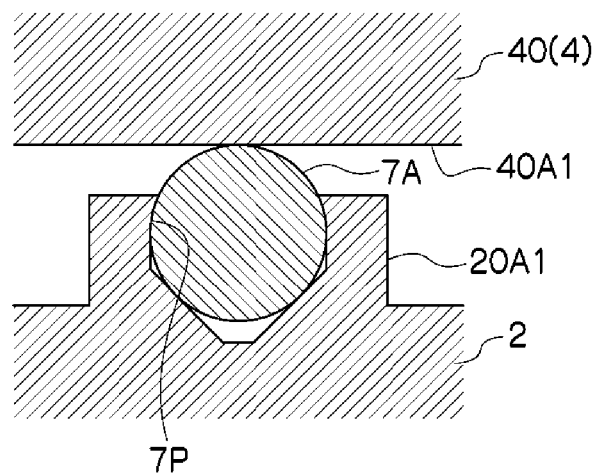
FIG. 6(c) is an explanatory diagram depicting another cross-sectional view of the structure for holding the rolling element.
Figure 7A:
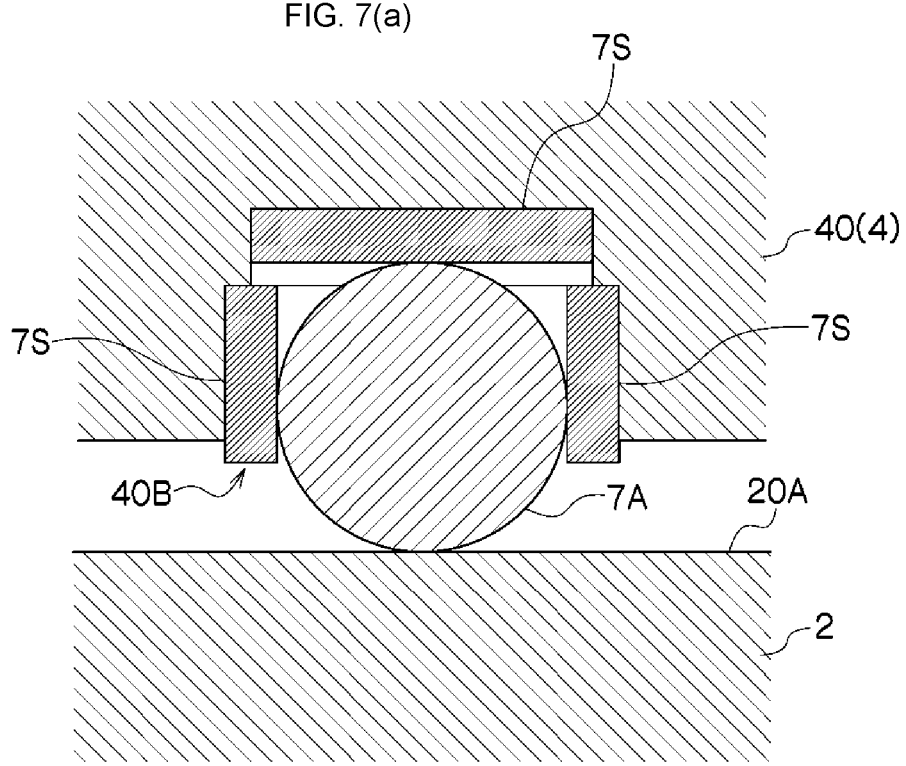
FIG. 7(a) is an explanatory diagrams depicting a cross-sectional view of the structure for holding the rolling element.
Figure 7B:
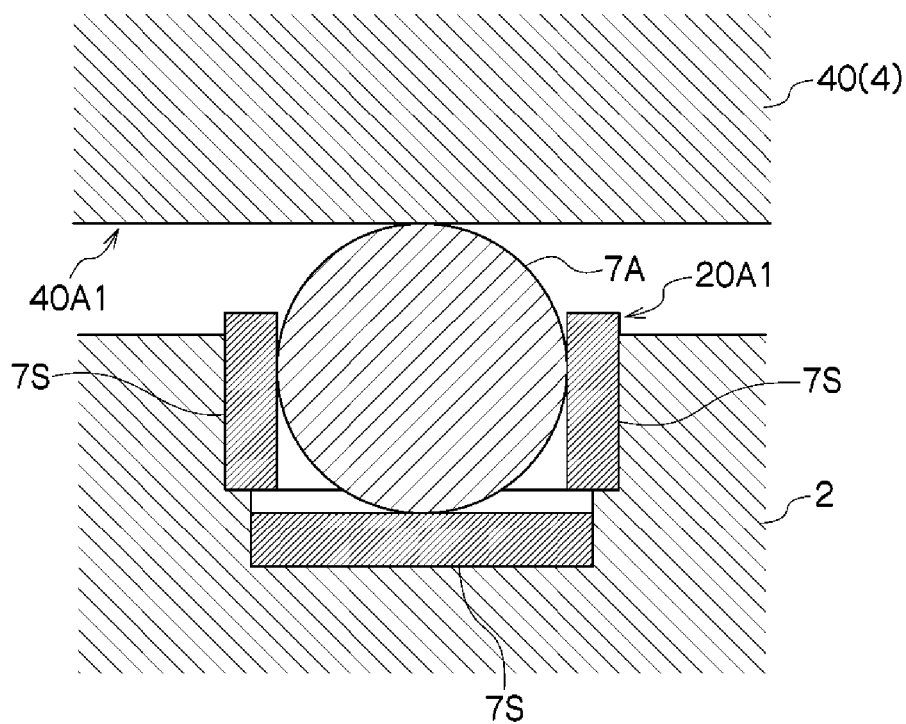
FIG. 7(b) is an explanatory diagram depicting another cross-sectional view of the structure for holding the rolling element.

FIG. 6 and FIG. 7 depict a structure for holding the rolling elements 7A. As illustrated in FIG. 6 (*b*), the rolling element 7A may be provided with a retaining portion 40B that has a recessed portion 7P in the driving frame 40 on the driving member 4 side, so as to be held, so as to enable rolling, with the this recessed portion 7P (referencing FIG. 4 and FIG. 5), and, as illustrated in FIG. 6 (*c*), may be provided with a retaining portion 20A1 that has a recessed portion 7P on the base member 2 side, and may be held, so as to enable rolling, within this recessed portion 7P. The rolling elements 7A that are held in the retaining portions 40B and 20A1 move on the opposing supporting faces (planes) 20D and 40A1.

In regards to holding of the rolling elements 7A, they may be held through a plate member 7S, which has good slip performance, as illustrated in FIG. 7. In this case as well, a retaining portion 40B may be provided in the driving frame 40 on the driving member 4 side, as depicted in FIG. 7 (*a*), or a retaining portion 20A1 may be provided on the base member 2 side, as depicted in FIG. 7 (*b*).

In such a blade driving device 1, the driving member 4 is supported by rolling elements 7A in a state wherein the driving member 4 is separated from the base member 2, so that the driving member 4 can move relative to the base member 2 without a large frictional resistance. Through this, the movable members of the blade driving device 1 are able to move smoothly, enabling a reduction in size and weight of the driving member 4 through enabling a reduction in the driving force, enabling the blade driving device 1 itself to be made smaller and thinner. Moreover, even when the blade driving device 1 has been made smaller and thinner, the movement of the movable members is smooth, enabling continuous operational control of the blade member 3 to be carried out with high resolution and good accuracy.

Figure 8:
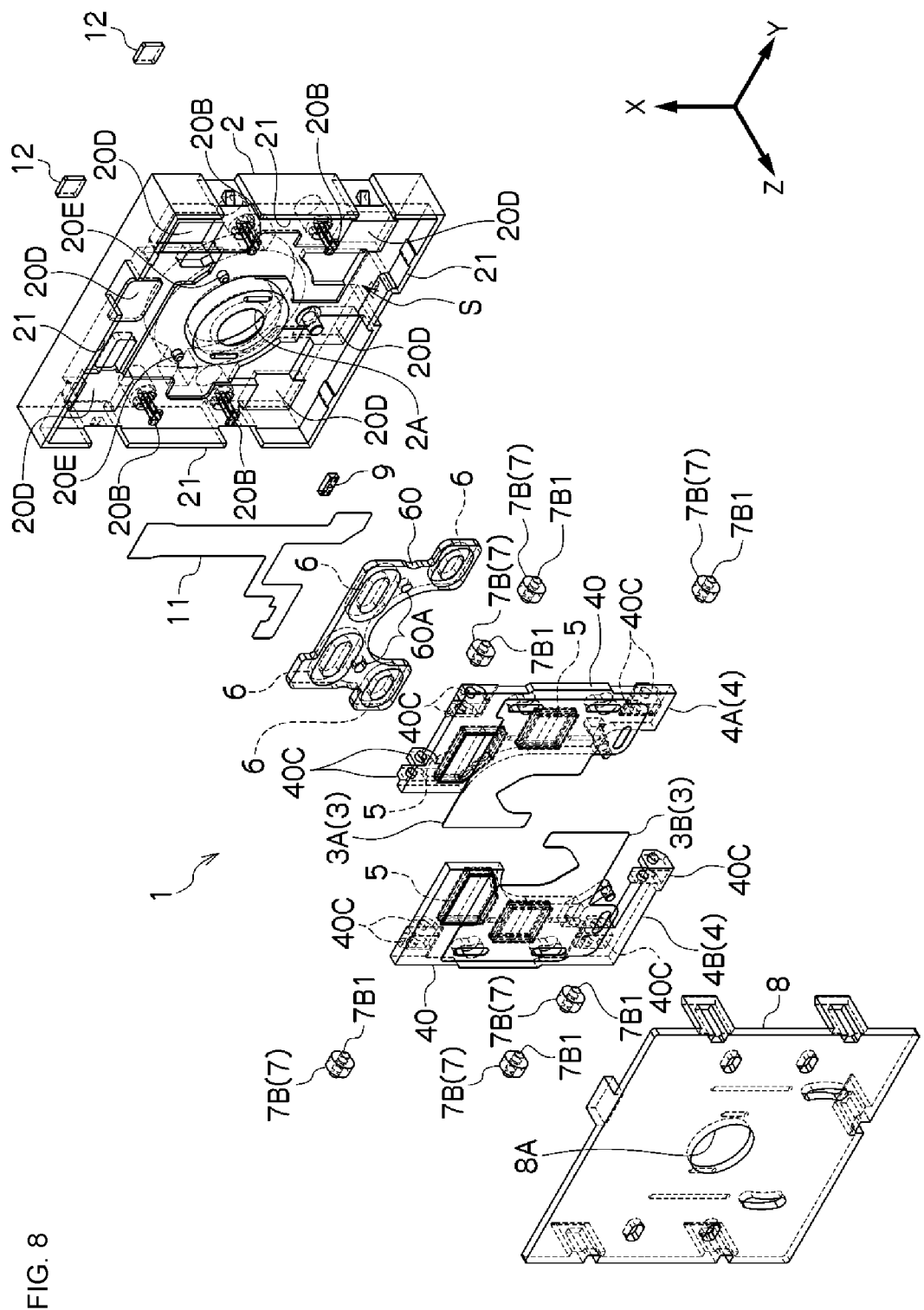
FIG. 8 is an exploded perspective diagram depicting an example of a blade driving device according to an example according to the present invention.

FIG. 8 depicts an example of another form of the blade driving device 1. In this example, the driving member 4 (the driving frame 40) is provided with bearings 40C, where rollers 7B are born, as the supporting members 7, on the bearings 40C. The rollers 7B include axles 7B1 along the Y direction, so as to enable the driving member 4 to move in the X direction, where the axles 7B1 are born on the bearings 40C. The rollers 7B that are born by the bearings 40C roll on the supporting face 20D in the base plane 20, to support the driving member 4 (the driving frame 40) slideably within a plane (the X-Y plane). The other structures in the example depicted in FIG. 8 are identical to those in the example depicted in FIG. 1. Moreover, the configuration may be one wherein the bearings 40C and rollers 7B in the example illustrated in FIG. 8 are replaced, respectively, with the supporting grooves 40A and rolling elements 7A of the example illustrated in FIG. 3, and the supporting face 20D of the example illustrated in FIG. 8 is replaced with the supporting grooves 20A of the example illustrated in FIG. 3. Moreover, the bearings 40C and the rollers 7B in the example illustrated in FIG. 8 may be replaced with the holding grooves 40B and the rolling elements 7A of the example illustrated in FIG. 4.

In the example depicted in FIG. 8, as with the examples depicted in FIG. 1 and FIG. 4, an example is depicted wherein the blade member 3 and the driving member 4 operate as a single unit; however the magnets 5 may instead be held on the blade member 3 itself, and the driving frame 40 may be omitted. Moreover, the blade member 3 and the driving member 4 may be separate units, where the blade member 3 and the driving member 4 are coupled through an operating mechanism, so that the movement of the driving member 4 within the plane is relayed to the blade member 3 through the operating mechanism.

Figure 9:
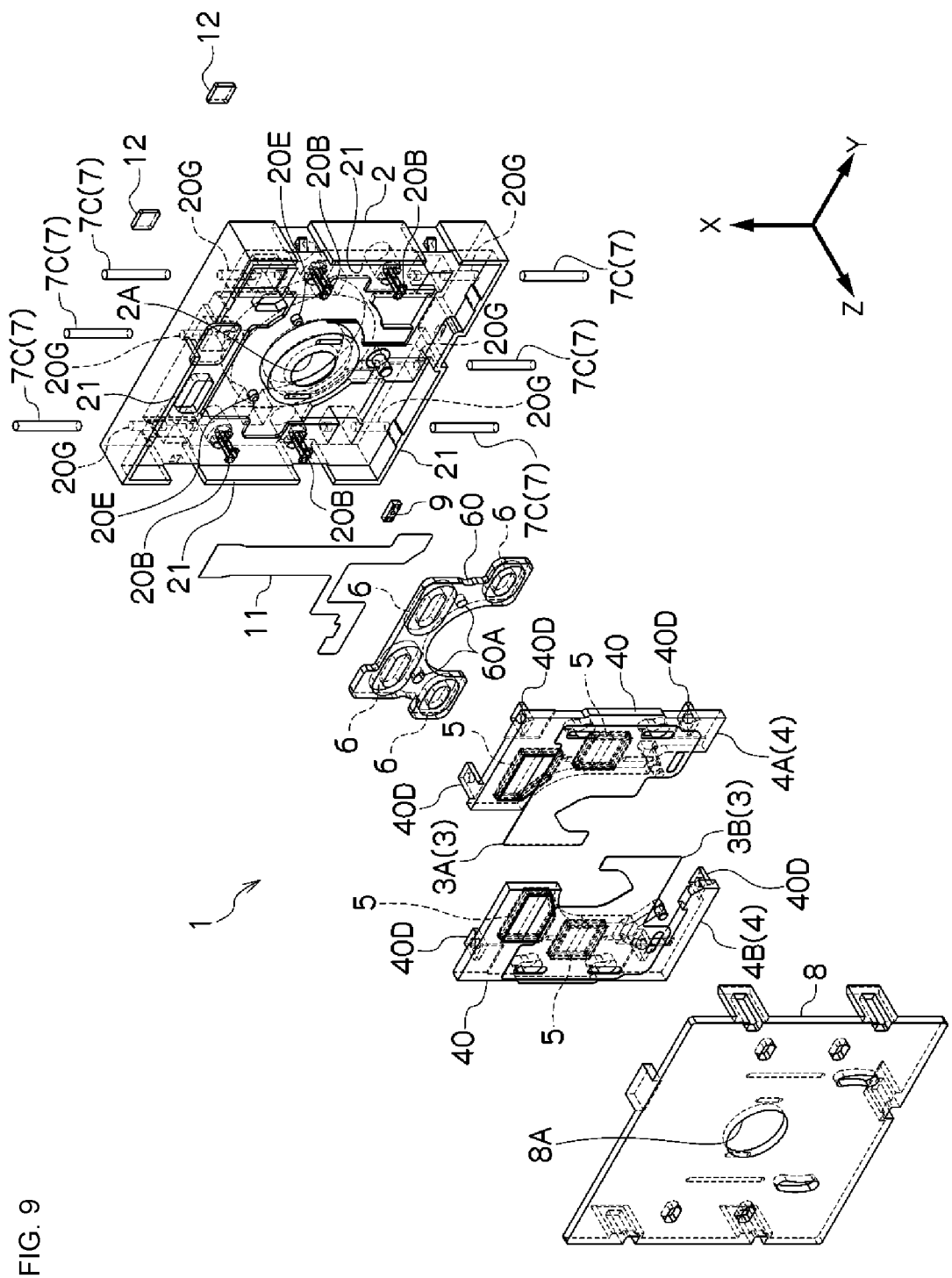
FIG. 9 is an exploded perspective diagram depicting an example of a blade driving device according to an example according to the present invention.
Figure 10:
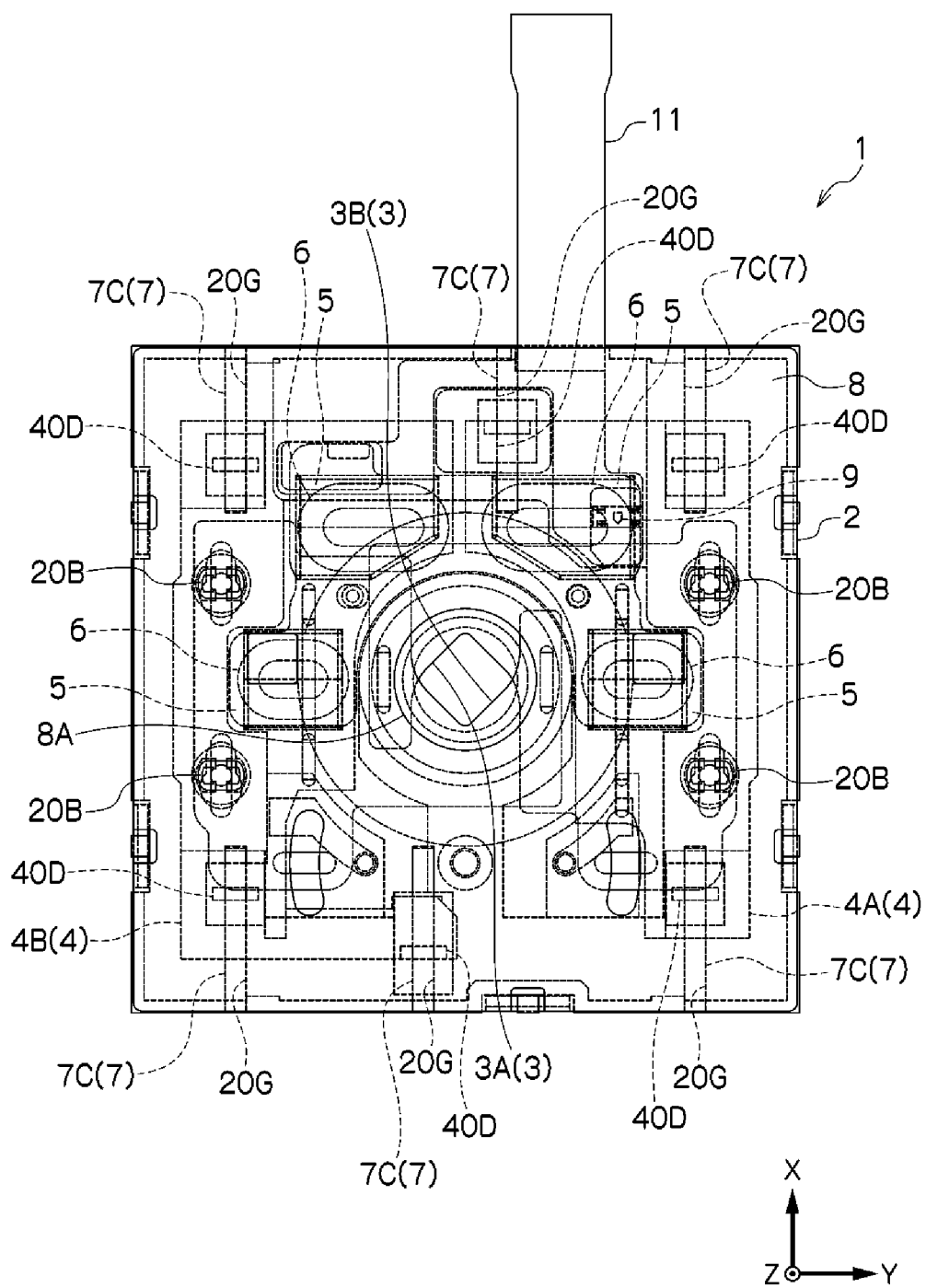
FIG. 10 is a plan view depicting an example of a blade driving device according to an example according to the present invention.

FIG. 9 and FIG. 10 depict an example of another form of the blade driving device 1. In this example, shafts 7C that extend along the X direction within the plane (the X-Y plane) are provided as the supporting members 7 on the base member 2, where the driving member 4 (the driving frame 40) is provided with sliding portions 40D, where these sliding portions 40D are equipped so as to be able to slide on the shafts 7C. The shafts 7C are equipped on the base member 2 through insertion into fitting holes 20G that are provided in the base member 2. While here the shafts 7C are provided on the base member 2, the shafts 7C may be provided on the driving member 4 side instead, with the sliding portions 40D provided on the base member 2 side.

The shafts 7C that are provided on the base member 2 have directionality for guiding the driving member 4, and the driving member 4 moves along the shafts 7C. The shafts 7C, in the example in the figure, are provided linearly, and thus the driving member 4 is able to move with linear motion; however, there is no limitation thereto, but rather the shafts 7C may be provided in a curve, enabling the driving member 4 to undergo rotational movement along a curved path.

The driving member 4 moves along the shafts 7C that are provided on the base member 2, and thus the driving member 4 can be caused to move with stability, guided by the shafts 7C. Moreover, the directionality (a straight line or a curve) of the shafts 7C may be set arbitrarily, making it possible to set the movement of the driving member 4 to an arbitrary direction.

In this example as well, the driving member 4 is supported slideably on the base member 2 by the supporting members 7 (the shafts 7C). Through the sliding portions 40D of the driving member 4 sliding along the shafts 7C, the driving member 4 is supported in a state wherein it is separated from the base member 2, so as to be able to move along the X direction within the plane (the X-Y plane). The other structures in the example depicted in FIG. 9 and FIG. 10 are identical to those in the example depicted in FIG. 1. Moreover, the configuration may be such that the supporting grooves 40A, the rolling elements 7A, and the supporting grooves 20A of the example depicted in FIG. 3 replace the sliding portions 40D and shafts 7C of the example depicted in FIG. 9 and FIG. 10, with the single unit driving frame 40 of the example depicted in FIG. 3 supported on the base member 2 by the shafts 7C so as to be able to move smoothly.

In the example depicted in FIG. 9 and FIG. 10, as with the example depicted in FIG. 1, FIG. 4, and FIG. 8, an example is depicted wherein the blade member 3 and the driving member 4 operate as a single unit; however the magnets 5 may instead be held on the blade member 3 itself, and the driving frame 40 may be omitted. Moreover, the blade member 3 and the driving member 4 may be separate units, where the blade member 3 and the driving member 4 are coupled through an operating mechanism, so that the movement of the driving member 4 within the plane is relayed to the blade member 3 through the operating mechanism.

Figure 11:
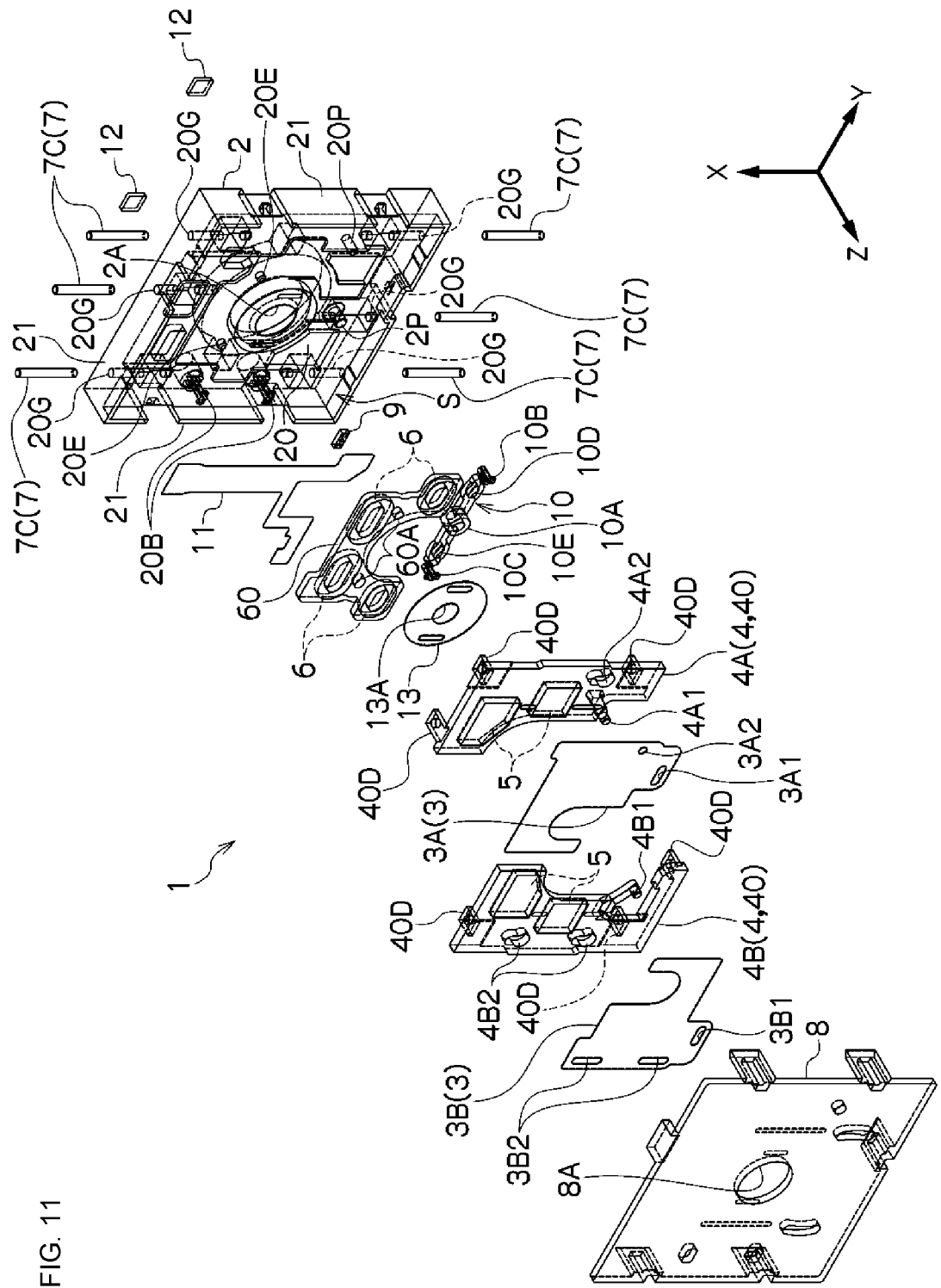
FIG. 11 is an exploded perspective diagram depicting an example of a blade driving device according to an example according to the present invention.

FIG. 11 is a modified example of the blade driving device depicted in FIG. 9 and FIG. 10. In this example, as with the example depicted in FIG. 3, the blade member 3 and the driving member 4 are attached through another member (the operating lever 10), so that the blade member 3 undergoes rotational movement through the linear motion of the driving member 4. The other structures are identical to those in the example depicted in FIG. 9 and FIG. 10. The coupling of the operating lever 10 and the blade member 3 will be described below (in reference to FIG. 24 through FIG. 26).

Moreover, in the example depicted in FIG. 11, an opening limiting member 13 is provided in front of the opening 2A of the base member 2, where the opening area (the amount of exposure) when the blade member 3 is fully open is limited accurately by an opening 13A of the opening limiting member 13. Moreover, through the movement of the blade member 3, described above, the blade members 3A and 3B will advance into, or withdraw from, the opening 13A, so that the opening area of the opening 13A (the amount of exposure) is adjusted variably with high accuracy. The opening limiting member 13 can be employed in all of the example configurations described above and example configurations described below.

Figure 12:
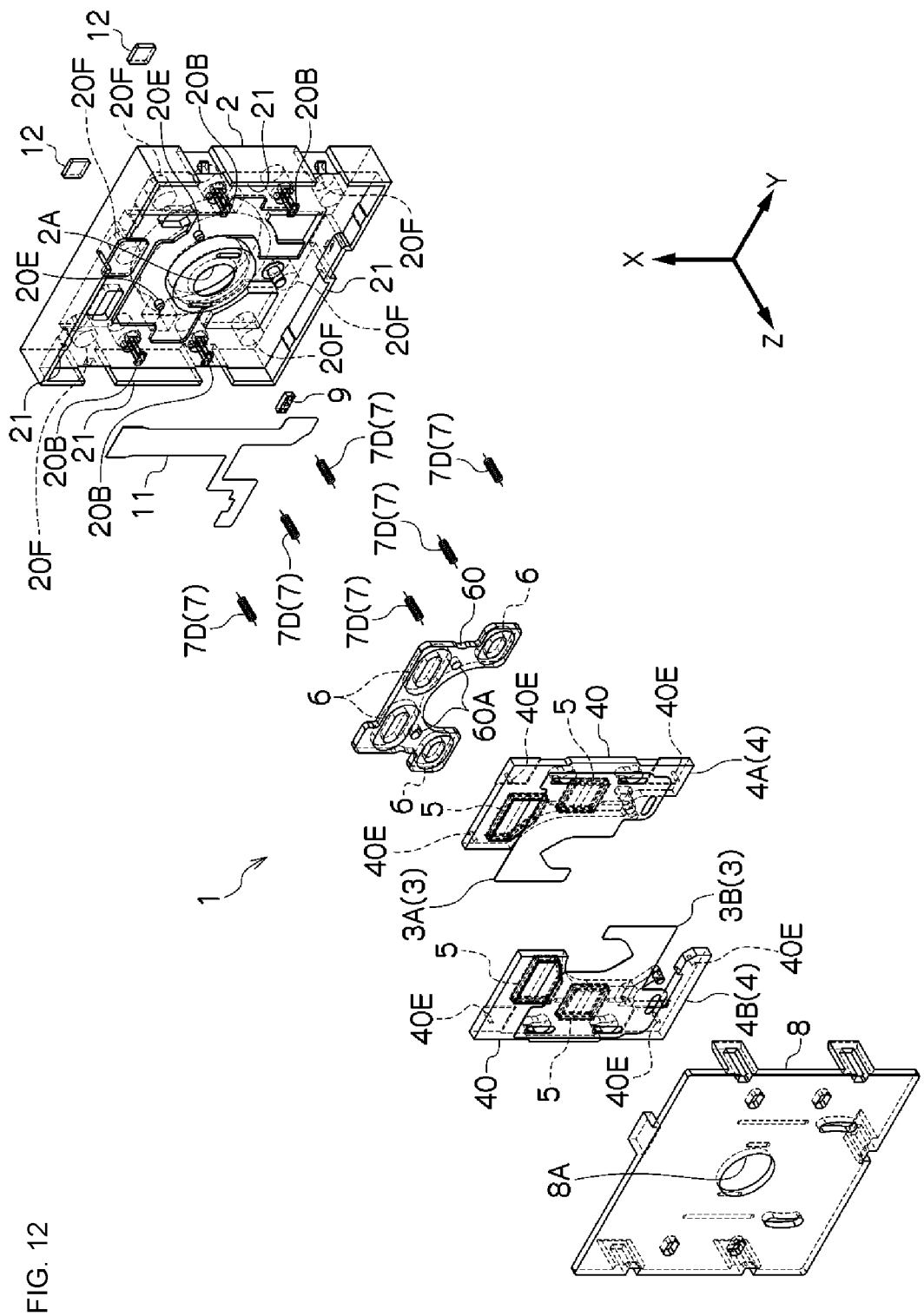
FIG. 12 is an exploded perspective diagram depicting an example of a blade driving device according to an example according to the present invention.

FIG. 12 depicts an example of another form of the blade driving device 1. In this example, elastic members (springs) 7D are interposed, as supporting members 7, between the base member 2 and the driving member 4 (the driving frame 40), so that the driving member 4 is supported elastically on the base member 2 in a state wherein the driving member 4 is separated from the base member 2. Here an example is illustrated wherein a single driving member 4A (4B) is supported elastically by three elastic members 7D, where one end of the elastic member 7D is supported on a supporting portion 40E of the driving member 4 (the driving frame 40), and the other end of the elastic member 7D is supported on a supporting portion 20F of the base member 2.

Figure 13:
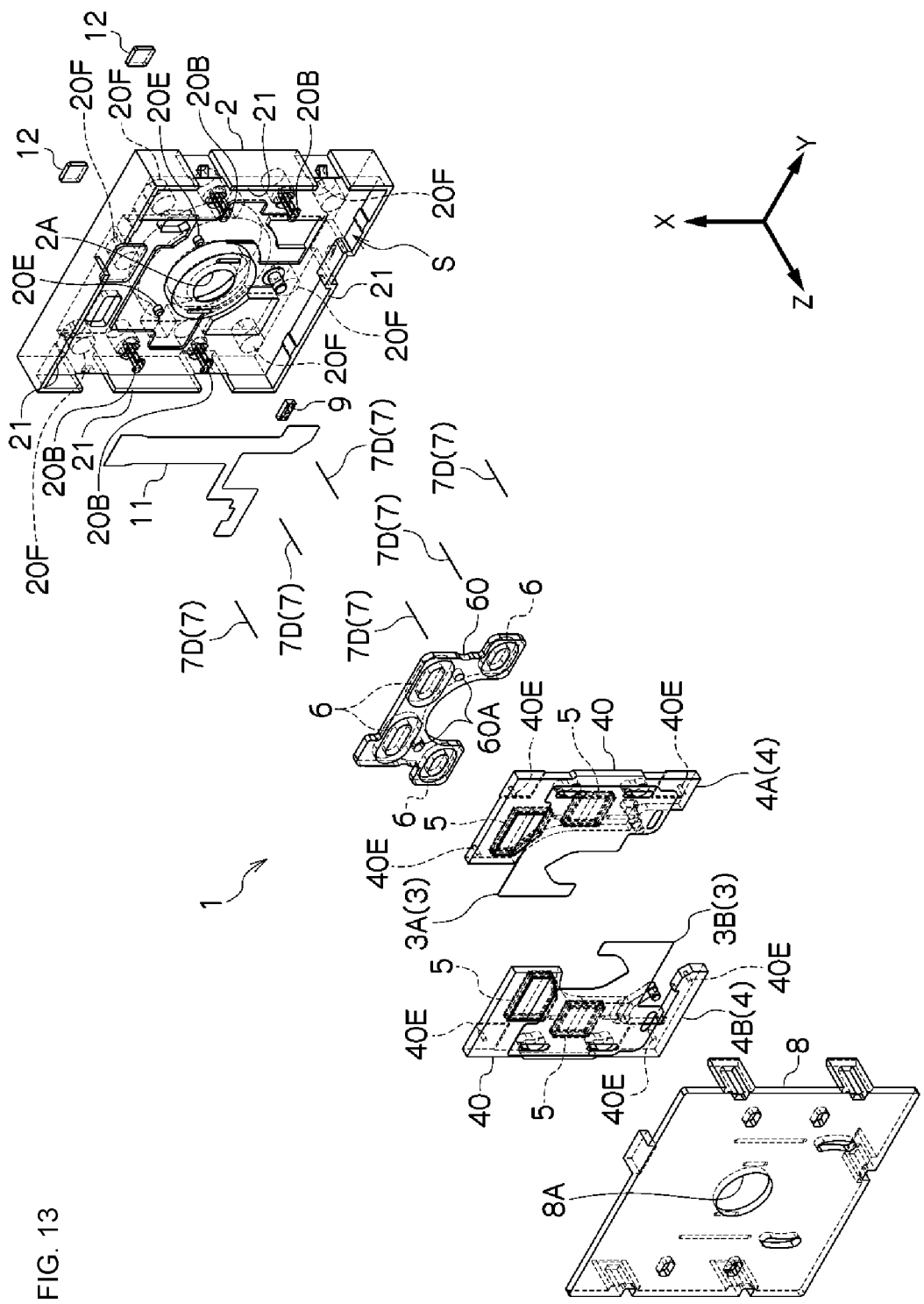
FIG. 13 is an exploded perspective diagram depicting an example of a blade driving device according to an example according to the present invention.
Figure 14:
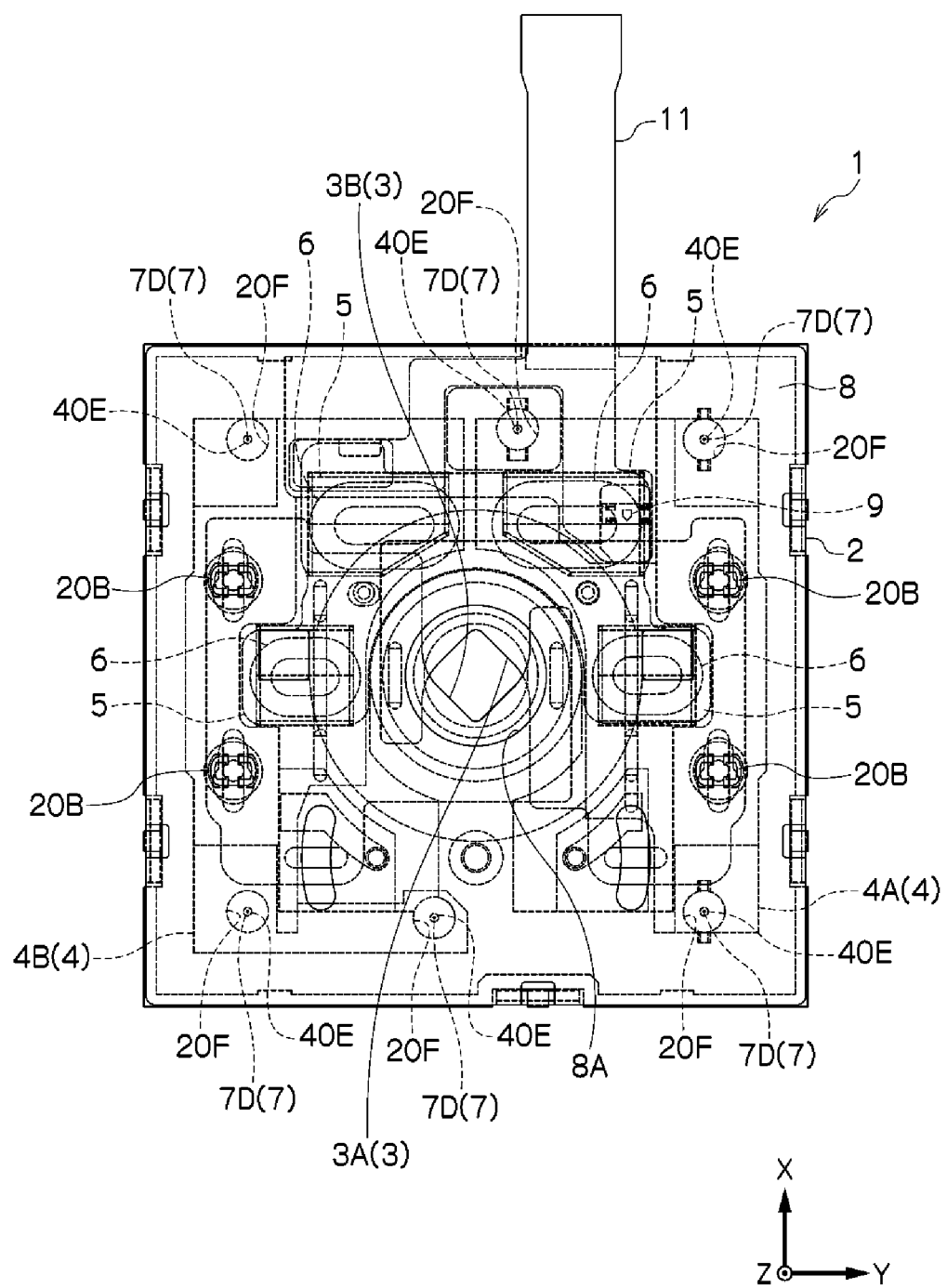
FIG. 14 is a plan view depicting an example of a blade driving device according to an example according to the present invention.

FIG. 12 depicts an example wherein springs are used for the elastic members 7D, but, as illustrated in FIG. 13 and FIG. 14, wires, or the like, that have bending elasticity and that have a reactive force for supporting in the axial direction, may be used instead of the springs. The other structures in the example depicted in FIG. 12 through FIG. 14 are identical to those in the example depicted in FIG. 1. Moreover, the configuration may be one wherein the supporting portions 40E, the elastic members 7D, and the supporting portions 20F, depicted in FIG. 12 through FIG. 14, are replaced with the supporting grooves 40A, the rolling elements 7A, and the supporting grooves 20A, in the examples depicted in FIG. 3, and the single driving frame 40, depicted in FIG. 3, may be supported elastically on the base member 2 through the elastic member 7D.

In this example, when an electric current is applied to the coils 6, the driving member 4 moves straight in the X direction due to the application of a magnetic force through the Lorentz forces that are produced between the coils 6 and the magnets 5, where this movement causes the pair of blade members 3A and 3B to travel straight in mutually opposing directions in the X direction. At this time, the driving member 4 is supported elastically within a plane that is perpendicular to the optical axis, and thus can move in the direction in which the magnetic force is applied. Given this, when the electric current is stopped, the elastic force of restitution of the elastic members 7D returns the position of the driving member 4 to an arbitrary position wherein there is an equilibrium with the magnetic force that acts between the magnets 5 and the back yolks 12.

Figure 15:
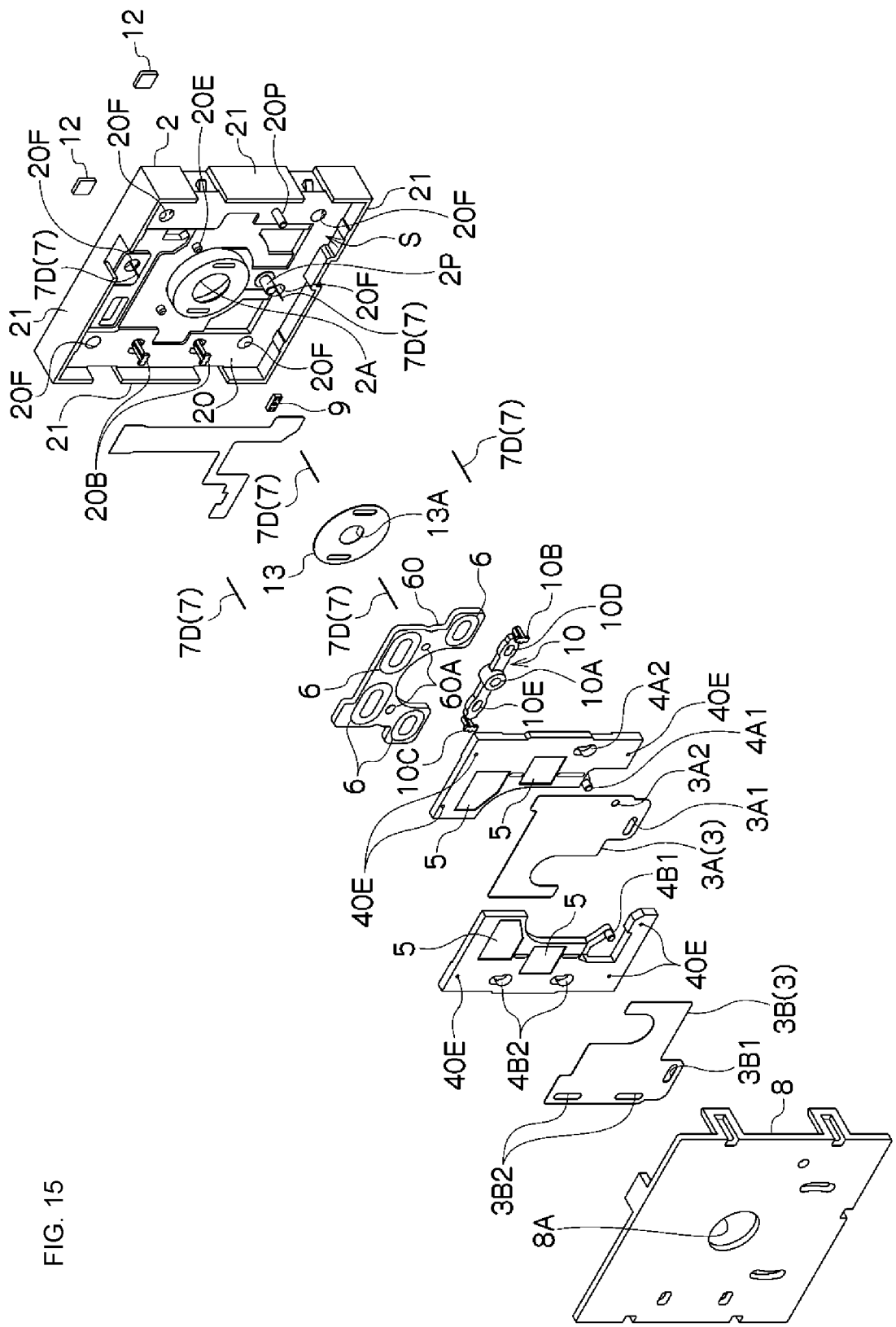
FIG. 15 is an exploded perspective diagram depicting an example of a blade driving device according to an example according to the present invention.

While in the example depicted in FIG. 12 and FIG. 13 an example is depicted wherein the blade member 3 and the driving member 4 operate as a single unit, the blade member 3 itself may instead hold the magnets 5, and the driving frame 40 may be omitted. Moreover, if the blade member 3 and the driving member 4 our separate units, then, as depicted in FIG. 15, the blade member 3 and the driving member 4 should be coupled through an operating lever 10 (an operating mechanism), so that the movement of the driving member 4 within the plane is relayed to the blade member 3 through the operating mechanism. In this case, the blade member 3 and the driving member 4 are connected through the operating lever 10, so that the blade member 3 will undergo rotational motion through the linear motion of the driving member 4.

In the blade driving devices 1 in the various example configurations set forth above, the driving members 4 are supported on the base members 2 through the supporting members 7, where the driving members 4 are supported slideably or supported elastically, separated from the base member 2, enabling the driving member 4 to be moved smoothly with a relatively small driving force. This enables the positional adjustments of the opening and closing operations of the blade members 3 (3A and 3B) to be carried out continuously with high resolution.

Moreover, a detecting portion (detecting means) 9, for detecting, either directly or indirectly, operation of the blade member 3, and a controlling portion (not shown) for controlling the driving member 4 (and, in particular, the current that is applied to the coils 6) in response to the detection output of the detecting portion 9, may be provided in order to control variably the area within the opening 2A for transmitting light that is not covered by the blade member 3. In this case, as described above, the driving member 4 moves smoothly, enabling high-resolution control.

An example of the detecting portion 9 in this case is a Hall element that detects the position of a magnet 5 in the driving member 4. Examples of the detecting portion 9 are not limited to such Hall elements, but may instead be a sensor for detecting position information (such as a linear encoder, or the like) attached to the blade member, a sensor for detecting the brightness of the light that passes through the opening 2A (that is, the output of the imaging element), or the like.

Moreover, in controlling the driving of the driving member 4, rather than just controlling based on the detection portion 9, described above, a known control technique that is typically employed in electromagnetic actuators may be used, such as feedback control for detecting a reverse electromotive force that is produced in a damping coil that is provided in relation to a magnet 5, or feedback control of the group detecting the state of conduction (current, voltage, pulse, etc.) of a coil 6.

In order to perform this control with higher accuracy, preferably the movement of the driving member 4 is limited to the axial direction (the X direction in the figures). In the examples depicted in FIG. 1 and FIG. 3, the movement of the driving member 4 may be limited to the axial direction through limiting, in the axial direction (the X direction in the figures) the movement of the supporting members 7 (the rolling elements 7A) through the supporting grooves 20A and the supporting grooves 40A. Moreover, in the example depicted in FIG. 8, the movement of the driving member 4 can be limited to the axial direction through having the direction of the axles 7B1 of the rollers 7B be perpendicular to the axial direction (the X direction in the figures). In the example depicted in FIG. 9, the movement of the driving member 4 can be limited to the axial direction by having the direction of the shafts 7C be in the axial direction (the X direction in the figures).

In contrast, in the examples depicted in FIG. 4 and FIG. 12 through FIG. 14, it is necessary to provide guiding means separately for limiting the movement of the driving member 4, in order to limit the movement of the driving member 4 to the axial direction. It is possible to form these guiding means through the provision of a guiding portion that enables sliding along the axial direction, between a portion of the driving member 4 and a portion (for example, a side wall 21) of the base member 2.

Moreover, in the explanation set forth above, an example is depicted through moving-magnet driving wherein the magnets 5 are provided on the driving member 4 side and coils 6 are provided on the base member 2 side; however, the driving may instead be of a moving-coil driving wherein magnets 5 are provided on the base member 2 side and coils 6 are provided on the driving member 4 side. In this case, the provision of back yolks 12 on the driving member 4 side makes it possible to produce magnetic attraction that acts between the driving member 4 and the base member 2.

Figure 16A:
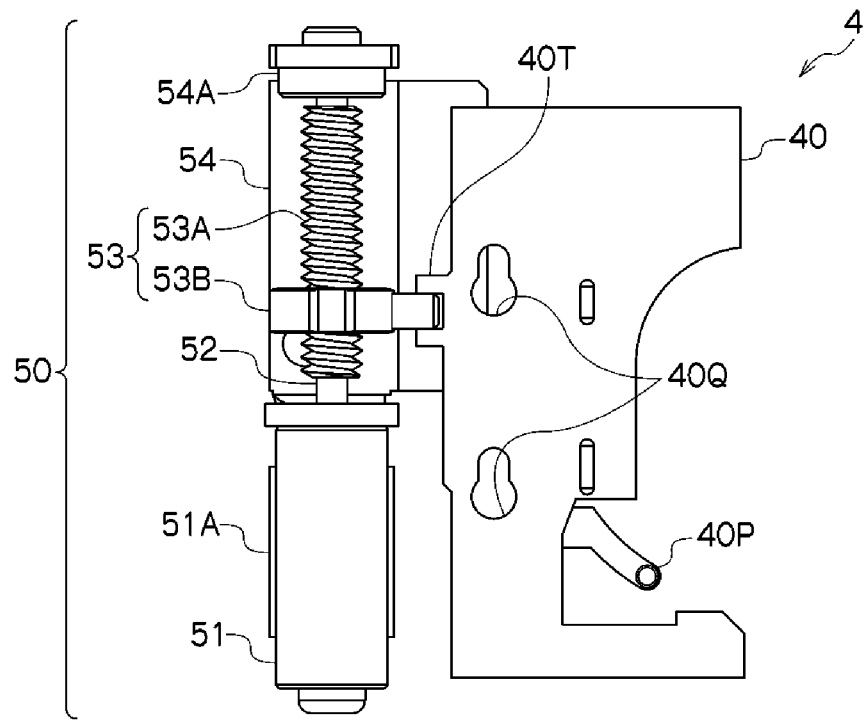
FIG. 16(a) is an explanatory diagrams depicting a screw-type example of another configuration for a driving member in a blade driving device according to an example according to the present invention.
Figure 16B:
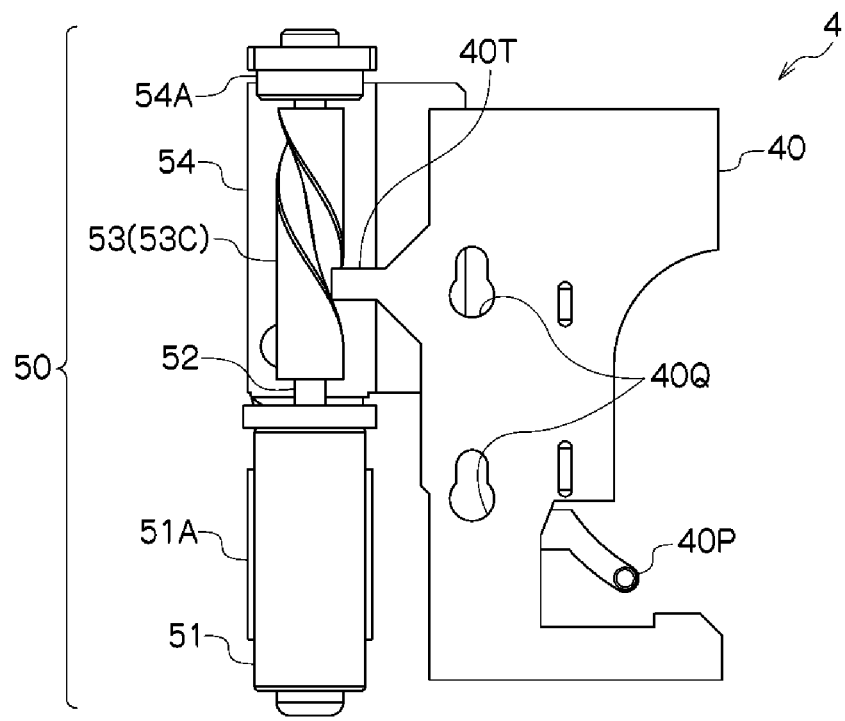
FIG. 16(b) is an explanatory diagram depicting a cam type example of another configuration for a driving member in a blade driving device according to an example according to the present invention.

FIG. 16 depicts an example of another form of a driving member 4. In this example, the driving member 4 comprises a driving frame 40 that is able to move along a plane that is perpendicular to an optical axis through which an opening 2A passes, and a driving source (a linear driving source) 50 for causing the driving frame 40 to undergo linear motion in an axial direction, where the driving source 50 is coupled to a connecting portion 40T of a driving frame 40.

The driving source 50 comprises: a motor 51 and a rotational/linear motion converting portion 53 for converting the rotation of the motor 51 into linear motion. In the motor 51, the tip end of the rotary shaft 52 thereof is born on a bearing 54A of an attaching member (a bracket) 54, where the driving source 50 is attached through an attaching member 54 to the base member 2.

The rotational/linear motion converting portion 53, in the example depicted in FIG. 16 (a), comprises a male threaded portion 53A that is formed along the rotary shaft 52 of the motor 51 and a female screw movable unit 53B that screws together with the male threaded portion 53A. In this example, when the motor 51 drives the rotary shaft 52 rotationally, the female screw movable unit 53B undergoes linear motion along the rotary shaft 52, causing the driving frame 40, which is coupled by the connecting portion 40T to the female screw movable unit 53B, to undergo linear motion along the rotary shaft 52.

In the example depicted in FIG. 16 (b), the rotational/linear motion converting portion 53 comprises a cam portion 53C that is formed helically around the rotary shaft 52 of the motor 51. When the motor 51 drives the rotary shaft 52 rotationally, the cam portion 53C is actuated by the rotation of the rotary shaft 52, to cause the driving frame 40, which is coupled to the connecting portion 40T by the cam portion 53C, to undergo linear motion along the rotary shaft 52.

A stepping motor or a DC motor may be used as the motor 51 in the driving source 50. When a stepping motor is used, it is possible to cause the linear motion of the driving frame 40 to move in stages (discontinuously). This enables the blade member 3, which is driven by the driving member 40, to be moved quickly to an opening/closing state that has been set, and to be held stably in that state. The driving source 50 is not limited to the motor 51 that has a rotary shaft 52, but instead a piezoelectric element, or the like, may be used for the driving source.

When a driving source 50 is used in this way, the opening/closing state of the blade member 3 can be held in an arbitrary state in a non-powered state. When the blade driving device 1 is used as an iris device, it is necessary to hold the opening/closing state of the blade member 3 in the blade driving device 1 constant at each of a variety of stages in order to maintain the desired exposure level. With the driving source 50, after the blade member 3 has been moved to the position that enables the desired exposure, it can be maintained in that state when in a non-powered state, making it possible to maintain the desired exposure without consuming battery power.

Figure 17:
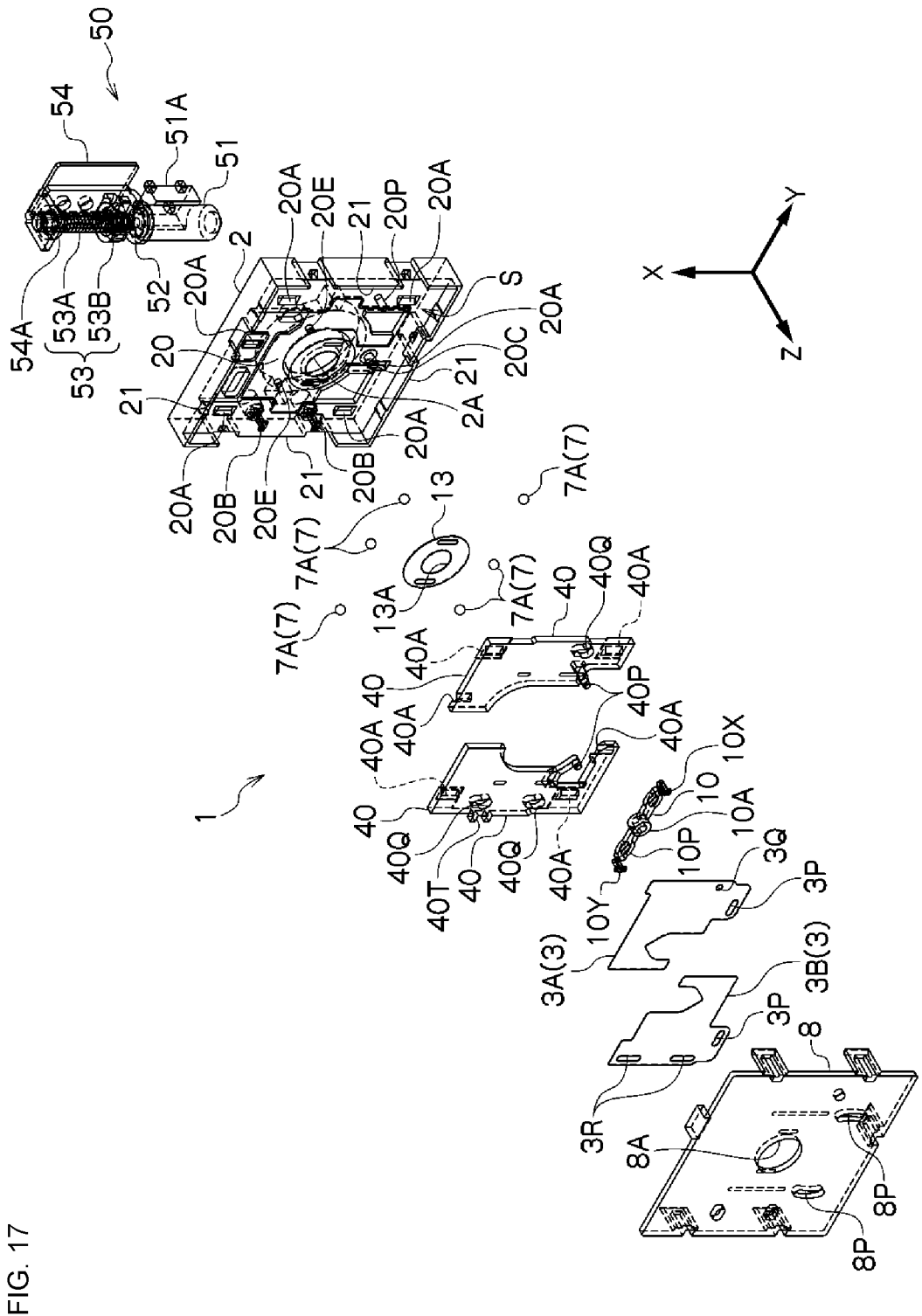
FIG. 17 is an exploded perspective diagram depicting an example of a blade driving device equipped with the driving member depicted in FIG. 16.
Figure 18:
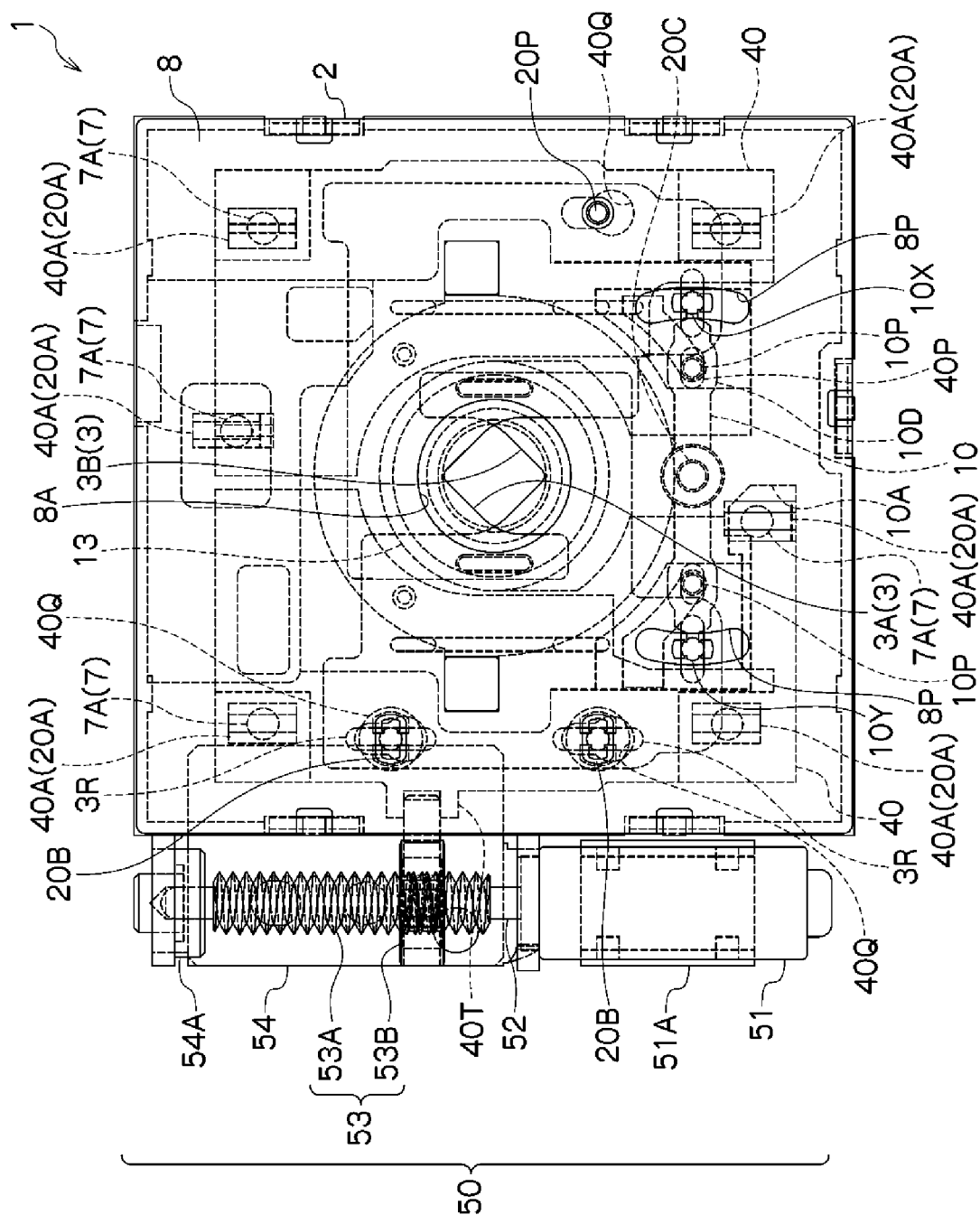
FIG. 18 is a plan view of the assembled state of FIG. 17.
Figure 19:
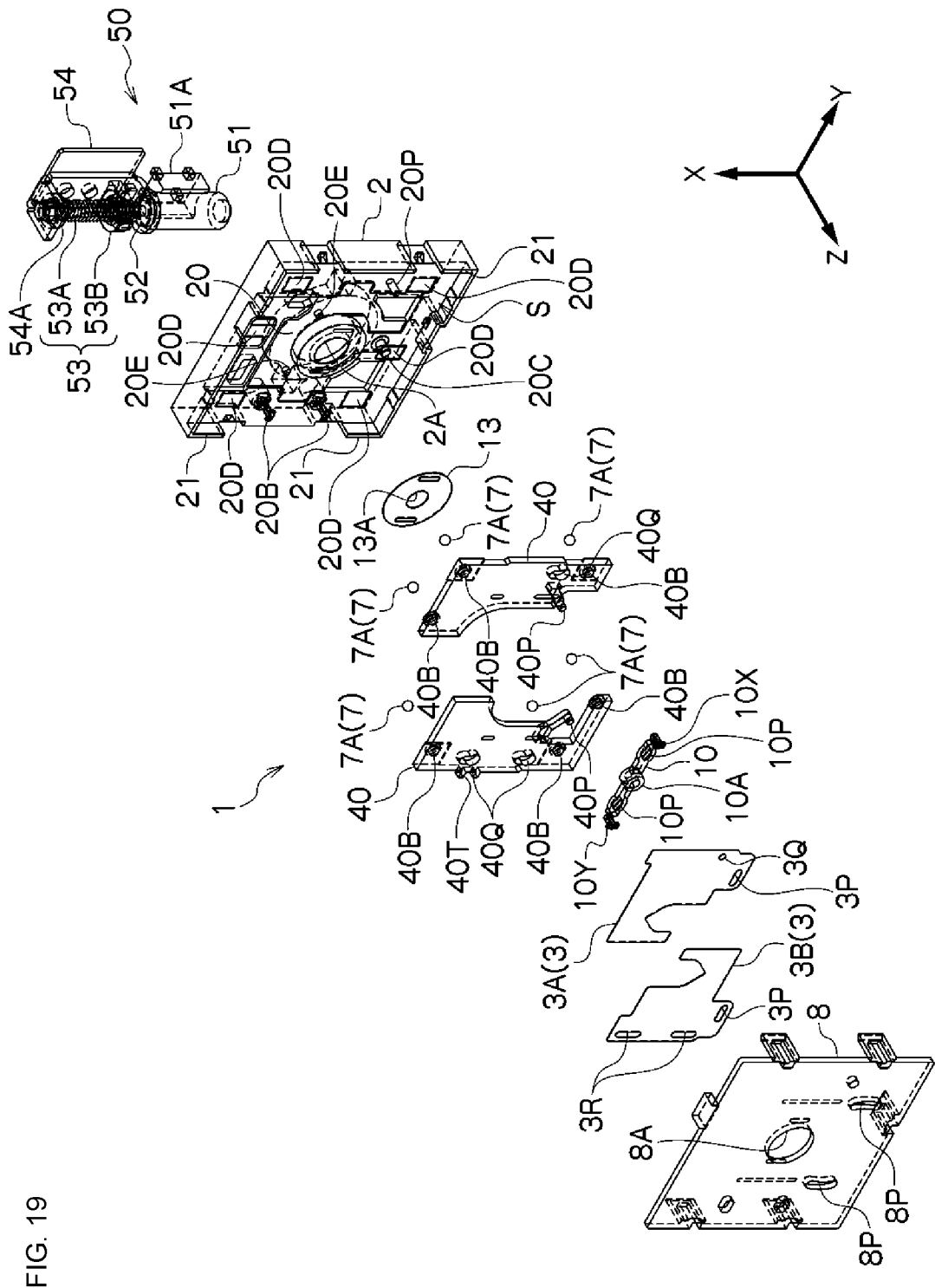
FIG. 19 is an exploded perspective diagram depicting an example of a blade driving device equipped with the driving member depicted in FIG. 16.
Figure 20:
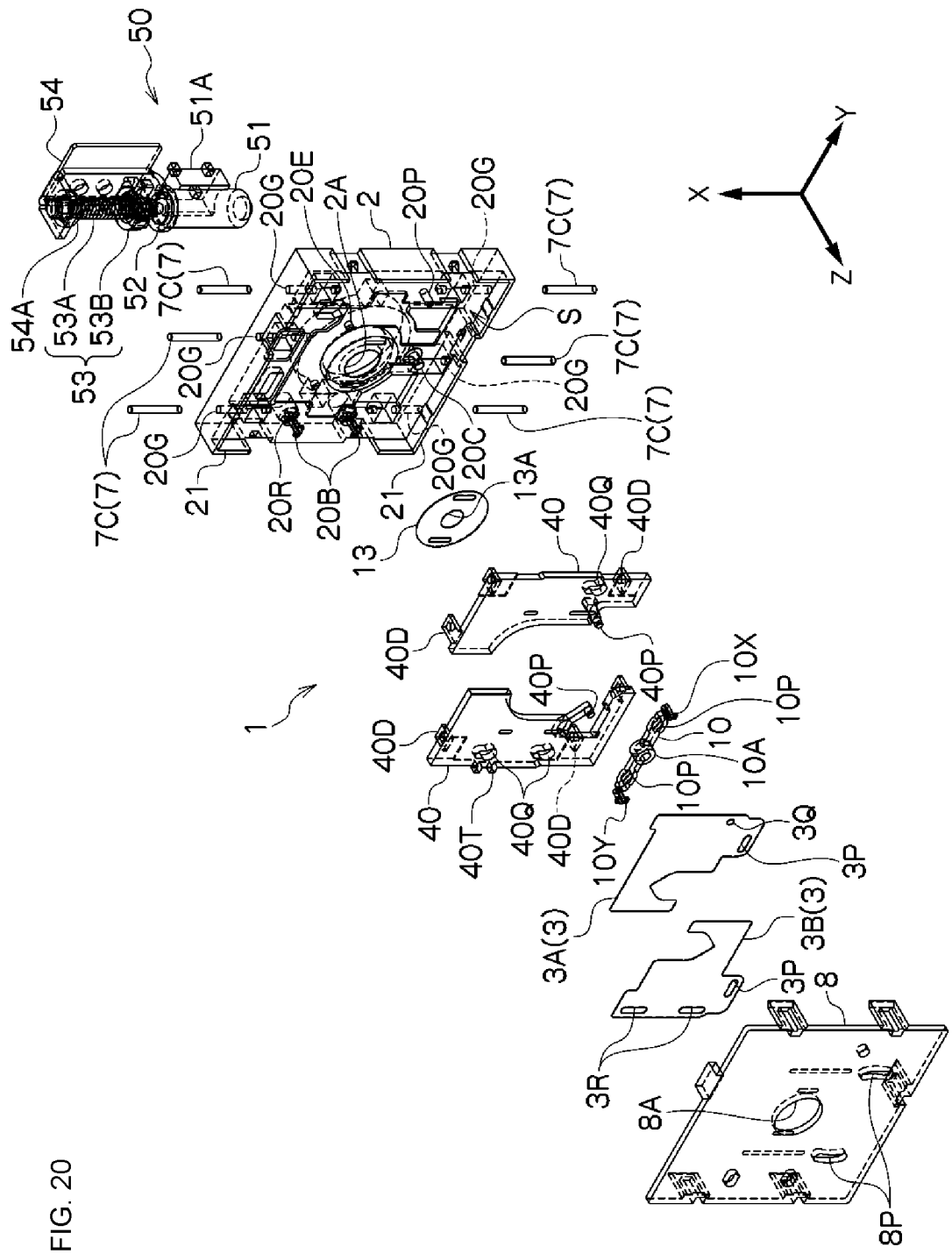
FIG. 20 is an exploded perspective diagram depicting an example of a blade driving device equipped with the driving member depicted in FIG. 16.
Figure 21:
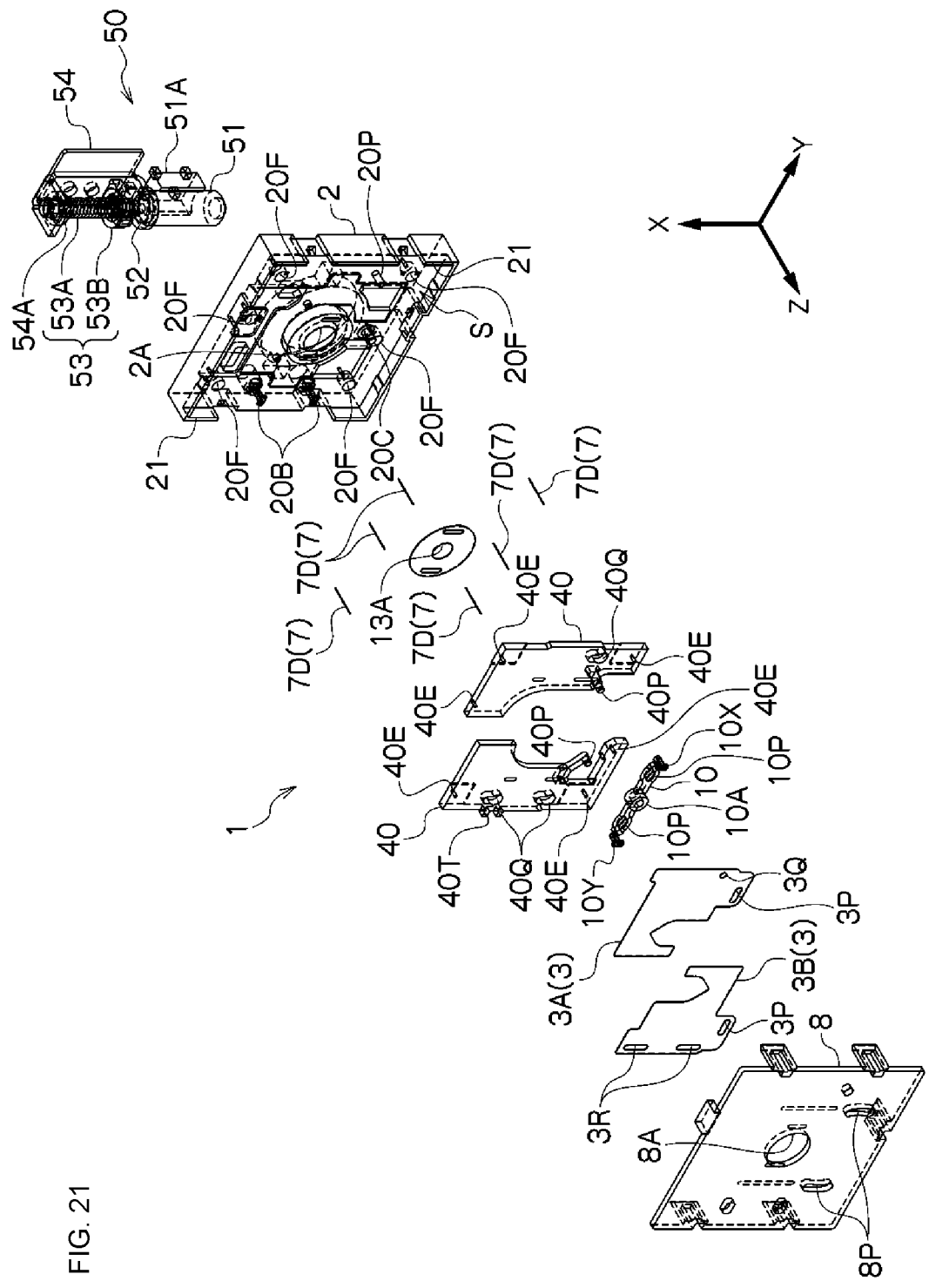
FIG. 21 is an exploded perspective diagram depicting an example of a blade driving device equipped with the driving member depicted in FIG. 16.

Example configurations of blade driving devices 1 that are equipped with a driving member 4 that comprises a driving source of 50 are depicted in FIG. 17 through FIG. 22. The example depicted in FIG. 17 and FIG. 18 is an example that employees a driving member 4 and that comprises the driving source 50 in the example depicted in FIG. 3. The example depicted in FIG. 19 is an example that employees the structure depicted in FIG. 4, as the structure for holding the rolling elements 7A, in the example depicted in FIG. 17. The example depicted in FIG. 20 is an example that employees a driving member 4 and that the driving source 50, in the example depicted in FIG. 11. The example depicted in FIG. 21 is an example that employees a driving member 4 and that the driving source 50, in the example depicted in FIG. 15.

In these examples, one of the pair of driving frames 40 and 40 is caused by the driving source 50 to undergo linear motion in the X direction. The driving frame 40 is coupled with a coupling hole 10P of the operating lever 10, which is born on the bearing portion 10A at the center of the shaft 20C of the base member 2, by a connecting portion (a protruding portion) 40P. Through this, when the one driving frame 40 moves to one side in the X direction, the other driving frame 40 moves to the other side in the X direction.

For the blade members 3 (3A and 3B), one blade member 3A is born through a rotary hole 3Q on a shaft 20P that passes through a through hole 40Q of the driving frame 40, and the other member 3B is supported, so as to be able to slide in the X direction, through an elongated hole 3R on a shaft 20B that passes through a through hole 40Q of the driving frame 40. Moreover, the blade members 3A and 3B are coupled to the end portions 10X and 10Y, respectively, of the operating lever 10 through coupling holes 3P. Through this, when the driving frame 40 is driven by the driving source 50 to move along the X direction, one blade member 3B moves in the same direction as the X direction, while the other blade member 3A moves in the opposite direction along the X direction, while rotating around the shaft 20P.

An opening limiting member 13 is provided in front of the opening 2A of the base member 2, where the opening area (the amount of exposure) when the blade member 3 is fully open is limited accurately by an opening 13A of the opening limiting member 13. Moreover, through the movement of the blade member 3, described above, the blade members 3A and 3B will advance into, or withdraw from, the opening 13A, so that the opening area of the opening 13A (the amount of exposure) is adjusted variably with high accuracy. Note that elongated holes 8P are formed following the rotation of the end portions 10X and 10Y the operating lever 10 in the cover member 8.

Figure 22:
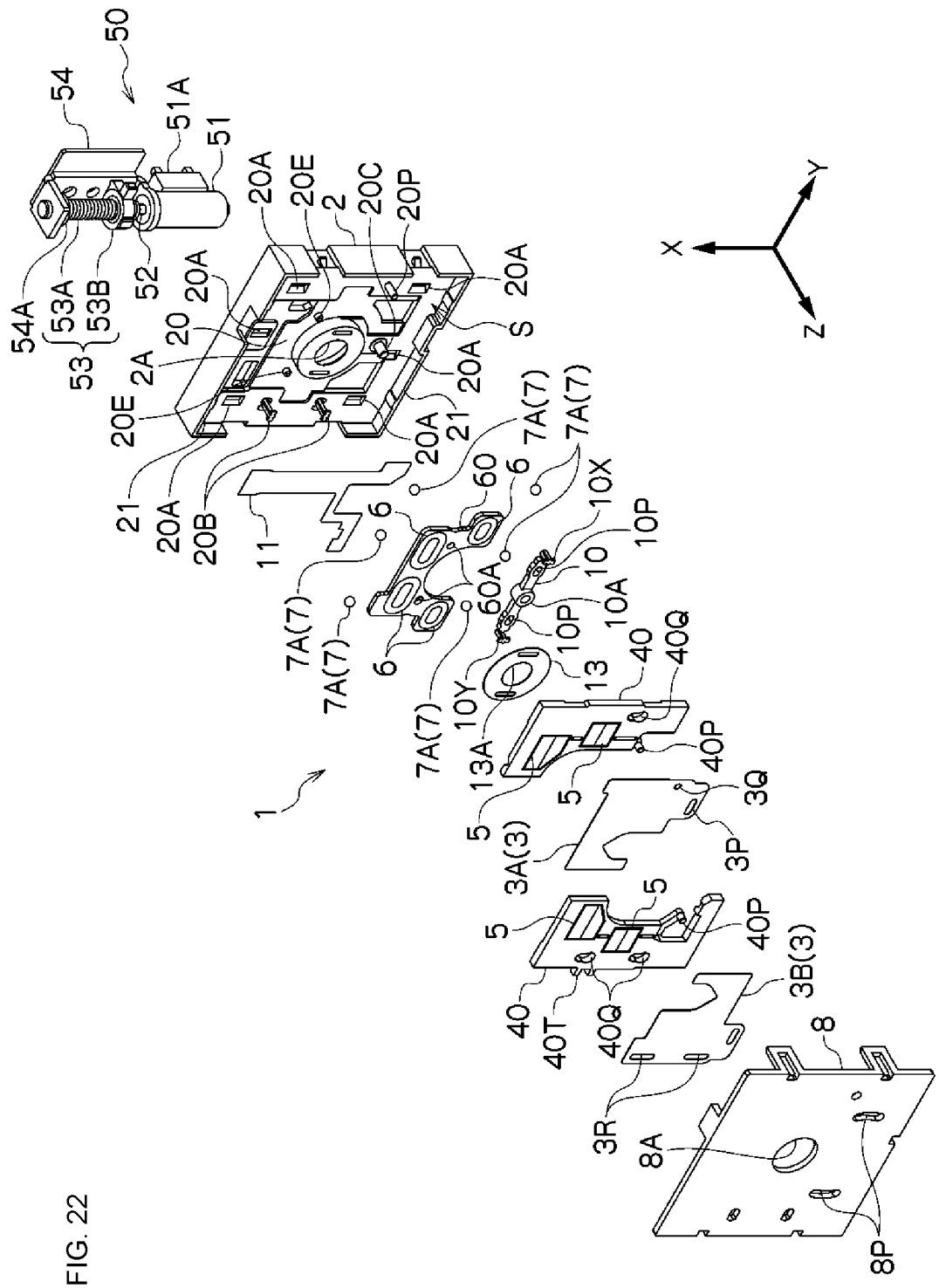
FIG. 22 is an exploded perspective diagram depicting an example of a blade driving device equipped with the driving member depicted in FIG. 16.

In the example illustrated in FIG. 22, magnets 5 for position detection are provided in the driving frame 40, where coils 6 for position detection are provided at positions facing these magnets 5. Through this, when the driving frame 40 moves, driven by the driving source 50, the magnets 5 will move together therewith, and electric currents will flow in the coils 6, due to the electromagnetic induction caused by the movement of the magnets 5. The position of the driving frame 40 can be detected through the currents that flow in the coils 6, making it possible to control with good accuracy the movement of the blade member 3, through feedback control of the driving source 50, based on this positional detection.

Figure 23:
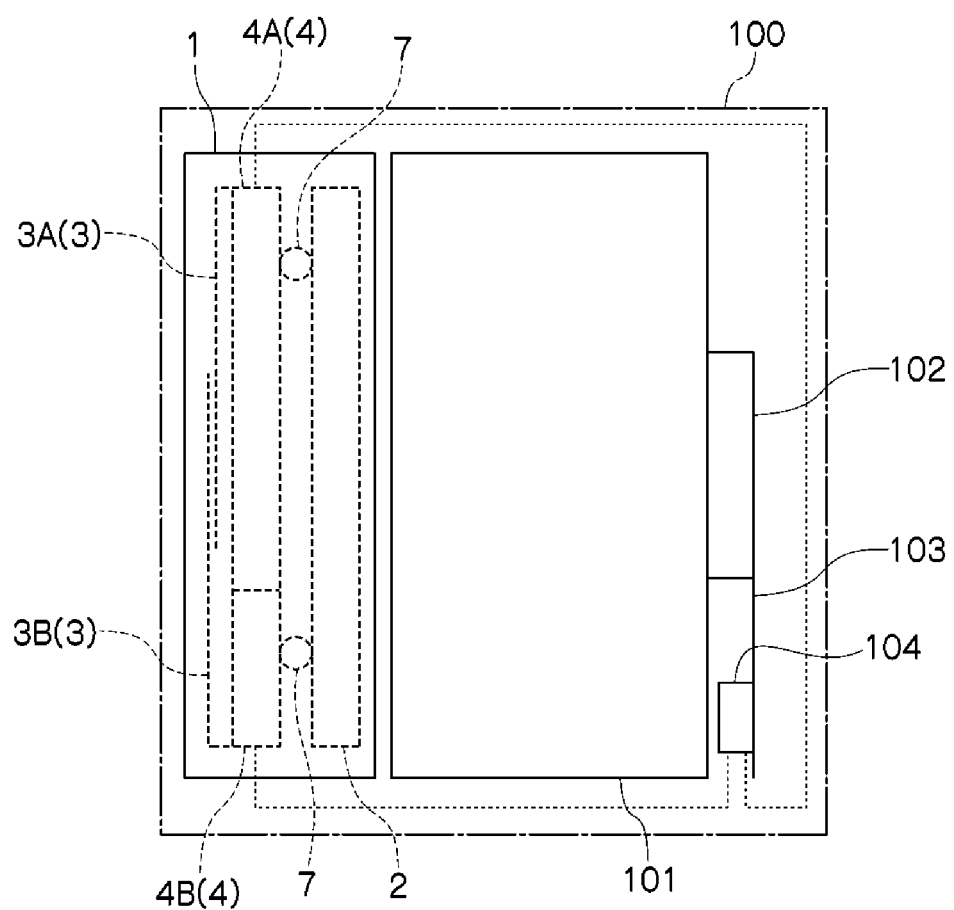
FIG. 23 is an explanatory diagram depicting a camera unit equipped with a blade driving device according to an example according to the present invention.

FIG. 23 depicts a camera unit 100 that comprises a blade driving device 1 wherein the driving member 4 is supported on the base member 2 through supporting members 7. The camera unit 100 comprises a lens driving device 101 that is disposed behind the blade driving device 1 and is provided with an imaging element 102 for capturing an image that is focused on the lens by the lens driving device 101, disposed to the rear of the lens driving device 101. In the example in the figure, a controlling portion 104 is provided on a circuit board 103 whereon the imaging element 102 is mounted, where the controlling portion 104 outputs a control signal for controlling the driving member 4, based on brightness detected by the imaging element 102. In this type of camera unit 100, the provision of the thin blade driving device 1 that has a small installation area enables the mounting space to be reduced, enabling the camera unit 100 as a whole to be made smaller.

Moreover, the use of the blade driving device 1 as a shutter device enables the provision of a shutter device able to achieve a high shutter speed, with rapid responsiveness, through the smooth movement of the driving member 4. The use of the blade driving device 1 as an iris device or an optical filter enables achievement of high resolution brightness control through smooth movement of the driving member 4.

Figure 24:
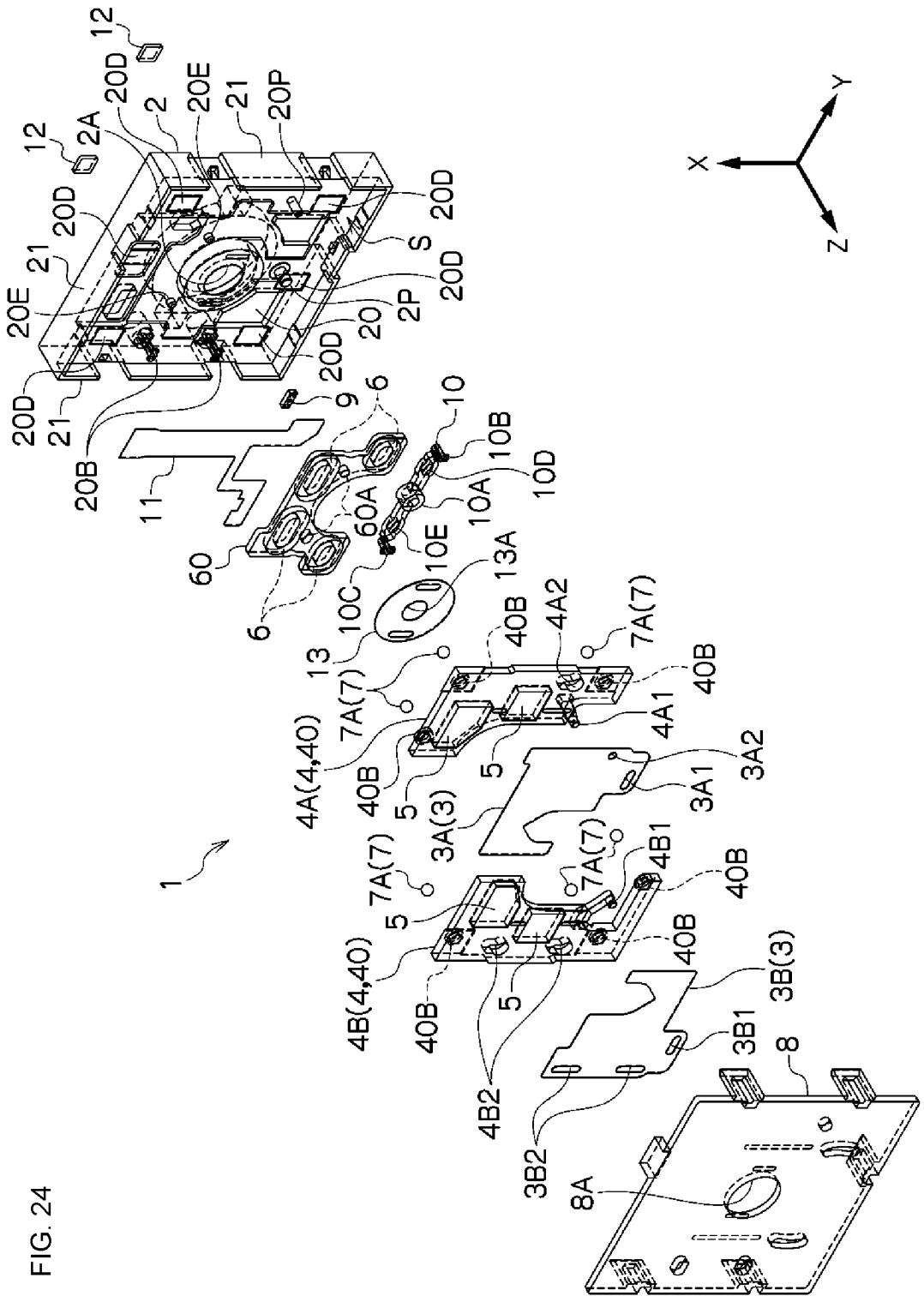
FIG. 24 is an explanatory diagram (an exploded perspective diagram) of an example wherein an operating lever (a connecting member) is provided.

Examples wherein operating levers (connecting members) are provided will be explained in greater detail through FIG. 24 through FIG. 26. In the example depicted in FIG. 24, the driving members 4 are supported slidably on the base member 2 through rolling elements 7A (supporting members 7), where the pair of driving members 4A and 4B are linked through the operating lever 10 that is born on the base member 2, so that the pair of blade members 3A and 3B is also linked thereby.

In the example in the figures, the driving members 4 are movable element of an electromagnetic actuator for linear driving made from magnets 5 and coils 6, as a driving source for linear motion. The driving members 4 comprise driving frames 40 and magnets 5 that are held on the driving frames 40, where there is a pair of driving f 40, and a plurality of magnets 5 is held on each. While here an example is depicted wherein a driving source of the plurality of magnets 5 and a plurality of coils 6 is provided, a single driving source may be provided instead. The driving source for the driving members 4 is not limited to electromagnetic actuators as described above, but rather may employ any of a variety of types of driving sources, such as piezoelectric actuators, electromagnetic plungers, and the like.

Figure 25:
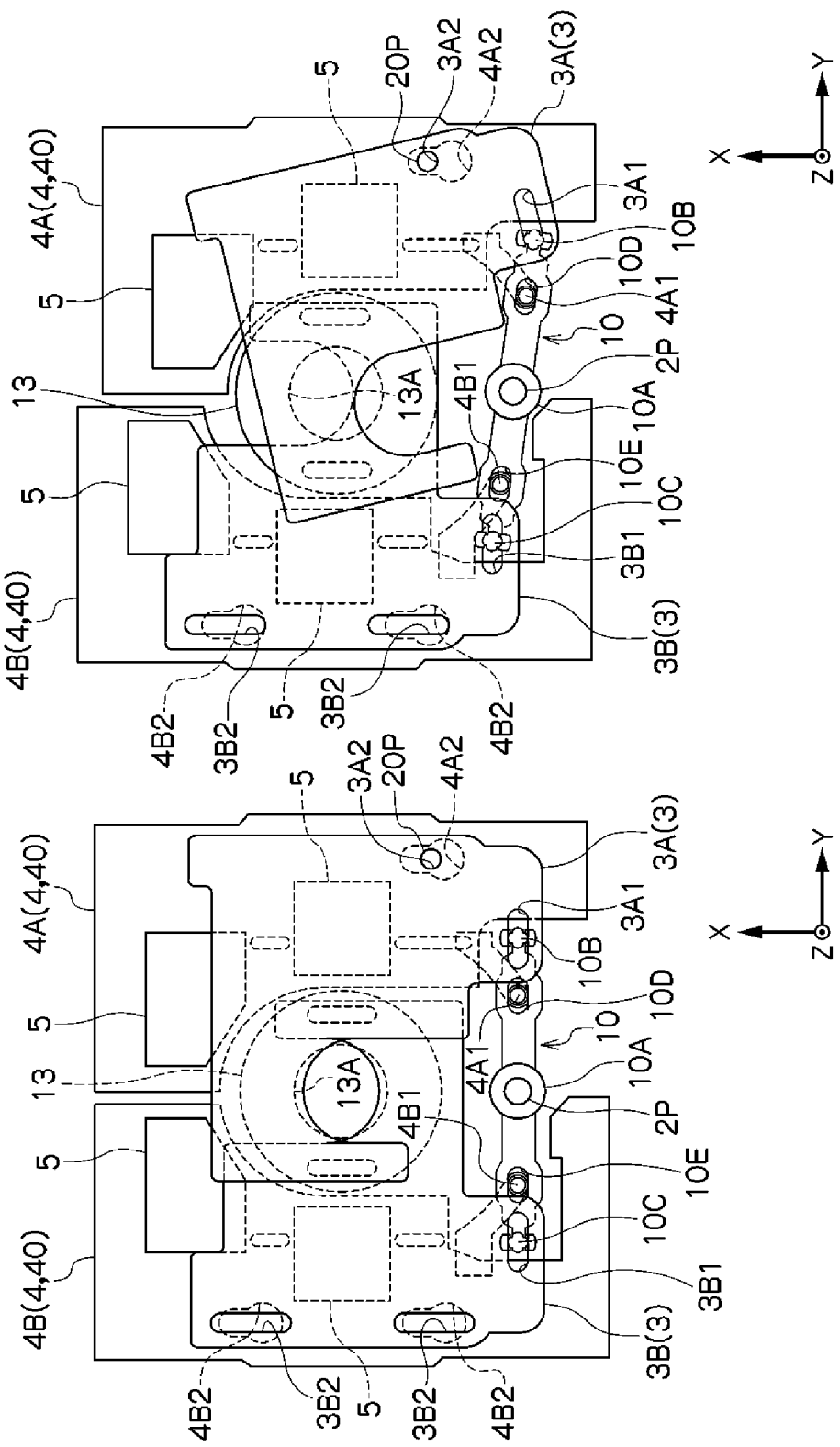
FIG. 25(a) is an explanatory diagram of an example wherein an operating lever (a connecting member) is.
FIG. 25(b) is an explanatory diagram of an example wherein an operating lever (a connecting member) is provided in a state wherein the opening is closed.

As illustrated in FIG. 25, in the operating lever 10, a bearing portion 10A is born on a shaft 2P that is provided on the base member 2, where the left and right end portions 10B and 10C are connected respectively to connecting portions 3A1 and 3B1 of blade members 3A and 3B. Moreover, connecting portions 4A1 and 4B1 in the driving members 4A and 4B are connected to the left and right connecting portions 10D and 10E of the operating lever 10. The blade member 3B has a guide hole 3B2 along the direction of linear motion of the driving member 4, and the blade member 3A has a guide hole 3A2. The guide hole 3B2 engages with a shaft 20B of the base member that passes through an escape hole 4B2 that is provided in the driving member 4B, where the guide hole 3A2 engages with the shaft 20P of the base member, which passes through the escape hole 4A2 that is provided in the driving member 4A. The shafts 20B and 20P protrude from the base member 2 along the optical axis.

When the driving members 4A and 4B undergo linear motion along the X direction in mutually opposing directions, they move from the opened state of the blade members 3A and 3B, illustrated in FIG. 25 (*a*) (which is not a fully open state) to the blocked state of the blade members 3A and 3B, depicted in FIG. 25 (*b*). At this time, through the connecting portions 4A1 and 4B1 of the driving members 4A and 4B, the operating lever 10 rotates to cause the blade member 3B to undergo rotational movement around the shaft 20P, in relation to the linear motion of the blade member 3A, in the same direction as the driving member 4A, enabling the blade members 3A and 3B to open and close through amplifying the amount of linear motion of the driving members 4A and 4B.

The opening 2A of the base member 2 is covered by an aperture plate 13 that has a prescribed aperture shape 13A. Through this, when the blade member 3 is fully open, the aperture shape 13A of the aperture plate 13 is open, making it possible to set accurately, through the aperture shape 13A, the amount of light that passes through when the blade member 3 is fully opened. Moreover, through the overlap of the aperture shape 13A and the blade members 3 (3A and 3B), the brightness of the light that passes therethrough can be adjusted accurately.

Figure 26:
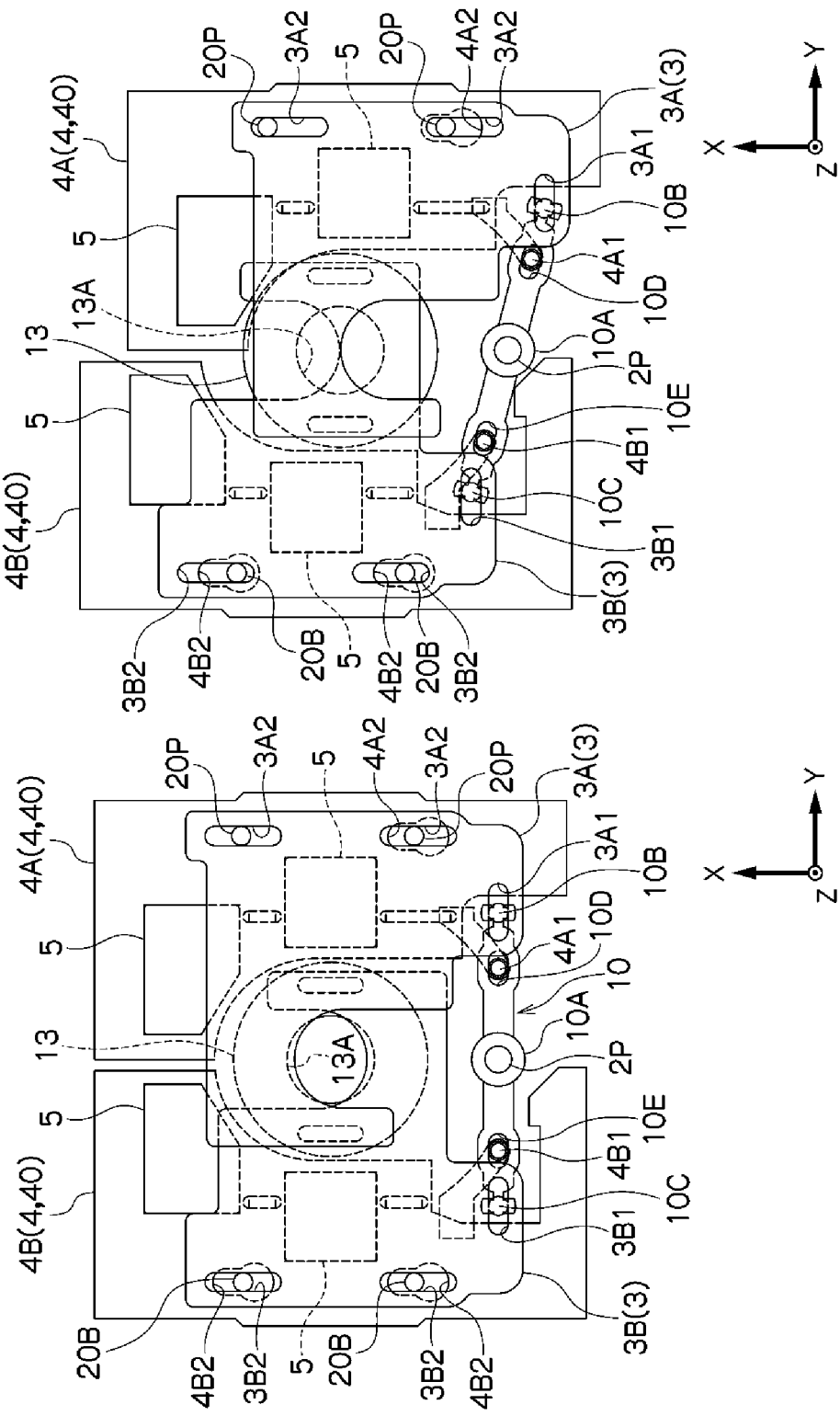
FIG. 26(a) is an explanatory diagram of an example wherein an operating lever (a connecting member) is provided.
FIG. 26(b) is an explanatory diagram of an example wherein an operating lever (a connecting member) is provided in a state wherein the opening is closed.
Figure 27:
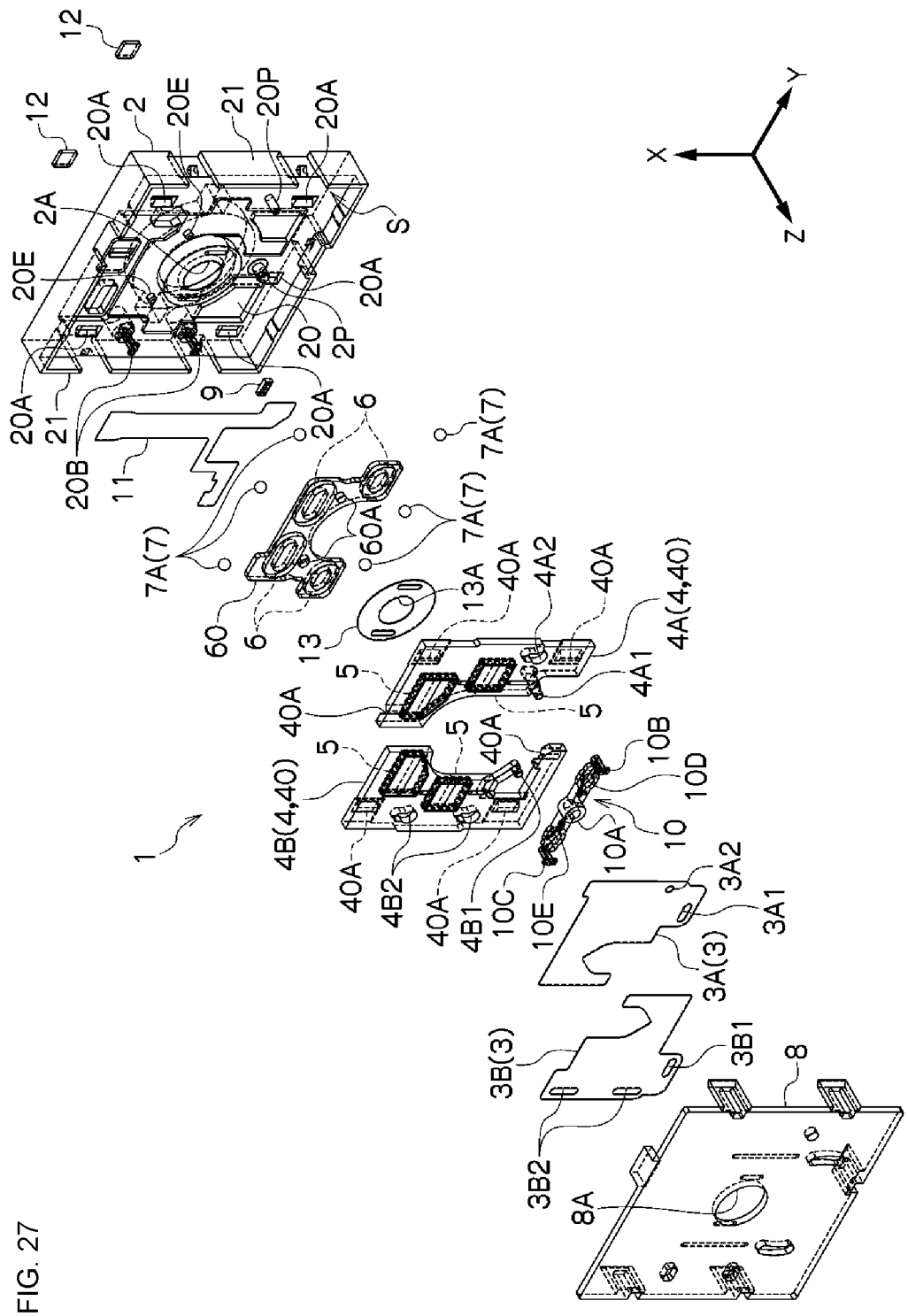
FIG. 27 is an explanatory diagram (an exploded perspective diagram) of an example wherein an operating lever (a connecting member) is provided.
Figure 28:
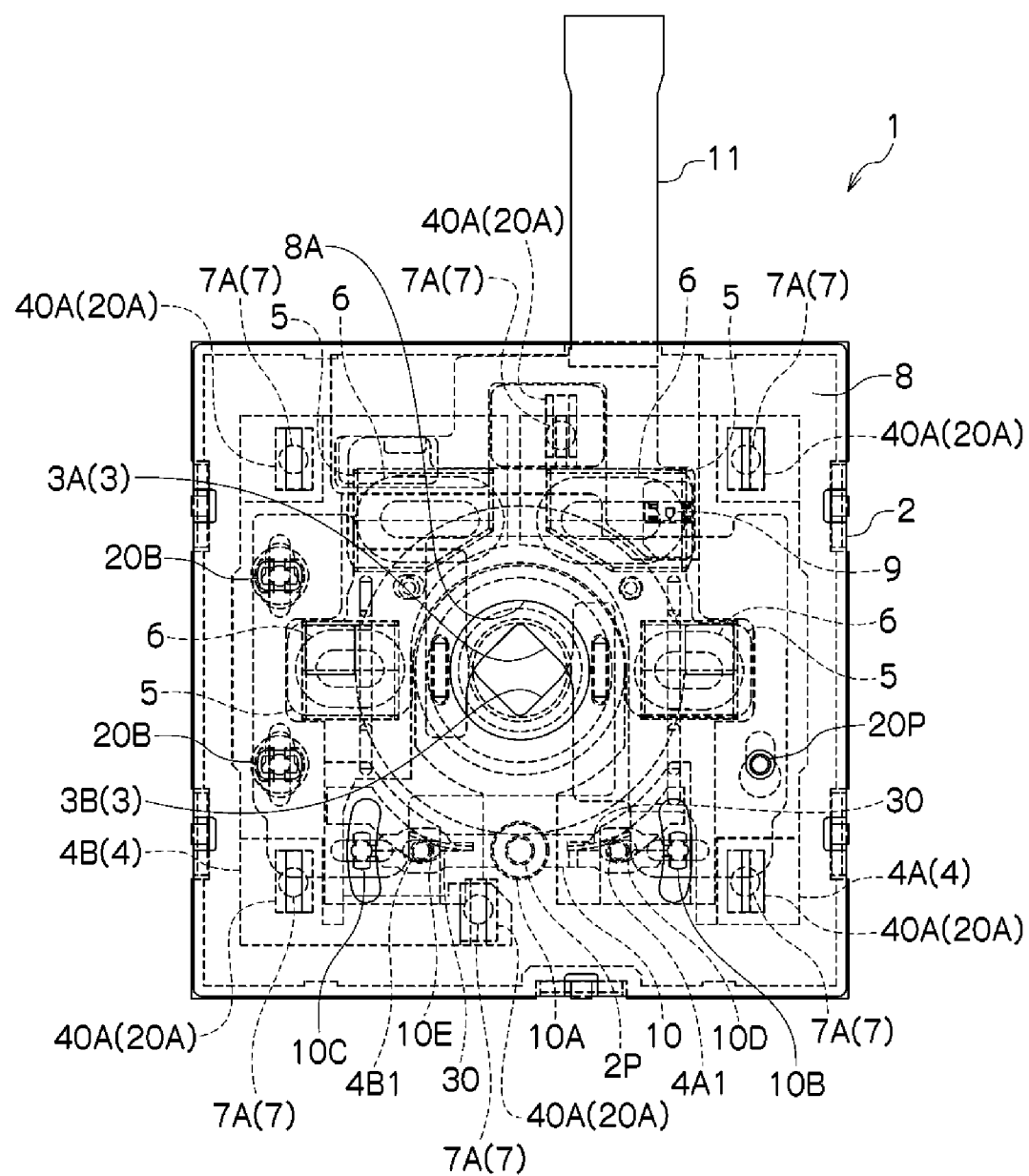
FIG. 28 is an explanatory diagram (a plan view) of an example wherein an operating lever (a connecting member) is provided.

The example depicted in FIG. 26 is a modification of the example depicted in FIG. 25. In this example, both blade members 3A and 3B comprise guide holes 3A2 and 3B2 that extend in the X direction, where shafts 20P and 20B that protrude in the optical axial direction from the base member 2 engage with these guide holes 3A2 and 3B2. Through this, the movement of the driving members 4 (4A and 4B) in the X direction causes the blade members 3A and 3B to undergo linear motion along the X direction through the operating lever 10.

FIG. 27 through FIG. 35 depict more specific example configurations of blade driving devices 1 according to examples according to the present invention. In the example depicted in FIG. 27, the driving members 4 are supported slidably on the base member 2 through rolling elements 7A (supporting members 7), where the pair of driving members 4A and 4B are linked through the operating lever 10 that is born on the base member 2, so that the pair of blade members 3A and 3B is also linked thereby. The rolling elements 7A are supported, with the directions thereof constrained by the supporting groups 40A of the driving frame 40 and the supporting grooves 20A of the base member 2.

In the example in the figure, elastic members 30 are provided in the connecting portions (linking portions) 10D and 10E that connect the driving members 4 and the operating lever 10. The elastic member 30 has the function of suppressing connection play that is produced through play, provided between the connecting portions (protruding portions) 4A1 and 4B1 that are provided on the driving member 4 side and the hole portions of the connecting portions 10D and 10E that fit therewith. The provision of play in the fit between the hole portions (elongated holes) of the connecting portions 10D and 10E and the connecting portions (protruding portions) 4A1 and 4B1 that are provided in the driving members 4 enable the movement of the driving members 4 and the movement of the operating lever 10 to be linked smoothly. However, connection play is produced through this play, where this connection play produces movement in the blade member 3, through, for example, shaking of the camera, and through a change in the direction in which gravity acts due to a change in the orientation of the camera, which is an encumbrance when attempting to control the opening/closing state of the blade member 3 with good accuracy.

The elastic members 30 are attached, so as to bias the connecting portions (protruding portions) 4A1 and 4B1 that fit into the hole portions of the connecting portions (linking portions) 10D and 10E, within the hole portions. In this state, the connecting portions (protruding portions) 4A1 and 4B1 can move within the hole portions of the connecting portions 10D and 10E against the elastic forces of the elastic members 30 when driving forces are applied, but in a state wherein no driving forces are applied, they are pressed by the elastic forces of the elastic members 30, so as to prevent connecting play, causing the connecting portions 10D and 10E to be in a stationary state within the hole portions.

In the example in the figure, the elastic members 30 are wire members (rod members) that are supported on one end, where one end side of the elastic member 30 is engaged with an engaging portion 10F that is provided on the periphery of the connecting portion 10D or 10E. If necessary, an adhesive agent may be filled into the engaging portion 10F. The adhesive agent may be selected as appropriate, such as an optically curable adhesive agent, a thermally curable adhesive agent, or the like. In the example in the figure, an example is depicted wherein the elastic member 30 is a wire member (a rod member), but there is no limitation thereto, but it may instead be a plate-shaped member (a plate material). The material for the elastic member 30 may use a metal, a resin, or the like, that has elasticity.

Moreover, in the blade driving device 1, the provision of the elastic members 30 in the connecting portions 10D and 10E for the driving members 4 and the operating lever (the connecting member) 10 makes it possible to suppress connection play therebetween while smoothly transferring the movement of the driving member 4 to the operating lever (the connecting member) 10. This suppresses the movement in the blade member 3 that is produced through camera shaking, and the like, or when the direction in which the force of gravity acts changes due to a change in orientation of the camera, making it possible to control the state of opening/closing of the blade member 3 with good accuracy.

FIG. 30 shows the effects of providing the elastic members 30. The variability in the change of brightness (AV=log 2N2, where N is the iris value) as a function of the amount of movement of the blade is shown for the case wherein elastic members 30 are provided in the connecting portions 10D and 10E (FIG. 30 (b)), and the case wherein no elastic member 30 is provided (FIG. 30 (a)). Here the change in brightness is calculated based on the brightness of the transmitted light in the opening 2A, which changes depending on the movement of the blade members 3A and 3B.

When attempts are made to control, to the design values that are indicated by the solid line, the change in brightness through the amount of movement of the blades, if the elastic members 30 are not provided (referencing FIG. 30 (a)), then the change in brightness relative to the amount of movement of the blades has relatively large variability between the dotted line and the dash-dot line. In particular, the variability is remarkable when the amount with which the blade is moved is large. In contrast, when the elastic members 30 are provided (referencing FIG. 30 (b)), the variability in the change in brightness relative to the amount of movement of the blades is kept small, as shown between the dotted line and the dash-dot line, and even if the amount of movement of the blade is large, the change in brightness is controlled by the amount of movement of the blades to be essentially the same as the design values.

FIG. 31 and FIG. 32 depict another example of a blade driving device 1. In this example, connecting portions 4A3 and 4B3 that have hole portions are provided in the driving members 4, and the operating lever 10 is provided with protruding portions 10L and 10M that fit into the hole portions of the connecting portions 4A3 and 4B3.

The protruding portions 10L and 10M of the operating lever (the connecting member) 10 are provided at intermediate positions between the bearing portion 10A and the end portions 10B and 10C, where the connecting portions 4A3 and 4B3 into which these protruding portions 10L and 10M fit are provided in arm portions of the driving members 4A and 4B. Moreover, the elastic members 30 are attached held on one end thereof in the hole portion peripheries of the connecting portions 4A3 and 4B3 of the driving members 4A and 4B. In this way, the connecting portions 4A3 and 4B3 wherein the elastic members 30 are provided may be provided on the driving member 4 side.

FIG. 33 through FIG. 35 depict another example configuration. The blade driving device 1 in the figures comprises an operating lever 10 that connects the driving members 4 and the blade members 3 (3A and 3B). The driving member 4, which is equipped with a driving frame 40, is supported on the base plane 20 of the base member 2 through rolling elements 7A, supported so as to be able to move in a state wherein it is separated from the base member 2. Given this, a linking portion 10X1, wherein connection play is suppressed, is provided between the driving member 4 and the operating lever 10.

The linking portion 10X1 links the driving member 4 and the operating lever 10 through a magnetic force (magnetic attraction or magnetic repulsion). Explaining in more detail, the linking portion 10X1 is provided with a magnet 5X that attracts or repels the magnet 5 that is provided on the driving member 4.

The magnet (linking magnet) 5X that is provided in the linking portion 10X1 is disposed facing, and adjacent to, the magnet (driving magnet) 5 that is provided on the driving member 4, and causes the operating lever 10 to undergo rotational motion, linked by the magnetic force (the magnetic attraction or magnetic repulsion) of the magnet 5X in relation to the linear motion of the driving member 4 (motion along the X direction in the figures). The attraction or repulsion of the magnet 5X that is provided in that the linking portion 10X1 in relation to the magnet 5 that is provided in the driving member 4 is set through the opposing magnetic poles of the magnet 5 and the magnet 5X being disposed with opposite polarities or disposed with identical polarities. In the example in the figures, the magnet 5X of the linking portion 10X1 is linked to the magnet 5 for driving, provided on the driving member 4; however, there is no limitation that thereto, but rather the magnet for linking may be provided separately from the driving member 4.

In this example, the operating lever 10 has a linking portion 10X1 provided on one end side thereof, and is connected to the blade member 3B (3) on the other end side thereof, and is supported at an intermediate position between the one end side and the other end side. More specifically, a bearing portion 10A of the operating lever (the connecting member) 10 is born on a shaft 2P of the base member 2, where a linking portion 10X1 is provided on the end portion of one end side of the operating lever (the connecting member) 10 and the end portion 10Y on the other end side is connected to a connecting portion 3B1 of the blade member 3B.

Through this, when the driving member 4 (the driving frame 40) is moved in the X direction in the figures through driving of an electric current in the coils 6, then, in coordination therewith, the operating lever 10 rotates around the shaft 2P, where, through this rotation, one of the blade members 3B advances or withdraws on in relation to the opening 2A. Moreover, in the example in the figures, the other blade member 3A is attached as a single unit with the driving member 4 (the driving frame 40), and thus through movement of the driving member 4 in the direction of X in the figures, advances or withdraws relative to the opening 2A. Here the operating lever (the connecting member) 10 has the function of linking the movement of the two blade members 3A and 3B.

In the example in the figures, one of the blade members 3B is coupled to one end side of the operating lever 10 and the other blade member 3A is attached as a single unit to the driving member 4, but there is no limitation thereto, but rather the blade member may be integrated with, for example, the operating lever 10 instead.

Because, in the blade driving device 1 depicted in FIG. 33 through FIG. 35, the driving members 4 and the operating lever 10 are linked through magnetic forces, it is possible to eliminate the connection play that is inevitable when the driving members 4 and the operating lever 10 are linked mechanically. Consequently, this enables smooth operation of both, without producing connection play, when the end portions of the operating lever 10, which move in arcs, are linked to the driving member 4 that moves linearly.

Such a blade driving device 1 is able to cause the movable members to move smoothly, and even when achieving a reduction in size and a reduction in thickness of blade driving device 1, enables continuous and accurate high-resolution control of the movement of the blade members 3 (3A and 3B). Moreover, because the play in the linking portions between members is suppressed, the state of the opening/closing of the blade members 3 (3A and 3B) can be controlled accurately. For example, there is a limit to the sizes of the individual components with a camera in a mobile telephone, and thus the aperture of the lens, or the like, is small, so the effect of play when driving is large, with the risk that it may become impossible to achieve the desired exposure control. In contrast, with the blade driving device 1 according to the present example, the desired exposure control can be carried out more appropriately due to the ability to control the state of opening/closing of the blade member 3 with better accuracy.

Moreover, because, in the blade driving device 1 that is depicted in FIG. 33 through FIG. 35, the driving members 4 and the operating lever 10 are linked through magnetic forces, there is no need for assembling with high accuracy for the positional relationships between the linking portions 10X1 and the driving members 4, but the linking portions 10X1 need merely be disposed within a range reached by the magnetic forces. Through this, the assembly of the driving device 1 can be carried out easily, enabling an improvement in the manufacturability of the blade driving device 1.

FIG. 36 through FIG. 42 depict other example configurations in relation to the driving source in a blade driving device 1 according to an example according to the present invention. The blade driving device 1 depicted in FIG. 36 and FIG. 37 comprises a base member 2, a blade member 3, and a driving member 4, and also comprises a driving source 50 for driving the driving member 4, where the driving source 50 is similar to that of the examples described above in the point that it is made from magnets 5 and coils 6, but here an improvement in the driving force is achieved through specifying the layout of the magnets 5 and the coils 6.

FIG. 38 depicts an example configuration of the driving source 50 (wherein (a) is an explanatory diagram that is a plan view and (b) is a cross-sectional view along the section X-X thereof). The magnet 5 of the driving source 50 is provided with a unit magnetized portion 5U that is magnetized along the optical axial direction (the Z direction in the figures). In the example depicted in FIG. 38, a single unit magnetized portion 5U is formed from a single dipole magnet. Moreover, the coil 6 of the driving source 50 comprises a coil portion 6U that has a pair of linear parts 6L that generated a driving force through application of an electric current thereto, where, in the example depicted in FIG. 38, two coil portions 6U are disposed above a single unit magnetized portion 5U in the magnet 5. Note that here the linear part 6L need not necessarily be formed so as to be completely straight, but may include a bend part with a radius of curvature that is larger than that of another portion.

Additionally, in the driving source 50, two coil portions 6U are lined up along the driving direction (the direction of movement of the driving member 4) Xa, where two linear parts 6L, wherein the directions of the applied currents, indicated by the dotted line arrows, are in the identical direction, are disposed in relation to a single unit magnetized portion 5U. To have the directions in which electric current is applied to the two linear parts 6L over a single unit magnetized portion 5U be the same direction the directions of coiling should be in mutually opposing coiling directions in the case of two adjacent coil portions 6U being connected in series; however the two coil portions 6U may be connected individually (in parallel) instead, so as to have the directions in which the electric currents are applied to the two linear parts 6L, over a single unit magnetized portion 5U, be in identical directions.

Such a driving source 50 makes it possible to produce a strong driving force through the application of an electric current to the two coil portions 6U, using the installation area for the unit magnetized portion of 5U effectively, through the lines of magnetic force that exit the north pole of the unit magnetized portion 5U and that arrive at the south pole thereof cut across, in identical directions, the two linear parts 6L to which electric currents are applied in identical directions. This makes it possible to achieve a relatively strong driving force while reducing the space required for installing the driving source 50, making it possible to achieve miniaturization, enabling achievement of an adequate driving force wherein the blade member can be controlled at high speeds and with high resolution.

Moreover, when two linear parts 6L to which electric currents are applied in identical directions are disposed in relation to a single unit magnetized portion 5U, it is possible to increase the driving force without changing the value of the electric currents that are applied (that is, without changing the amount of electric power consumed) when compared to the case of disposing a single linear part of a coil portion for each unit magnetized portion 5U. This makes it possible to both increase the driving force and conserve electric power in the driving source 50. This can increase the performance in the imaging operation of a camera unit, or the like, while suppressing consumption of the battery power, when the blade driving device that is driven by such a driving source 50 is equipped in a battery-powered mobile electronic device.

Because in such a blade driving device 1 the driving members 4 that are supported, through rolling elements 7, in a state separated from the base member 2 are driven by a driving source 50 that can produce a relatively high driving force, relative to the space for installing the magnet 5, this enables continuous operating control of the blade member 3 with high resolution and high accuracy. Moreover, because the driving source 50 is disposed between the driving member 4, which moves within a plane, and a planer base member 2, this enables the blade driving device 1 as a whole to be made thinner. Furthermore, because the coil portions 6U of the coil 6 are disposed efficiently in relation to a single unit magnetized portion 5U, miniaturization of the blade driving device 1 can be achieved while still producing a large driving force.

In the example depicted in FIG. 36 and FIG. 37, the supporting members 7 (rolling elements 7A) are interposed between the base member 2 and the driving member 4, and thus the driving member 4 is supported slideably on the base member 2; however, here the supporting members 7 need not necessarily be rolling elements (bearings) 7A, as illustrated in the figure, but may instead be rollers 7B, shafts 7C, elastic members (springs or wires) 7D, or the like, as described above, wherein the direction of rolling is constrained.

Other example configurations of driving sources 50 are depicted in FIG. 39 and FIG. 40. (a), (b), (c), and (d) in FIG. 39 are all magnets 5 wherein unit magnetized portions 5U are arranged in a plurality along the driving direction Xa. A unit magnetized portion 5U, as described above, is a single magnetized unit that is magnetized along the optical axial direction (the Z direction in the figures), but when a plurality thereof are arranged in a line, the magnet 5 may be formed through arranging a plurality of dipole magnets, each magnetized in the optical axial direction, in tight contact with each other, or by partially magnetizing within a single magnet, a magnet 5 may be obtained wherein a plurality of unit magnetized portions 5U are arranged in a line. In this case, a plurality of unit magnetized portions 5U may be arranged in a line in the driving direction Xa so that adjacent magnetic poles are of mutually opposing polarities.

In the example depicted in FIG. 39 (a), two unit magnetized portions 5U of a magnet 5 are arranged in a line along the driving direction Xa. In relation thereto, three coil portions 6U of a coil 6 are disposed over the magnet 5. Given this, in relation to a single unit magnetized portion of 5U, two linear parts 6L, having identical directions for the directions in which the electric current is applied, are disposed in relation to a single unit magnetized portion 5U.

In the example depicted in FIG. 39 (b), three unit magnetized portions 5U of a magnet 5 are arranged in a line along the driving direction Xa. In relation thereto, four coil portions 6U of a coil 6 are disposed over the magnet 5. Given this, in relation to a single unit magnetized portion of 5U, two linear parts 6L, having identical directions for the directions in which the electric current is applied, are disposed in relation to a single unit magnetized portion 5U.

In the examples depicted in FIGS. 39 (a) and (b), if the number of unit magnetized portions 5U of the magnet 5 is defined as N, then the number of coil portions for the coil 6 will be N+1. For the number N of the unit magnetized portions 5U in the magnet 5, an appropriate number thereof may be arranged depending on the amount of movement of the driving member 4 along the driving direction Xa, and depending on the driving force that is to be set. In these examples, the width of the array of magnets 5 can be reduced, in relation to the width of the array of coils 6, and a desired driving force can be produced.

In the example depicted in FIG. 39 (c), three unit magnetized portions 5U of a magnet 5 are arranged in a line along the driving direction Xa. In relation thereto, two coil portions 6U of a coil 6 are disposed over the magnet 5. Given this, in relation to a single unit magnetized portion of 5U that is disposed in the center, two linear parts 6L, having identical directions for the directions in which the electric current is applied, are disposed in relation to a single unit magnetized portion 5U.

In the example depicted in FIG. 39 (d), four unit magnetized portions 5U of a magnet 5 are arranged in a line along the driving direction Xa. In relation thereto, three coil portions 6U of a coil 6 are disposed over the magnet 5. Given this, in relation to a single unit magnetized portion of 5U, other than at the two end portions, two linear parts 6L, having identical directions for the directions in which the electric current is applied, are disposed in relation to a single unit magnetized portion 5U.

In the examples depicted in FIGS. 39 (c) and (d), if the number of unit magnetized portions 5U of the magnet 5 is defined as N, then the number of coil portions for the coil 6 will be N−1. For the number N of the unit magnetized portions 5U in the magnet 5, an appropriate number thereof may be arranged depending on the amount of movement of the driving member 4 along the driving direction Xa, and depending on the driving force that is to be set. In these examples, the width of the array of coils 6 can be reduced, in relation to the width of the array of magnets 5, and a desired driving force can be produced.

FIG. 40 depicts an example wherein the driving source 50, depicted in FIG. 39, is installed. A driving source 50 such as depicted in FIG. 39 can be provided in a plurality in relation to the base member 2. In the example in the figure, a driving source 50 is disposed on both the left and the right sides of the opening 2A, to drive the pair of driving members 4A and 4B in mutually differing directions; however, there is no limitation thereto, but rather these may be installed as appropriate.

Other example configurations of driving sources 50 are depicted in FIG. 41 and FIG. 42. The examples depicted in FIGS. 41 (a) and (b) are modified examples of the examples depicted in FIGS. 39 (c) and (d) (examples wherein the numbers of coil portions are N−1 in relation to the numbers N of unit magnetized portions 5U). In the example depicted in FIG. 41 (a), three unit magnetized portions 5U of the magnet 5 are arranged in a line along the driving direction the Xa, and two coil portions 6U of the coil 6 are arranged in a line over the magnet 5, so that, for each single unit magnetized portion 5U, two linear parts 6L, having identical directions for the directions in which the electric current is applied, will be disposed in relation to a single unit magnetized portion 5U, except for at both end portions of the magnet 5. In the example depicted in FIG. 41 (b), four unit magnetized portions 5U of the magnet 5 are arranged in a line along the driving direction the Xa, and three coil portions 6U of the coil 6 are arranged in a line over the magnet 5, so that, for each single unit magnetized portion 5U, two linear parts 6L, having identical directions for the directions in which the electric current is applied, will be disposed in relation to a single unit magnetized portion 5U, except for at both end portions of the magnet 5.

Moreover, in the examples depicted in FIGS. 41 (a) and (b), the areas for the surfaces, of the unit magnetized portions 5U, that face the coil 6 are reduced at both end portions of the magnet 5, structured so that the areas at both end portions of the magnet 5 will be smaller than the areas in the other portions. In the example in the figures, when the areas of the unit magnetized portions 5U other than at both end portions of the magnet 5 are defined as a, the areas of the unit magnetized portions 5U at both end portions of the magnet 5 will be a/2. In these examples, the area of the surface of the magnet 5 that faces the coil 6 will have a total area of south poles in the unit magnetized portion 5U that is equal to the total area of the north poles in the unit magnetized portions 5U. Structuring in this way can reduce the width of the array of magnets 5 and the width of the array of coils 6 in the driving source 50, and can also produce a driving force that is sufficient because the linear parts 6L in the coil 6 are arranged efficiently in relation to the unit magnetized portions 5U in the magnet 5.

FIG. 42 depicts an example wherein the driving source 50, depicted in FIG. 41, is installed. A driving source 50 such as depicted in FIG. 41 can be provided in a plurality in relation to the base member 2. In the example in the figure, a driving source 50 is disposed on both the left and the right sides of the opening 2A, to drive the pair of driving members 4A and 4B in mutually differing directions; however, there is no limitation thereto, but rather these may be installed as appropriate.

In the blade driving devices 1 according to all of the examples described above, back yolks 12 are provided, and the positions of the driving member 4 when driven (when an electric current is applied) and when not driven (when no electric current is applied) are held by the magnetic force of the magnet 5 that acts on the back yoke 12. FIG. 43 through FIG. 46 show the positional relationships between the back yoke 12 and the magnet 5 that is provided on the driving member 4 (where (a) is a cross-sectional explanatory diagram and (b) is a planar explanatory diagram).

As illustrated in FIG. 43, providing a back yoke 12 on one side of the opening 2A in relation to the position of the driving member 4 when not driven makes it possible to move and hold the driving member 4 on one side of the opening 2A through the magnetic force of the back yoke 12 and the magnet 5 when the driving member 4 is driven. Conversely, it makes it possible to move and hold the driving member 4 on one side of the opening 2A through the magnetic force of the back yoke 12 and of the magnet 5 when the driving member 4 is not driven.

Moreover, as depicted in FIG. 44, the provision of back yolks 12 on both sides of the opening 2A in relation to the position of the driving member 4 when not driven enables holding of the driving member 4 at both sides of the opening 2A (on one side or the other side) through the magnetic force of the back yoke 12 and the magnet 5 when the driving member 4 is driven. Moreover, conversely, it makes it possible to hold the driving member 4 on both sides of the opening 2A (on one side and the other side) through the magnetic force of the back yoke 12 and the magnet 5 when the driving member 4 is not driven.

Moreover, as illustrated in FIG. 45, the driving member 4 can be held along a direction that is perpendicular to the optical axis O by the magnetic force of the back yoke 12 and the magnet 5 when driven or when not driven, and as depicted in FIG. 46, the driving member 4 can be held along the direction of the optical axis O by the magnetic force of the back yoke 12 and the magnet 5 when driven or when not driven. When the driving member 4 is held along the optical axis O direction, by holding at the position of essentially the center of gravity, including the blade member 3, the driving member 4 can be held stably, without being off-angle.

Given this, in addition to the driving member 4 of the blade driving device 1 of the examples described above being held by the magnetic forces described above, or instead of being held by the magnetic forces, it may be held by a spring force. In particular, in holding by a spring force, the position of the driving member 4 when not driven may be held in a neutral position. FIG. 47 depicts a case wherein the driving member 4 is held on the base member 2 by a spring force (wherein (a) is a cross-sectional explanatory diagram and (b) is a planar explanatory diagram). In this example, the spring 14 is disposed at an angle in relation to the optical axis O, so that the driving member 4 will be held elastically along both a direction that is perpendicular to the optical axis O and also along the direction of the optical axis O. Moreover, there is no limitation to the example in the figure, but rather a spring 14 may be disposed along the optical axis O to hold the driving member 4 elastically in the direction of the optical axis O, and a spring 14 may be disposed along a direction that is perpendicular to the optical axis O, to hold the driving member 4 in a direction that is perpendicular to the optical axis O.

Moreover, in the blade driving device 1 in the examples described above, driving of the driving member 4 was controlled through detecting means for detecting the operation of the driving member 4 or the blade member 3, where examples were depicted wherein a Hall element 9, or the like, was provided as the detecting means; however, detecting means such as described below may be employed instead.

The detecting means depicted in FIG. 48 (wherein (a) is a cross-sectional explanatory diagram and (b) is a planar explanatory diagram) are an optical sensor 15 for detecting optically the operation of the driving member 4 or the blade member 3. The optical sensor 15 may comprise, for example, a photodetecting portion 15b for detecting light emitted from the light emitting portion 15a, wherein a pair of optical sensors 15 is disposed at both sides, in the direction of movement of the driving member 4 that is a direction of movement that is perpendicular to the optical axis O, wherein the end portions of the driving member 4 are disposed at positions that block the light, to detect the operating position of the driving member 4 through the difference in the outputs of the pair of optical sensors 15.

The detecting means depicted in 49 may each use coils. In the example depicted in (a), a coil 16 for detection, which is separate from the coil 6 for driving, is disposed facing the magnet 5 that is provided on the driving member 4. This enables the operating position of the driving member 4 to be detected through the induced electromotive force that is produced in the detecting coil 16. In the example depicted in (b), a damping coil 17 that is separate from the coil 6 for driving is disposed facing the magnet 5 that is provided on the driving member 4. Through this, the operating position of the driving member 4 can be detected through the conduction of the damping coil 17. Moreover, the operating position of the driving member 4 or of the blade member 3 can also be detected through the state of conduction in the coil 6 for driving that forms the driving source.

FIG. 50 depicts a more specific example configuration of a blade driving device 1. Some or all portions of the example configuration depicted in FIG. 50 can be applied to all of the example configurations that are provided with an operating lever (the connecting member) 10, described above. In the example in the figure, the bearing portion 10A of the operating lever (the connecting member) 10 is provided with an elastic member 31 for preventing support play.

The bearing portion 10A of the operating lever 10 is born on a shaft 2P (20C) of the base member 2, where the operating lever 10 is rotated, around the shaft 2P (20C), through driving of the driving member 4. The axle hole of the bearing portion 10A and the shaft 2P (20C) fit together to enable the operating lever 10 to rotate smoothly, but given the slight gap, due to tolerance error, there may be play in the movement of the operating lever 10. Moreover, even if the shaft 2P is fitted into the axle hole of the bearing portion 10A with a fitting tolerance error that keeps the play to a minimum, still the amount of play may exceed a tolerable range due to changes over time caused by repeated operation. At this time, the play of the operating lever 10 will not only become a factor that will interfere with the smooth operation of the blade member 3, but will also become a factor that interferes with highly accurate control of the blade operation (control of the light that passes through the opening).

The elastic member 31 that is provided in the bearing portion 10A of the operating lever 10 elastically biases the shaft 2P (20C) to one side of the axle hole of the bearing portion 10A, to prevent play of the operating lever 10 while supporting the smooth rotation of the operating lever 10. The provision of such an elastic member 31 enables a reduction in the time required in the assembly procedures, and prevents the play, due to changes over time accompanying repeated operation, from exceeding the tolerable range that is set initially.

The elastic member 31 can be structured through a wire that is supported on one end, and, as illustrated, the elastic member 31 is caused to contact the side face of the shaft 2P (20C) that is born in the bearing portion 10A, so that the biasing force of the elastic member 31 will bias toward the center of the axle hole of the bearing portion 10A, with one and 31A of the elastic member 31 secured at the periphery of the bearing portion 10A. In the example in the figure, a portion of the shaft 2P (20C) is exposed through the provision of a stepped portion in the bearing portion 10A, and the elastic member 31 is caused to contact the side face of the shaft 2P (20C) that is exposed.

Figure 29:
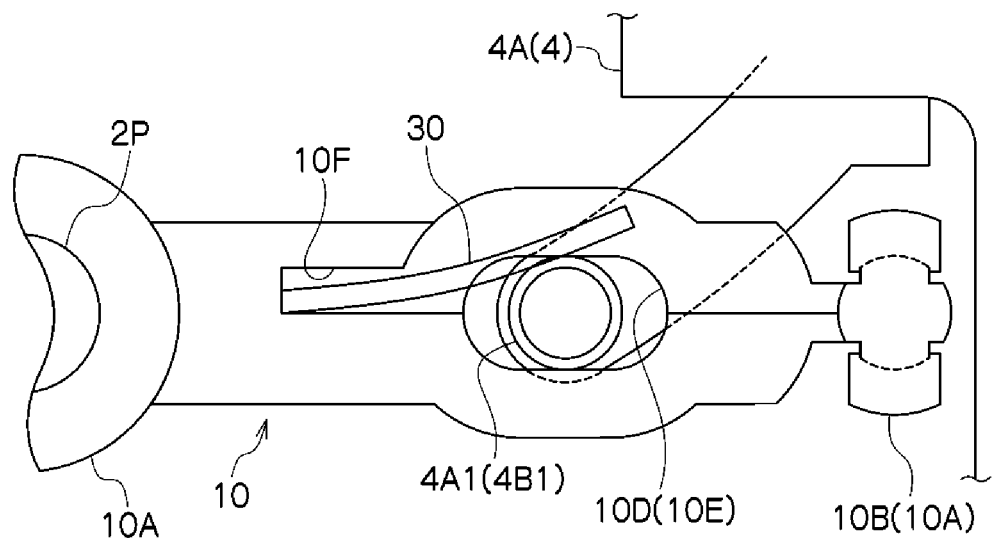
FIG. 29 is an explanatory diagram (a partial enlarged view) of an example wherein an operating lever (a connecting member) is provided.

In the example in the figure, the elastic members 31 are provided in the bearing portions 10A, and, additionally, elastic members 30 for suppressing connection play, in the same manner as in the example configuration depicted in FIG. 29, are provided also at the connecting portions 10D and 10E of the operating lever 10 to which the connecting portions 40P (4A1 and 4B1) of the driving member 4 are connected. In this way, the provision of both the elastic member 31 for preventing support play and the elastic members 30 for preventing connection play enables highly accurate control of the movement of the blade member 3 that is operated through the operating lever 10. The use of the example configuration depicted in FIG. 50 enables fine control of the blade member 3 in the blade driving device 1, and enables high accuracy adjustments of the optical characteristics, such as the iris, thereof.

FIG. 51 depicts a camera unit 100 that is provided with a blade driving device 1 as described above. The blade driving device 1 that is installed in the camera unit 100 can function as an iris unit, a shutter unit, a filter switching unit, or the like. The camera unit 100 is equipped with a lens driving device 101, an imaging element 102, and the like. The imaging element 102 can function also as detecting means, as described above. In this case, the operation of the driving member 4 or the blade member 3 is detected by the imaging element 102 as the amount of light that passes through the opening 2A, and the operation of the driving member 4 is controlled by this detection output.

In the example in the figure, a controlling portion 104 is provided on a circuit board 103 whereon the imaging element 102 is mounted, where the controlling portion 104 outputs a control signal for controlling the driving member 4, based on brightness detected by the imaging element 102. In this type of camera unit 100, the provision of the thin blade driving device 1 that has a small installation area enables the mounting space to be reduced, enabling the camera unit 100 as a whole to be made smaller.

When the blade driving device 1 is used as a shutter unit, the smooth movement of the driving member 4 enables achievement of a high shutter speed with quick responsiveness. When the blade driving device 1 is used as an iris unit or a filter switching unit, the smooth movement of the driving member 4 enables achievement of high resolution brightness control.

FIG. 52 depicts a mobile electronic device 200 wherein the camera unit 100, described above, is installed. The camera unit 100 that enables achievement of miniaturization reduces the space for installation that is occupied in the mobile electronic device 200, contributing to further miniaturization and thickness reduction the mobile electronic device 200. Camera units 100 of recent years have tended to use imaging elements with high sensitivity, so adjustments to the exposure through iris devices has been indispensable in obtaining clear images under bright imaging conditions, such as when capturing images outdoors. The camera unit 100 that is provided with the blade driving device 1 according to an example according to the present invention can be mounted in a mobile electronic device 200, making it possible to obtain a clear adjustment with the appropriate exposure, despite being a camera unit 100 that is installed in a small mobile electronic device 200.

While examples according to the present invention were described in detail above, referencing the drawings, the specific structures thereof are not limited to these examples, but rather design variations within a range that does not deviate from the spirit and intent of the present invention are also included in the present invention. Moreover, insofar as there are no particular contradictions or problems in purposes or structures, or the like, the technologies of the various examples described above may be used together in combination.

The invention claimed is:

1. A blade driving device comprising:
   a base member comprising an opening;
   a blade member that operates so as to advance into the opening or withdraw from the opening;
   a driver moving within a plane that is perpendicular to an optical axis that passes through the opening, the driver including a lever, a magnet and a coil for driving the blade member, one of the magnet and the coil being stationary relative to the base member, and the other of the magnet and the coil being movable relative to the base member to drive the blade member;
   when the other of the magnet and the coil is moved relative to the base member to drive the blade member, the lever rotates and the blade member is driven; and
   a supporting member that supports the driver,
   wherein the magnet comprises a magnetized portion being magnetized along the optical axis and the coil comprises a coil portion including a pair of linear parts, the pair of linear parts producing a driving force through an application of an electric current when the electric current is disposed over the magnet, where the pair of linear parts having the electric current applied in identical directions are disposed in relation to at least the magnetized portion.

2. The blade driving device as set forth in claim 1, wherein the supporting member is provided between the base member and the driver, to at least one of slidably or elastically support the driving member in a state separated from the base member, wherein the supporting member comprises a rolling element that supports sliding of the driver in respect to the base member, and is rolled by the movement of the driver.

3. The blade driving device as set forth in claim 2, wherein: the rolling element is held, so as to enable rolling, in a prescribed position within a retaining portion that is provided on the driving member or the base member.

4. The blade driving device as set forth in claim 1, wherein: the blade member is provided in a pair thereof.

5. The blade driving device as set forth m claim 4, wherein: the driver is a single unit, and is provided with an operating mechanism operating the pair of blade members in mutually opposing directions through an operation of the driver in one direction.

6. The blade driving device as set forth in claim 1, comprising: a detector detecting operation of the blade member, either directly or indirectly; and a controller controlling the driver.

7. The blade driving device of claim 1, comprising:
   two blade members that operates so as to advance into the opening or withdraw from the opening,
   wherein the lever that connects the two blade members, the driver includes two voice coil members arranged symmetrically with respect to a center of rotation of the lever in a plan view.

\* \* \* \* \*